US006732018B2

(12) United States Patent
Osinga

(10) Patent No.: US 6,732,018 B2
(45) Date of Patent: May 4, 2004

(54) AWNING ASSEMBLY AND CONTROL SYSTEM

(75) Inventor: Anne J. Osinga, Rockanje (NL)

(73) Assignee: Turnils AB, Alingsas (SE)

(*) Notice: Subject to any disclaimer, the term of this patent is extended or adjusted under 35 U.S.C. 154(b) by 0 days.

(21) Appl. No.: 10/299,487

(22) Filed: Nov. 18, 2002

(65) Prior Publication Data

US 2003/0069670 A1 Apr. 10, 2003

Related U.S. Application Data

(62) Division of application No. 09/773,078, filed on Jan. 31, 2001, now Pat. No. 6,484,069.

(30) Foreign Application Priority Data

Jan. 31, 2000 (EP) .......................................... 00200304

(51) Int. Cl.[7] .............................................. G05B 15/00

(52) U.S. Cl. .............................. 700/275; 160/1; 160/7; 160/70; 318/16; 318/480

(58) Field of Search ........................... 700/275, 90, 56, 700/60, 61, 65, 9, 17; 160/1-5, 7, 9, 10, 66, 67, 69, 70; 318/16, 480

(56) References Cited

U.S. PATENT DOCUMENTS

| | | | | | |
|---|---|---|---|---|---|
| 1,075,385 | A | | 10/1913 | Smith | 160/70 |
| 1,777,778 | A | * | 10/1930 | Zecher | 160/10 |
| 1,804,550 | A | | 5/1931 | Branch | 160/68 |
| 1,984,329 | A | | 12/1934 | Bell | 160/70 |
| 2,134,283 | A | | 10/1938 | Jones et al. | 160/22 |
| 3,847,171 | A | | 11/1974 | Akers et al. | 160/68 |
| 4,214,621 | A | * | 7/1980 | Wessels et al. | 160/66 |
| 4,230,309 | A | * | 10/1980 | Schnitzius | 267/120 |
| 4,495,977 | A | * | 1/1985 | Delluc | 160/70 |
| 5,045,947 | A | | 9/1991 | Beery | 455/158.5 |
| 5,119,867 | A | | 6/1992 | Lukos | 160/70 |
| 5,134,347 | A | | 7/1992 | Koleda | 160/1 |
| 5,221,891 | A | | 6/1993 | Janda et al. | 136/293 |
| 5,225,748 | A | * | 7/1993 | Haring | 318/266 |
| 5,232,036 | A | * | 8/1993 | Brutsaert | 160/70 |
| 5,273,095 | A | | 12/1993 | Lukos | 160/70 |
| 5,307,856 | A | * | 5/1994 | Murray | 160/70 |
| 5,433,259 | A | | 7/1995 | Faludy | 136/245 |
| 5,479,557 | A | | 12/1995 | Ganz et al. | 136/293 |
| 5,566,471 | A | | 10/1996 | Hirano | 160/5 |
| 5,760,558 | A | * | 6/1998 | Popat | 318/480 |
| 5,793,174 | A | | 8/1998 | Kovach et al. | 318/468 |
| 5,832,978 | A | * | 11/1998 | Kroner | 160/79 |
| 5,921,305 | A | * | 7/1999 | Grudl | 160/66 |
| 5,939,864 | A | | 8/1999 | Lenhart et al. | 320/137 |
| 6,098,692 | A | * | 8/2000 | Dieckmann | 160/66 |
| 6,111,376 | A | | 8/2000 | Jean-Marc | 318/432 |
| 6,233,532 | B1 | * | 5/2001 | Boudreau et al. | 702/89 |
| 2001/0003163 | A1 | | 6/2001 | Bungert et al. | 700/12 |
| 2002/0060631 | A1 | | 5/2002 | Runge et al. | 340/602 |

FOREIGN PATENT DOCUMENTS

| | | |
|---|---|---|
| DE | 257 423 | 3/1913 |
| DE | 1 241 088 | 5/1967 |
| DE | 30 15 989 | 11/1981 |

(List continued on next page.)

*Primary Examiner*—Leo Picard
*Assistant Examiner*—Paul Rodriguez
(74) *Attorney, Agent, or Firm*—Dorsey & Whitney LLP

(57) ABSTRACT

This invention relates to a retractable and extendable awning and control system for automatically extending and retracting the awning. A front of an awning fabric is attached to a front bar, movably mounted on a wall of a building by retractable arms. A rear of the fabric is unrolled from a roll when the arms move the front bar away from the wall. The awning also features a weather sensor unit on its front bar in wireless communication with an indoor control unit. The weather sensor unit can detect excessive wind, mechanical shocks, sunlight, and rain. In addition, each support bracket on the awning has a screw spindle for adjusting an angle of extension of the awning from the wall with a resilient inner bushing that cushions mechanical shocks to the awning. Adhesive can also be introduced into arm ends after assembly of the arms.

20 Claims, 40 Drawing Sheets

FOREIGN PATENT DOCUMENTS

| | | | |
|---|---|---|---|
| DE | 38 01 560 | | 8/1989 |
| DE | 40 23 673 | | 2/1992 |
| DE | 93 06 368 | | 8/1993 |
| DE | 41 06 033 | | 11/1994 |
| DE | 43 15 406 | | 11/1994 |
| DE | 44 07 342 | | 11/1994 |
| DE | 297 08 599 | | 8/1997 |
| DE | 198 25 017 | | 9/1999 |
| DE | 200 00 682 | | 5/2000 |
| EP | 0084076 | | 3/1982 |
| EP | 0125727 | A1 * | 5/1984 |
| EP | 0125727 | | 5/1984 |
| EP | 0489186 | | 12/1990 |
| EP | 0795660 | | 2/1997 |
| EP | 0771929 | A1 * | 5/1997 |
| EP | 0 819 804 | | 1/1998 |
| EP | 0 919 675 | | 6/1999 |
| EP | 1 069 257 | | 1/2001 |
| EP | 1 077 378 | | 2/2001 |
| EP | 1122378 | A1 * | 8/2001 |
| FR | 2 787 501 | | 6/2000 |
| GB | 1175723 | | 4/1966 |
| GB | 2042058 | | 12/1978 |
| JP | 2-516 | | 1/1984 |
| JP | 61-146992 | | 7/1986 |
| JP | 2-91348 | | 3/1990 |
| JP | 02091347 | A * | 3/1990 |
| NL | 94 00 103 | | 1/1994 |
| WO | WO 98/37493 | | 8/1998 |
| WO | WO 98/37622 | | 8/1998 |
| WO | WO 99/61721 | | 12/1999 |

* cited by examiner

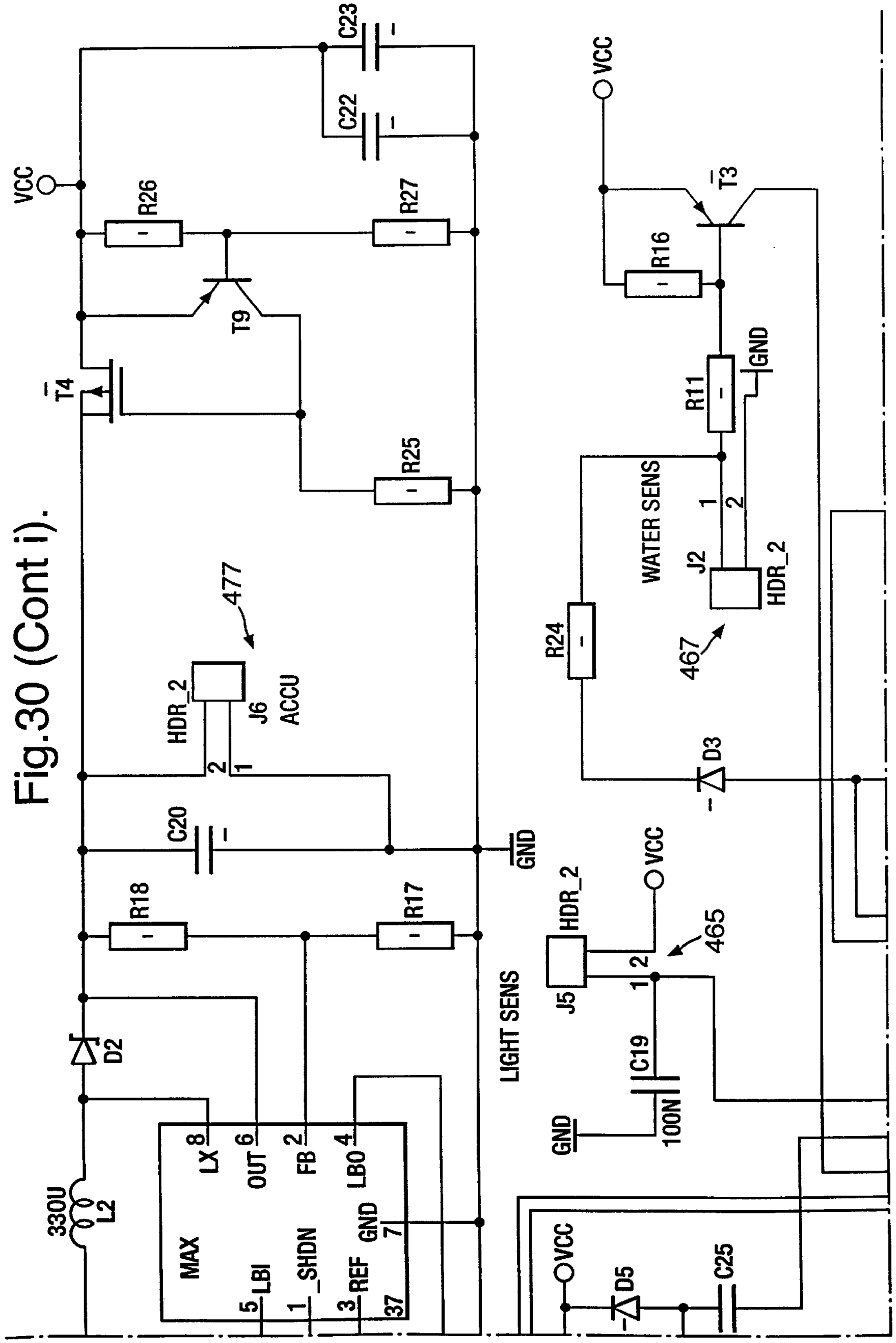
Fig.30 (Cont i).

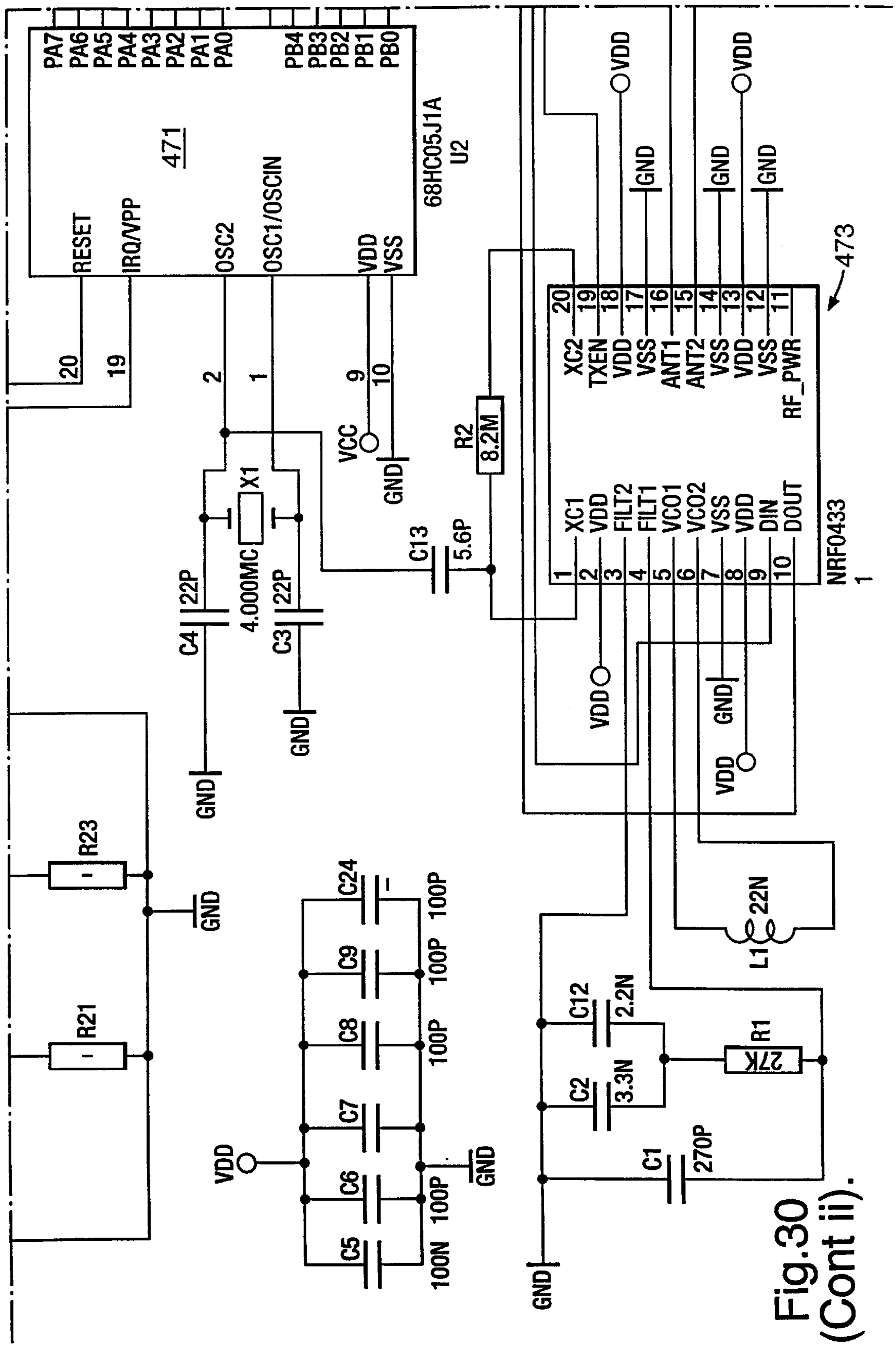
Fig.30 (Cont ii).

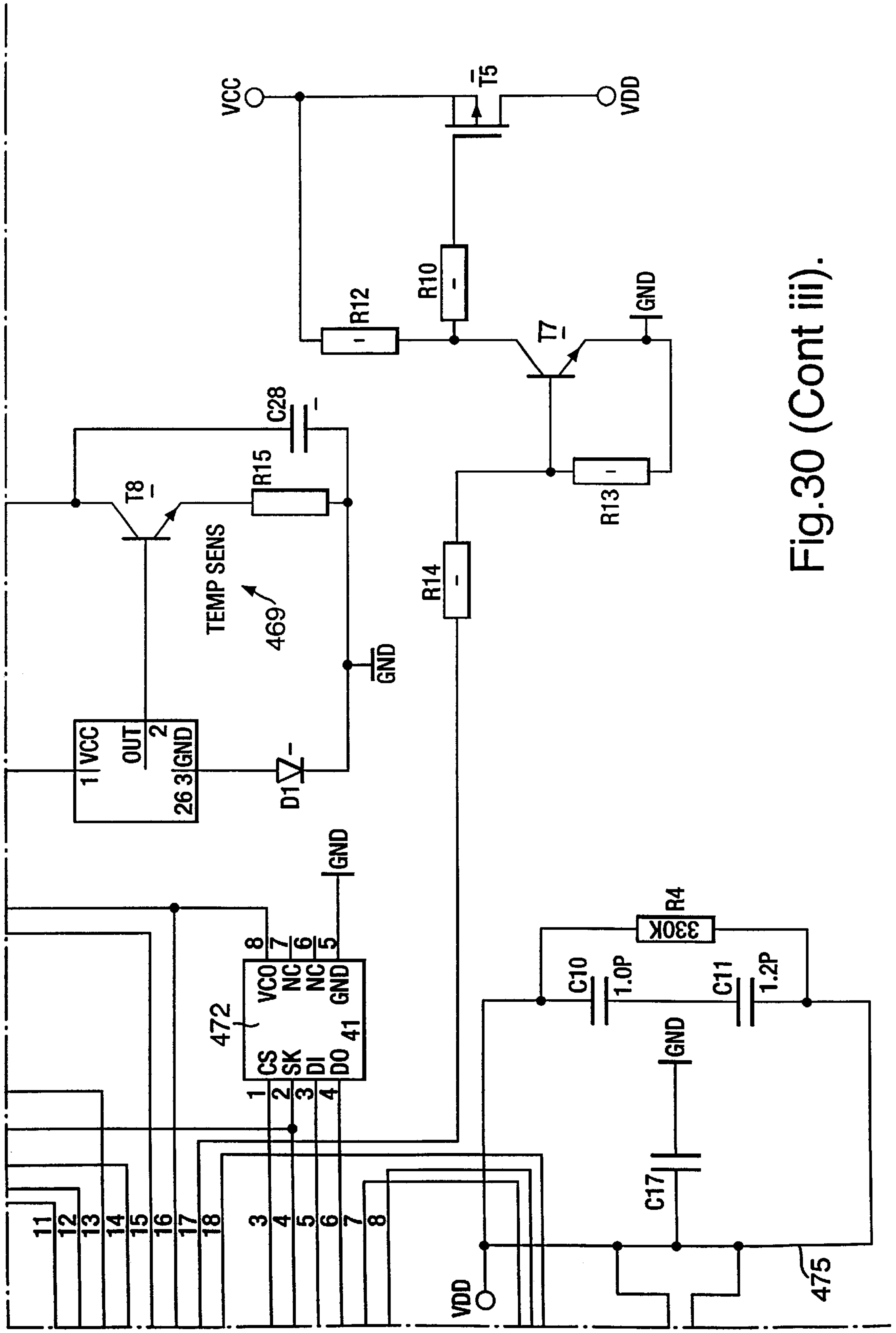
Fig.30 (Cont iii).

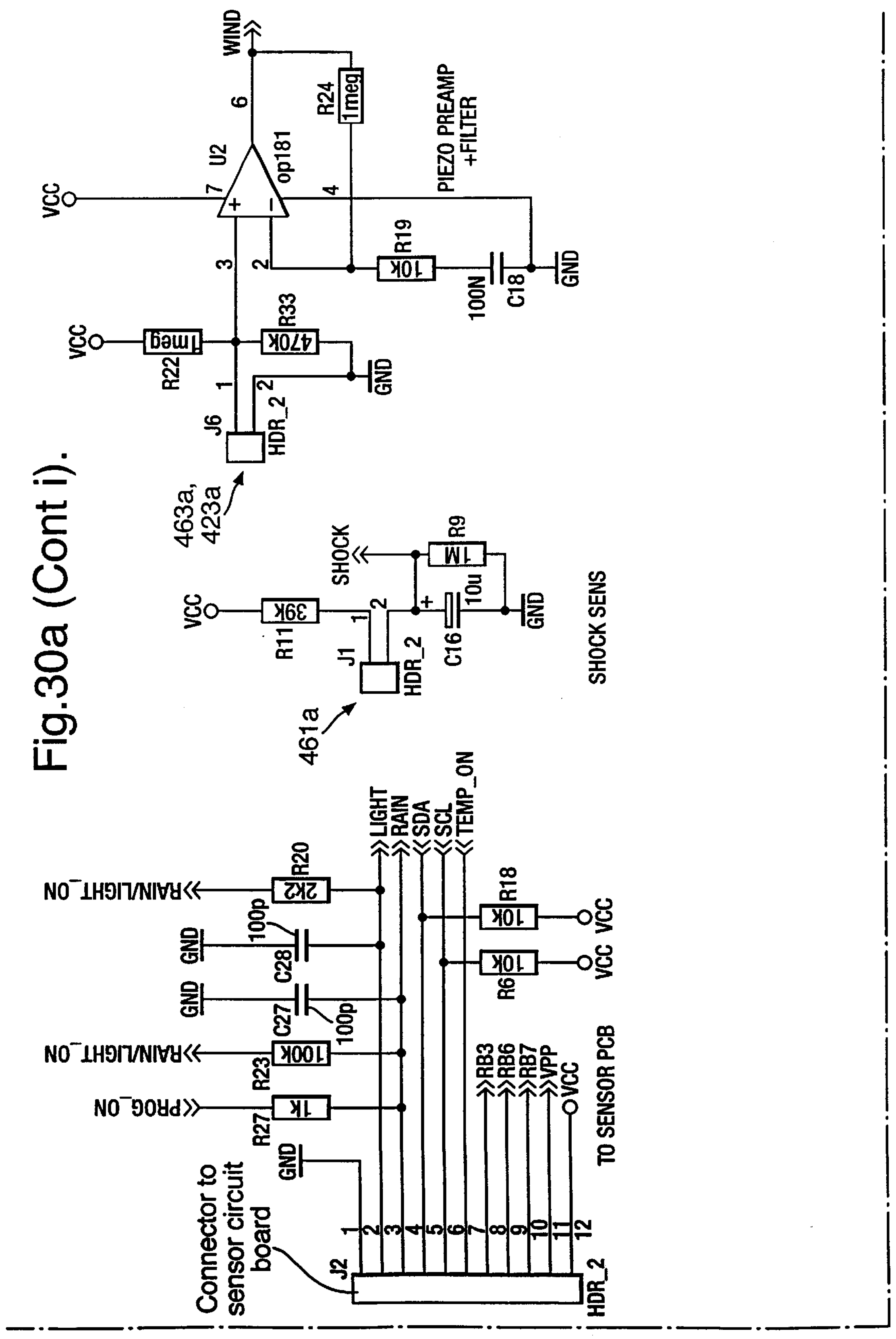
Fig.30a (Cont i).

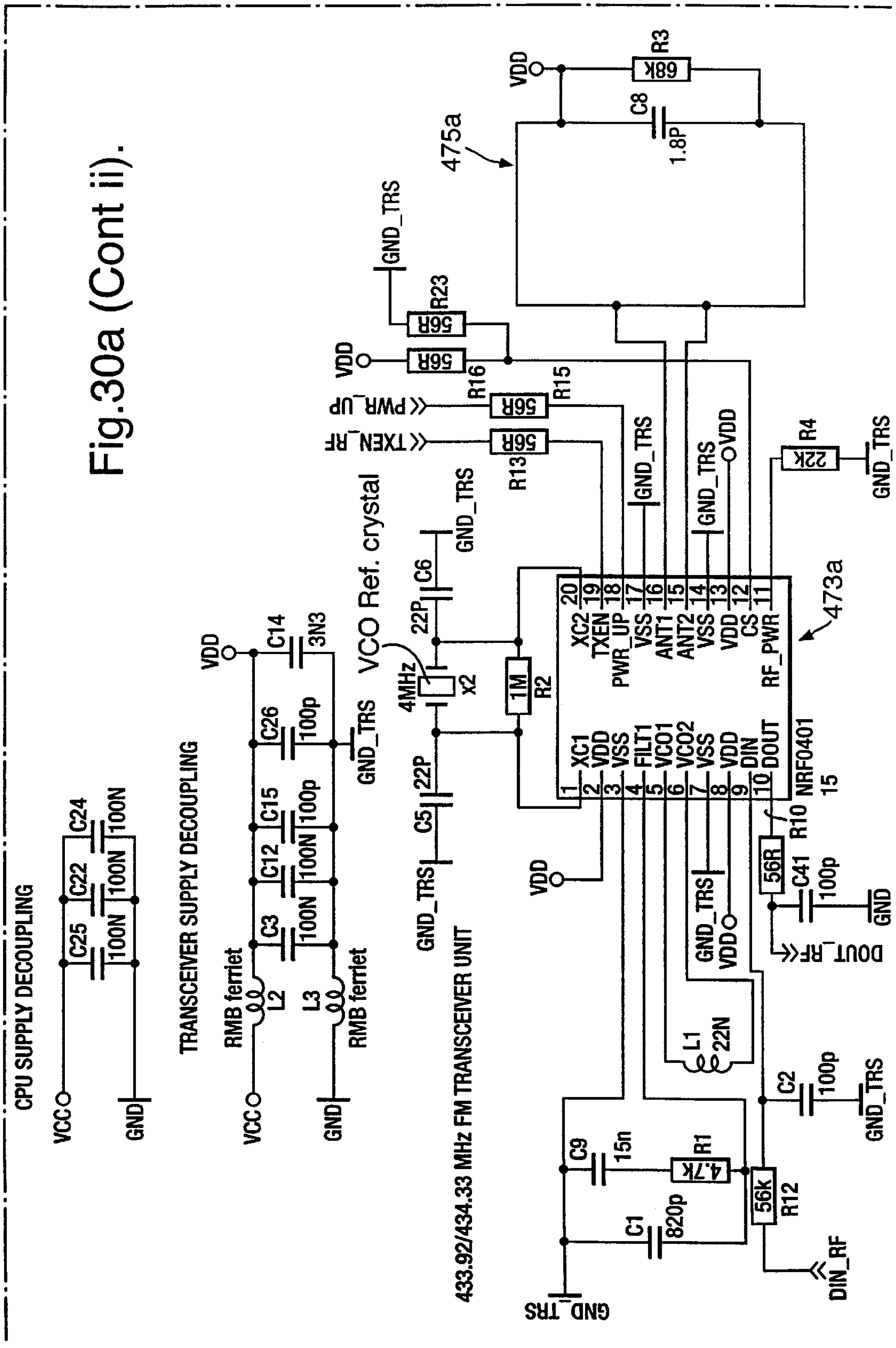
Fig.30a (Cont ii).

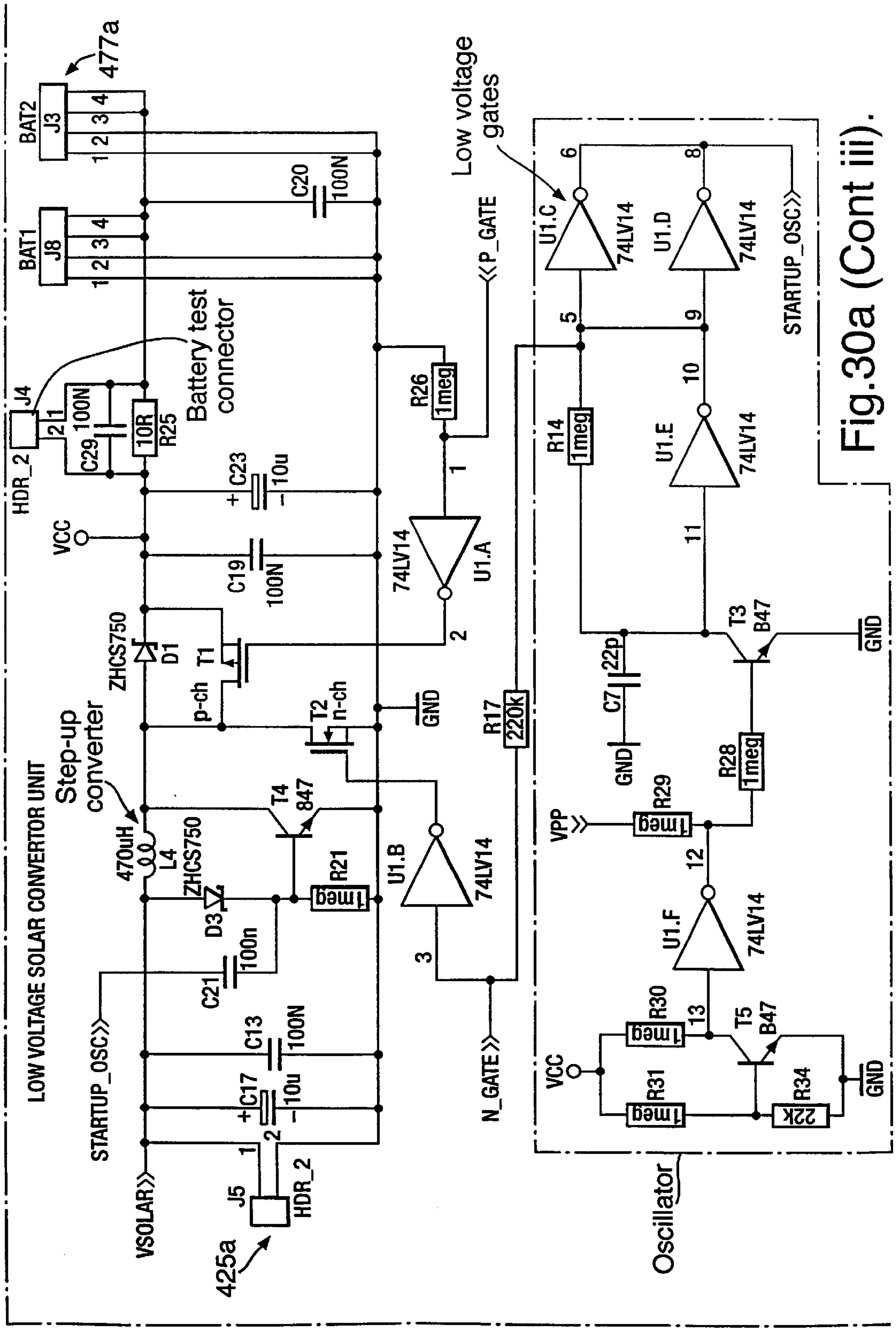
Fig.30a (Cont iii).

| Fig.31. | Fig.31 (Cont i). | Fig.31 (Cont ii). |
|---|---|---|

(Cont i).

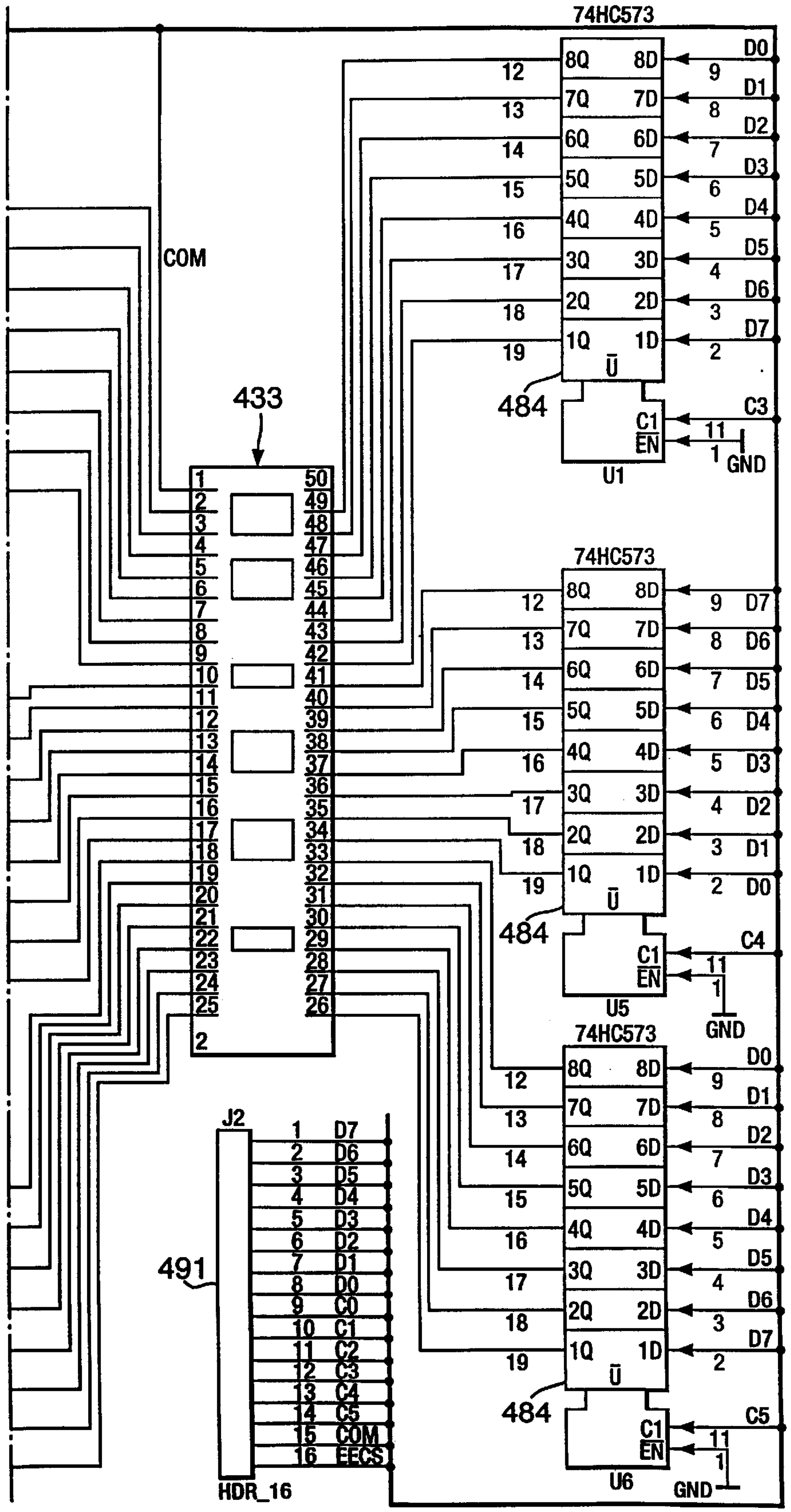
Fig.31 (Cont ii).

| | | |
|---|---|---|
| Fig.31a. | Fig.31a (Cont i). | Fig.31a (Cont ii). |

(Cont i).

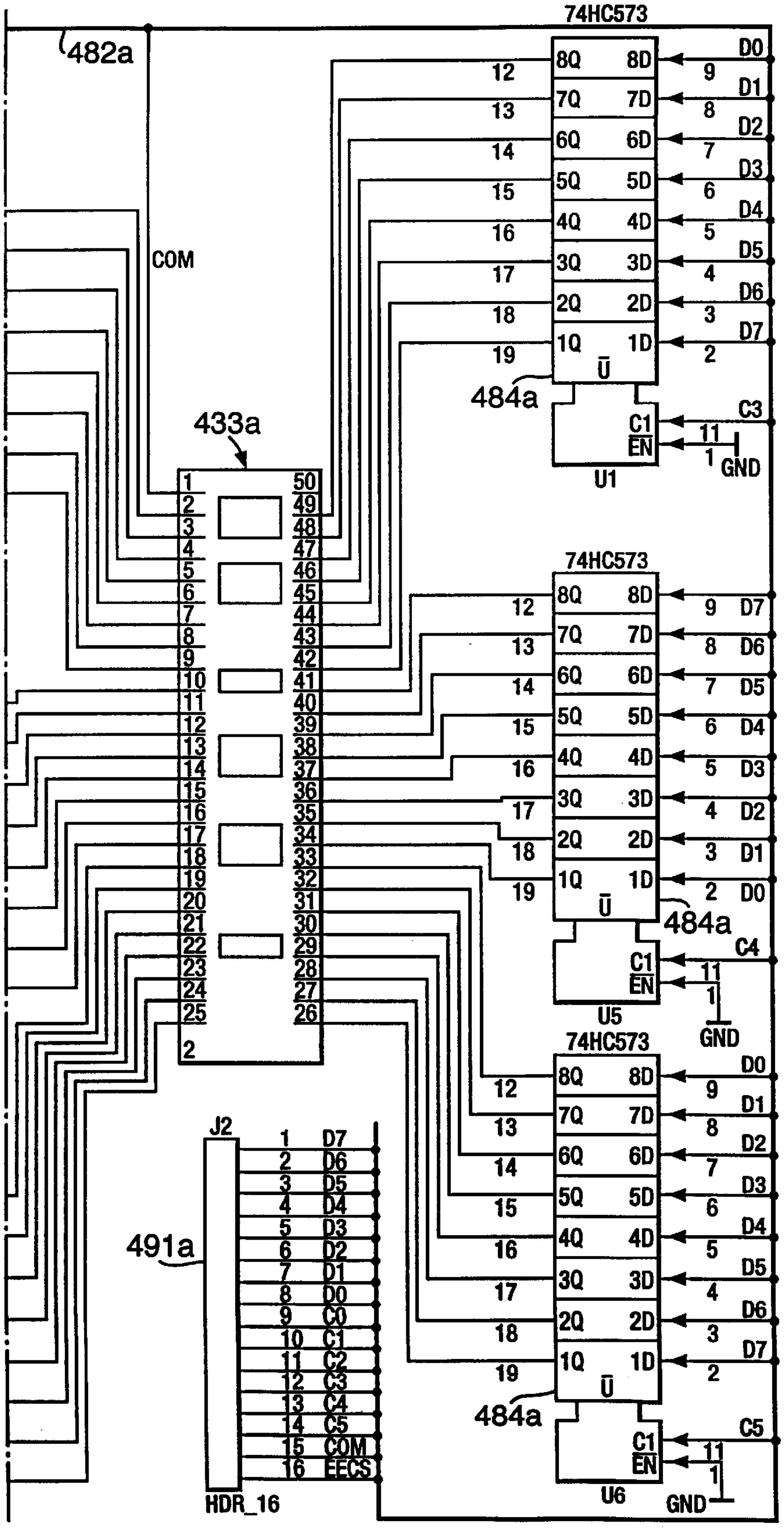
Fig.31a (Cont ii).

AWNING ASSEMBLY AND CONTROL SYSTEM

CROSS REFERENCE TO RELATED APPLICATIONS

This application is a division of U.S. patent application Ser. No. 09/773,078, filed Jan. 31, 2001, now U.S. Pat. No. 6,484,069 This application is also related to, and claims priority from, European patent application EP 00200304.4, filed Jan. 31, 2000, entitled "AWNING ASSEMBLY AND CONTROL SYSTEM." These applications are hereby incorporated by reference as though fully set forth herein.

BACKGROUND OF THE INVENTION

This invention relates to a retractable and extendable awning and a control system for automatically extending and retracting the awning.

Retractable and extendable awnings are generally known from U.S. Pat. Nos. 1,075,385, 1,804,550, GB 1 175 723, GB 2 042 058, EP 0 084 076, EP 0 125 727, EP 0 489 186 and EP 0 795 660.

BRIEF SUMMARY OF THE INVENTION

The present invention has as an object to eliminate inconveniences of the prior art by providing such an awning with improved features.

In accordance with this invention, a retractable and extendable awning, includes at least one arm support bracket, at least one arm having first and second pivoting arm sections, a front bar, a roller adapted to be mounted for rotation, a fabric cloth for winding about and unwinding from the roller, wherein the first arm section has a first end pivotally linked to the bearing support and a second end, the second arm section having a first end pivotally linked to the second end of the first arm section and a second end pivotally linked to the front bar.

According to another aspect of the invention, the front bar of the awning is provided with a weather sensor unit comprising a sensor which can detect movement of the front bar as a result of wind. Advantageously, the sensor unit is also provided with a light sensor, a rain sensor and a wind sensor. The additional wind sensor may be provided in addition to the movement sensor as this can only detect the presence of wind with the awning in an extended position. With the danger of wind removed it would be desirable if the awning can be extended automatically rather than manually. Hence the additional wind sensor which makes this possible. The movement sensor detects all vertical movements or shocks of the extended awning. If such movements occur outside of a predefined range a signal can be produced to effect retraction of the awning to prevent it from being damaged. The movement sensor can be based on the principle using a conductive fluid and two electrical contacts. If the fluid as a result of movement contacts both contacts an electrical connection is made. The number of electrical contacts within a given time frame can be used to detect movement. The viscosity of the conductive fluid determines the sensitivity of this type of movement sensor. Preferably the wind sensor is selected to be highly sensitive, whereas the movement or shock sensor can be of a much lower sensitivity. The wind sensor can be included in a wind catching body which is movably mounted with respect to the sensor unit. Such a wind catching body is preferably shaped to catch wind from all possible directions. Known wind detecting devices do only detect wind in a horizontal direction and are mostly mounted at a location remote from the awning which also does not help in recognising the actual danger level to which an individual awning may at times be exposed. Often gusts of wind blow vertically upward with respect to a facade of a building which carries the awning and this can be particularly dangerous if undetected. The present invention will cope with this situation more adequately. The sensor unit preferably communicates by means of wireless transmission with a control unit, which advantageously can be positioned indoor, and preferably the sensor unit is also programmed in a manner to save power. The sensor unit further comprises circuitry which at idle is in a sleep mode and consumes only 10 microamperes. An IRQ-pin is used to force a processor out of this sleep mode. This can be made to happen once for every 10 seconds or so. Upon awakening the unit will read the measurements of its sensors and compare these with threshold values stored in an internal table. Only when one of the values exceeds the specified threshold the unit will establish communication with either an indoor or outdoor control unit. Additionally the sensor unit will also establish communication with the control unit every one to five minutes, or so, to send a 'live' signal even without having to report a surpassing of a threshold value. The circuitry thereby enables the control unit to detect proper operation and communication of the sensor unit. During such predefined periodic communications the control unit can also transmit any new settings of threshold values to the sensor unit. Power supply for the sensor unit circuitry is provided by a rechargeable battery or accumulator which is charged by a solar cell. To economise on the investment for solar cells the solar cell is preferably composed of four individual cells. To allow charging of the battery with a relatively low voltage of 2 V, a step-up converter is used. This enables charging under even very low light levels, while under excessive light conditions the charging current will be limited to prevent damage to the battery.

According to yet another aspect of the invention an awning is, further provided with an indoor control unit. Upon installation particular settings for the outdoor weather sensor unit, such as sun and wind can be downloaded from the control unit to the sensor unit and stored at both ends in a programmable memory, such as an EEPROM, which memorises these settings. Only if the sensor unit detects a value outside of these settings it will establish communication with the control unit, so as to minimise transmissions between the two devices and the power consumption required thereby. If however the control unit does not receive the standard periodic "live"-signal transmission it will retract the awning and switch itself into manual mode. A suitable message may be displayed on a display device of the control unit to indicate this. The indoor control unit preferably is connected to mains supply and includes a transformer and a triac control for an electric motor incorporated in the awning or like sun protective device. Conveniently a high frequency circuit for wireless transmission of signals can be combined with the high voltage circuit board in the control unit. Another circuit board can be provided for the low voltage section of the control unit. The low voltage circuit board thereby contains the logical controls which can be fed by a low voltage, such as 5 V DC. These include a processor, a liquid crystal display, switches and optionally a temperature sensor. The processor comprises a control algorithm, a routine for decoding switch actuations and a display driver. To obtain an as adaptable as possible arrangement, the display driver and decoder for the switch matrix are included in a timer. An internal serial port is used for communication with a transceiver module. To control an electric motor for moving the awning from a retracted into an extended position and vice-versa a revolution counter and a power surge detection may be employed to detect the appropriate end positions of the awning. Such end position controls are usually incorporated in the electric motor units. An IRQ input and routine are however reserved in the control unit for the possible inclusion of an optional motor control in the control unit if so desired. It then also becomes possible to program the power surge (measured by a triac), which should result in the motor to cut out, with the help of the control unit. A main program algorithm has only a reduced number of tasks, which improves clarity and reliability. The main program thus includes two programming modes and decision sequences for intellectual control.

According to a still further aspect of the invention an awning is provided that further includes a hand-held remote control transmitter.

The invention also provides a control system in particular for an awning as referred to above, which includes at least one of a weather sensor, an indoor control unit and optionally a hand-held remote control transmitter, all preferably as referred to above.

BRIEF DESCRIPTION OF THE DRAWINGS

Further aspects of the invention will be apparent from the detailed description below of particular embodiments and the drawings thereof, in which.

Figure 28:
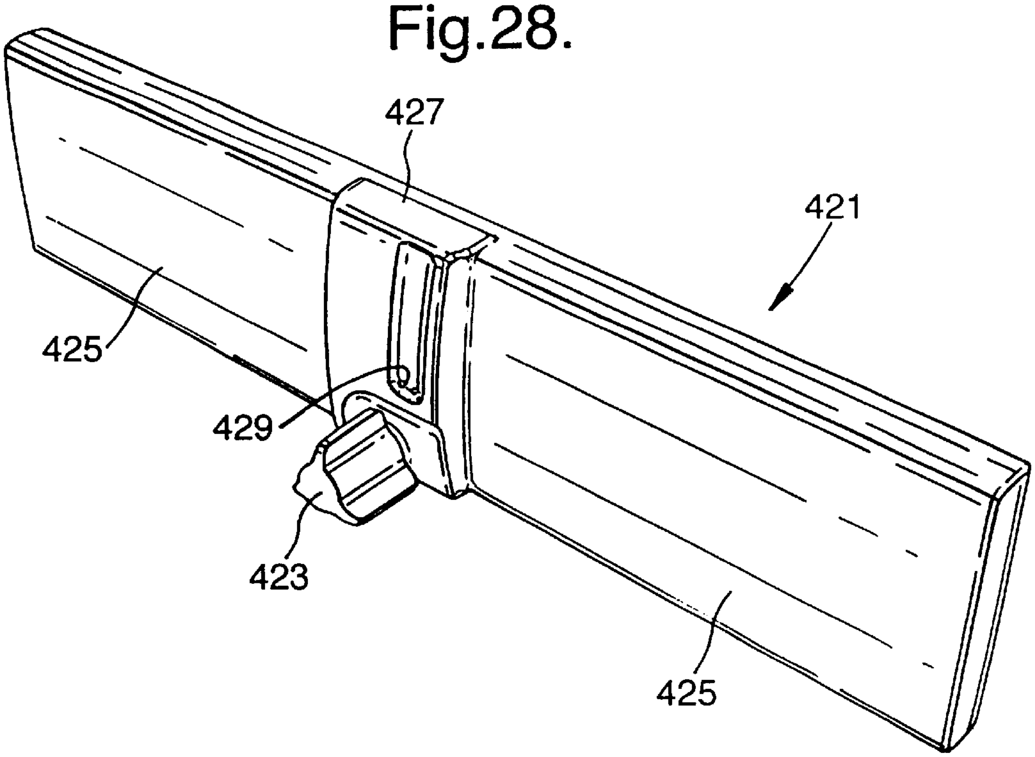
FIG. 28 is a front perspective view of an outdoor weather sensor unit which can be mounted on the front of the front bar of the awning of FIG. 1.
Figure 29:
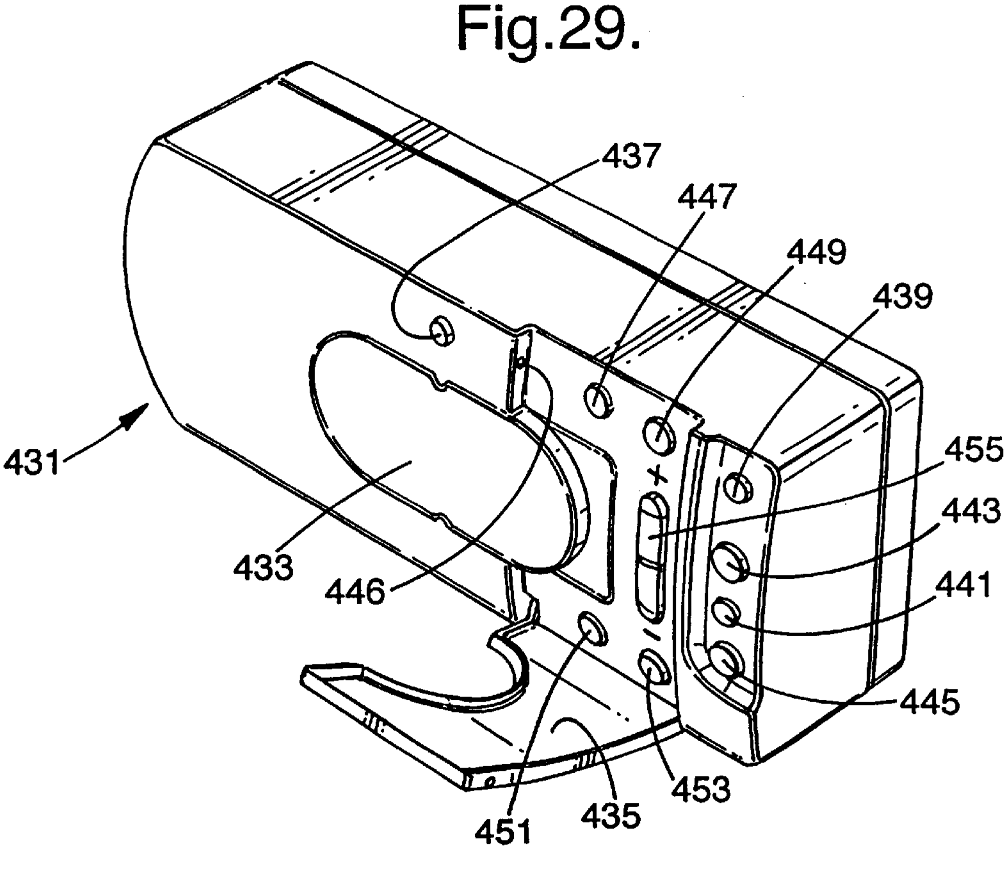
FIG. 29 is a front perspective view of an indoor control unit which can be in communication with the weather sensor unit of FIG. 28.
Figure 31:
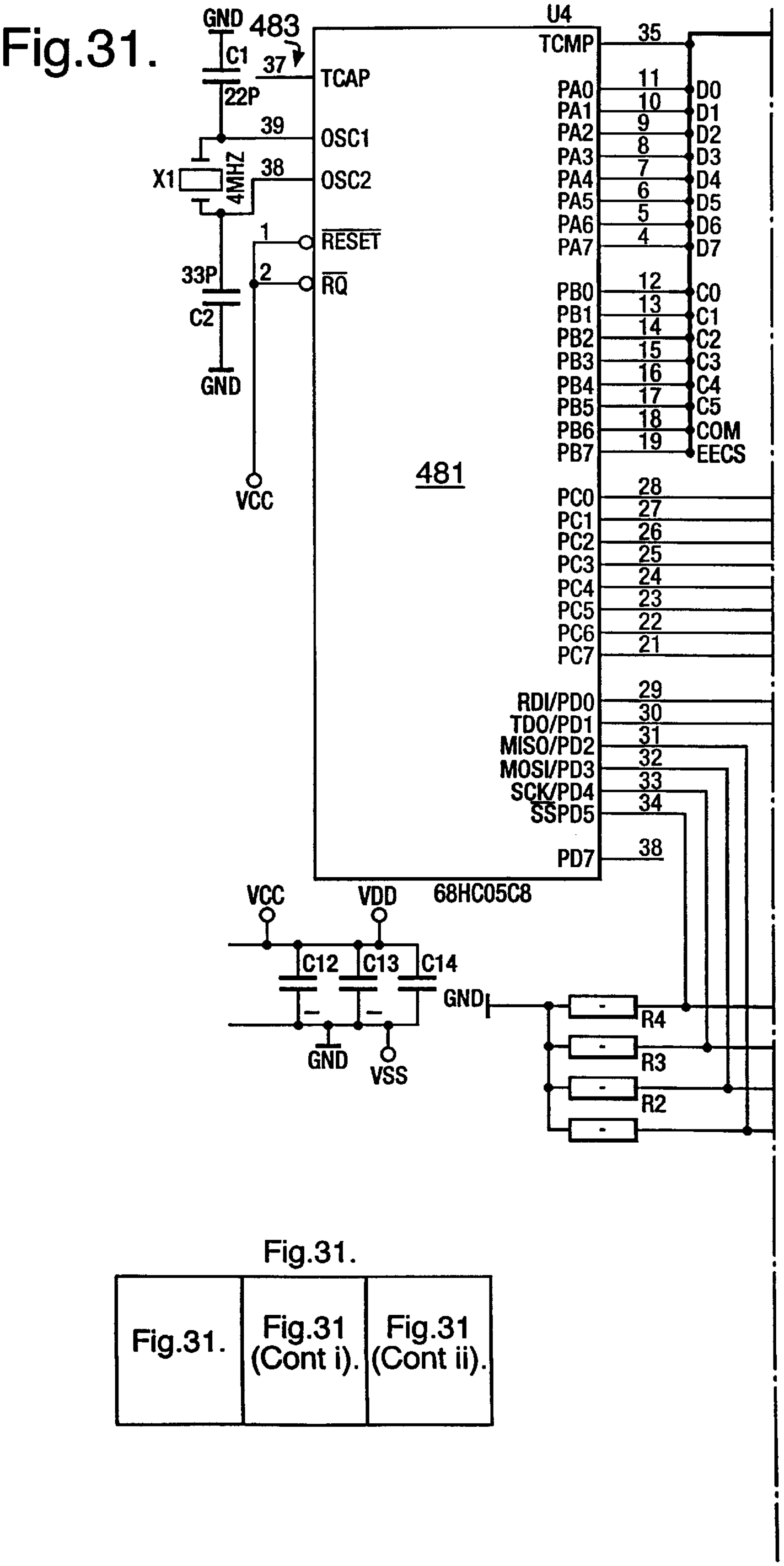
Figure 31:
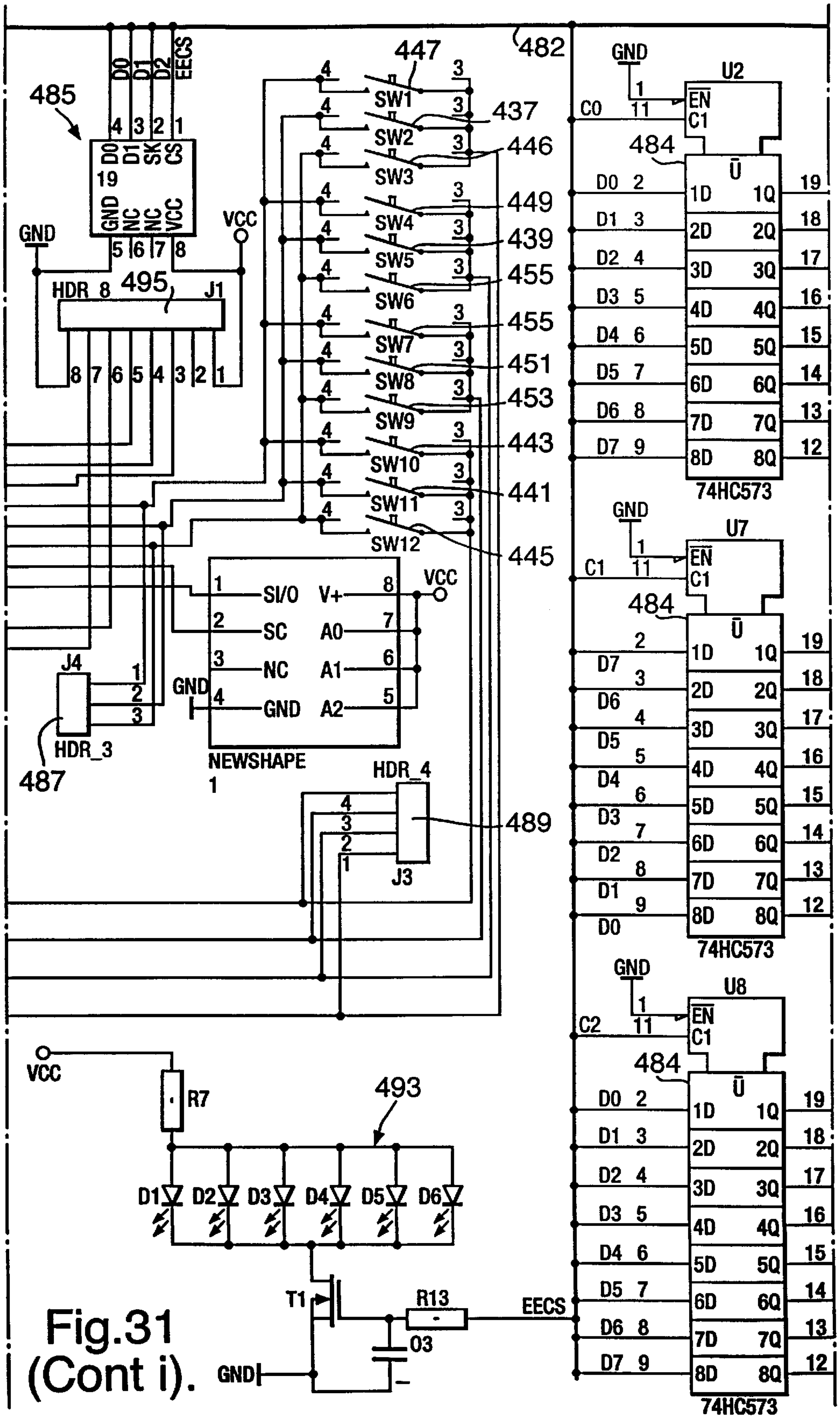
Figure 32:
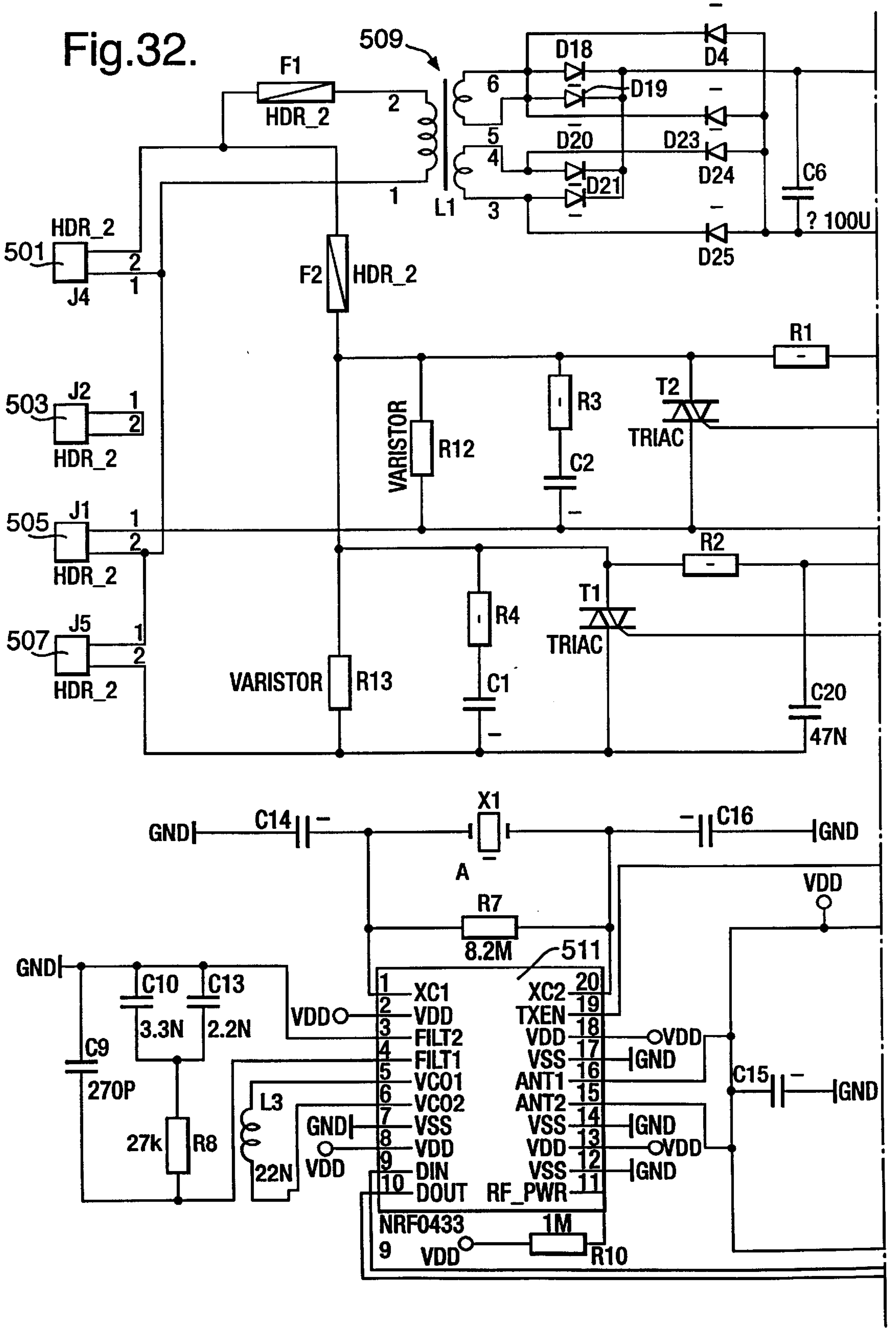
Figure 32:
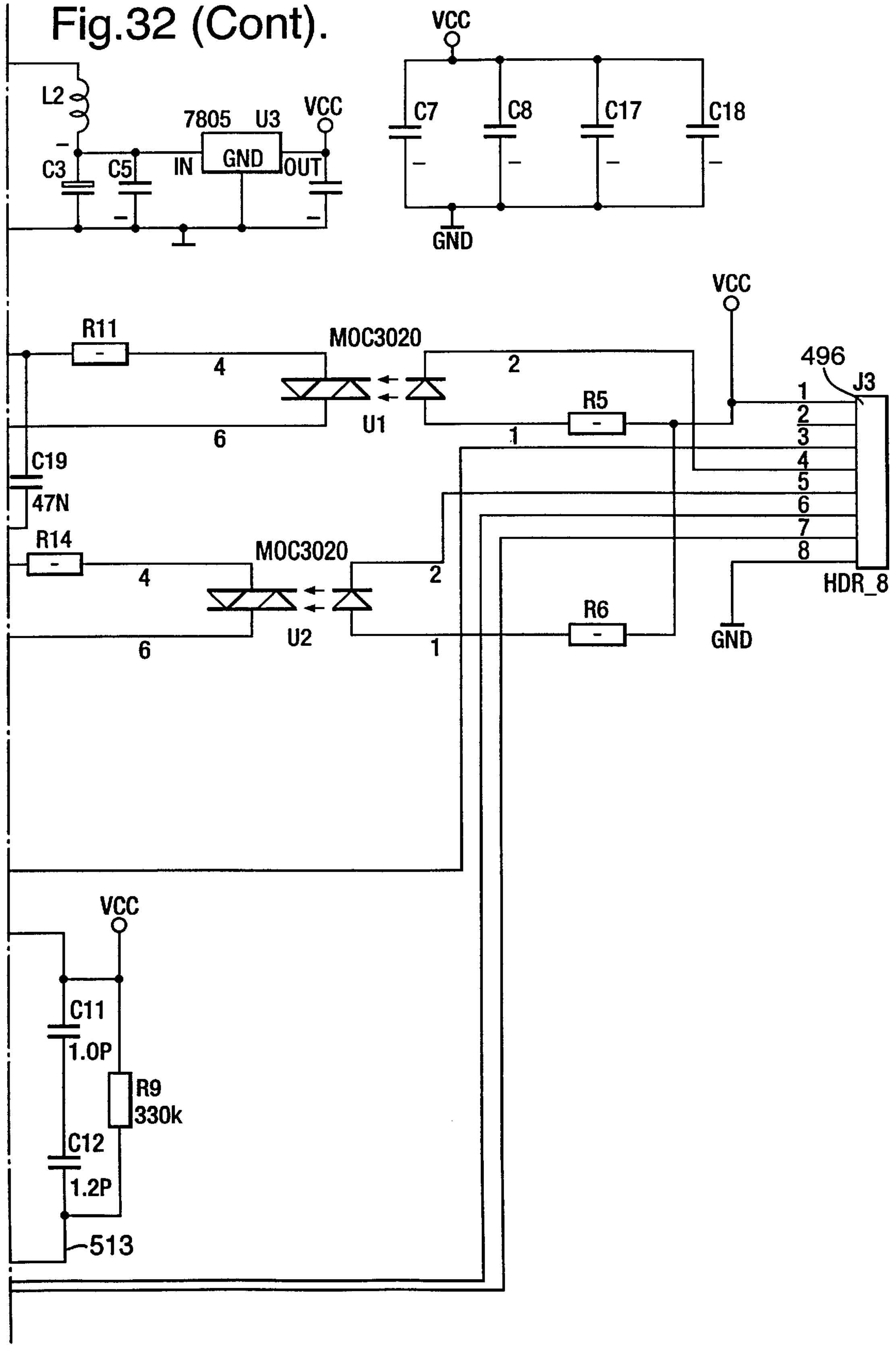
Figure 33:
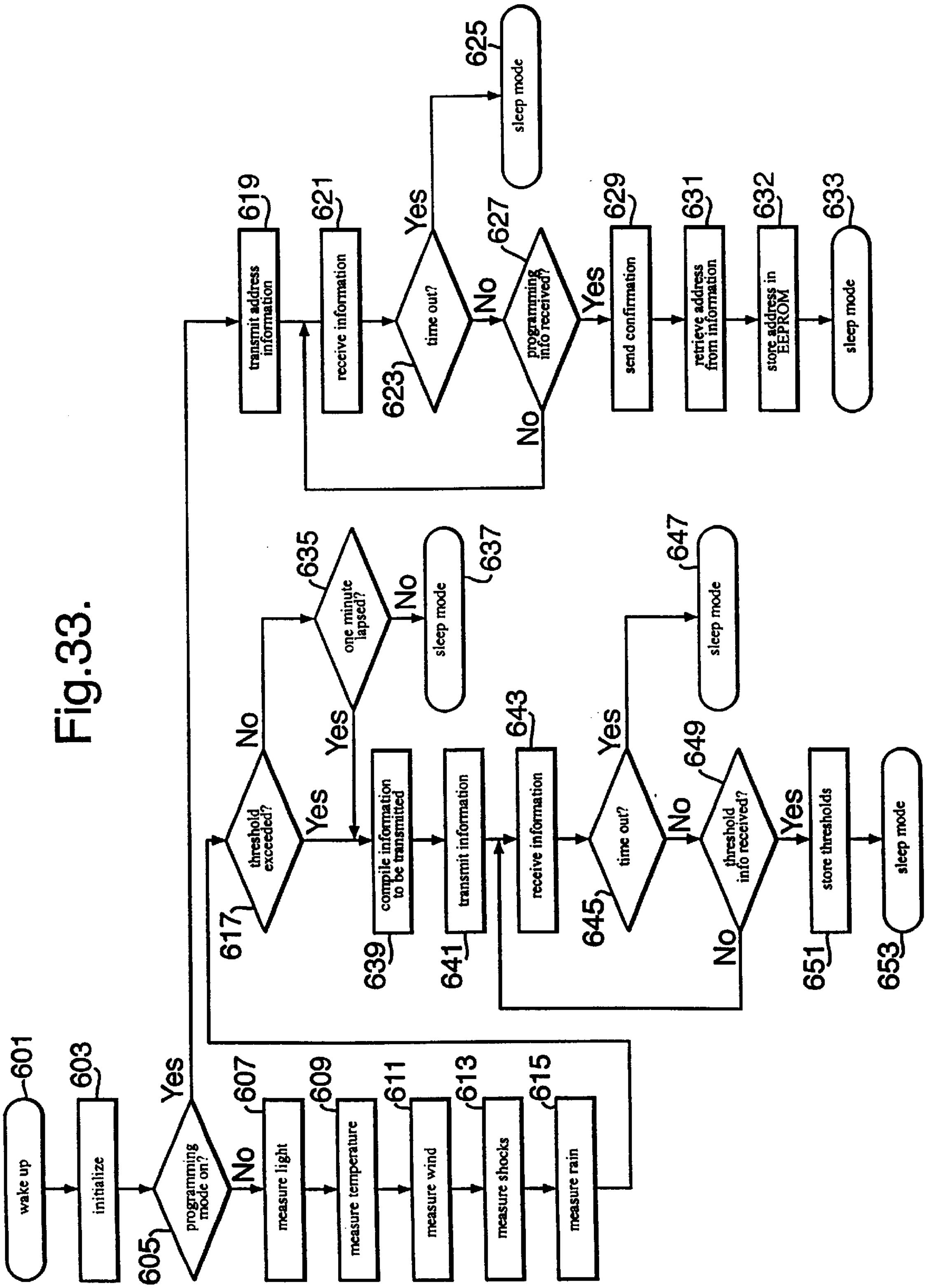
Figure 34:
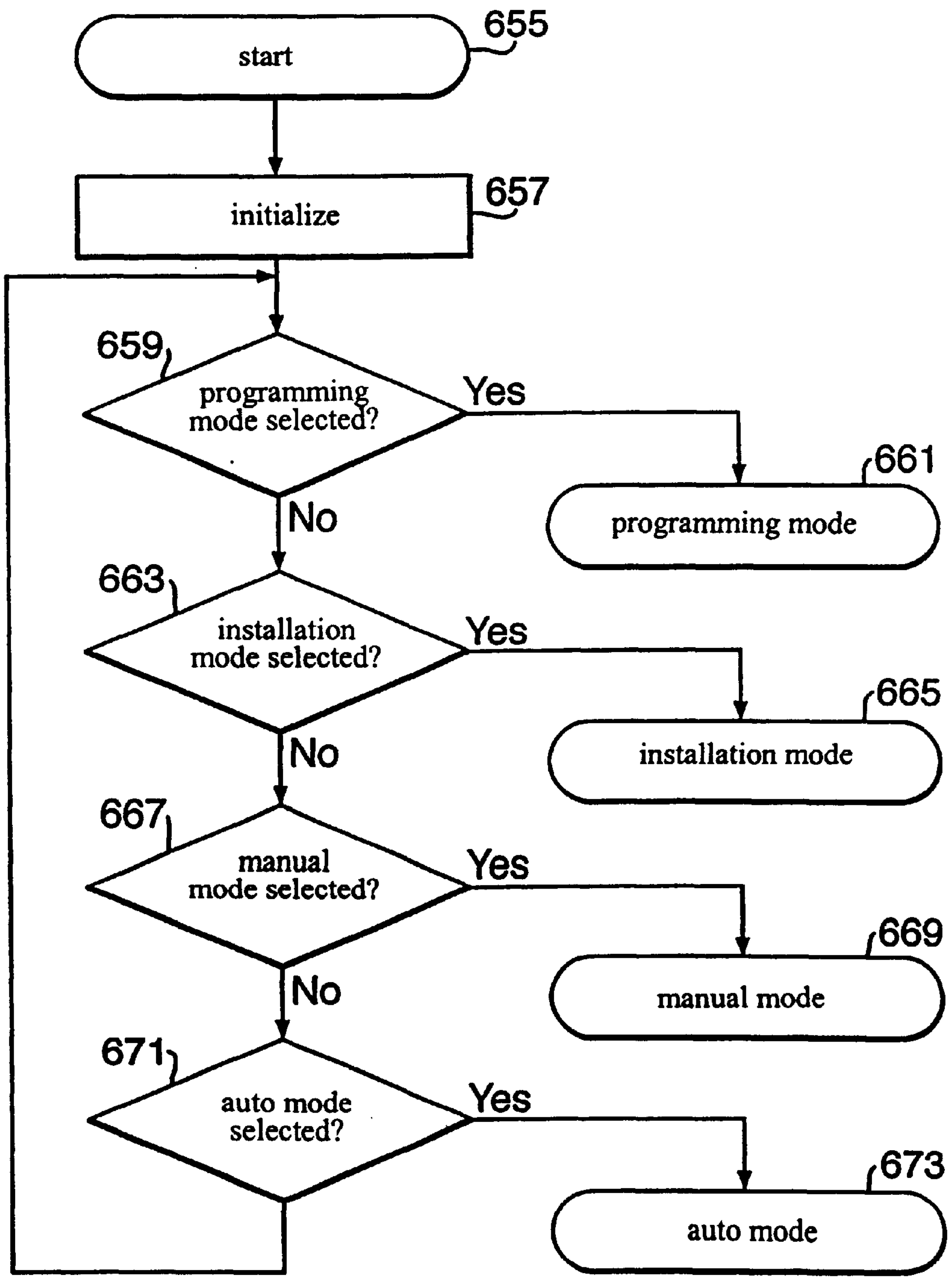
Figure 35:
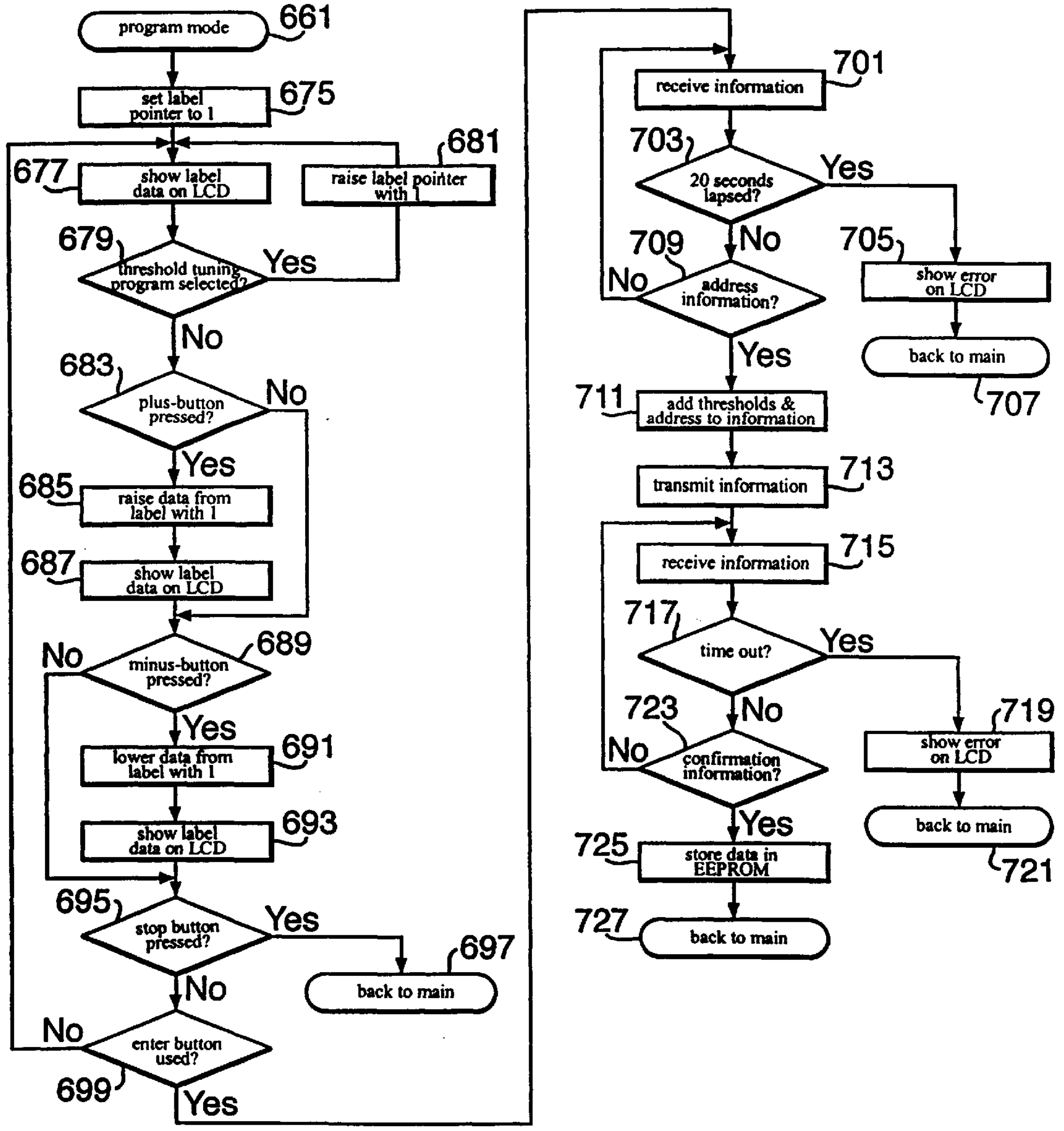
Figure 36:
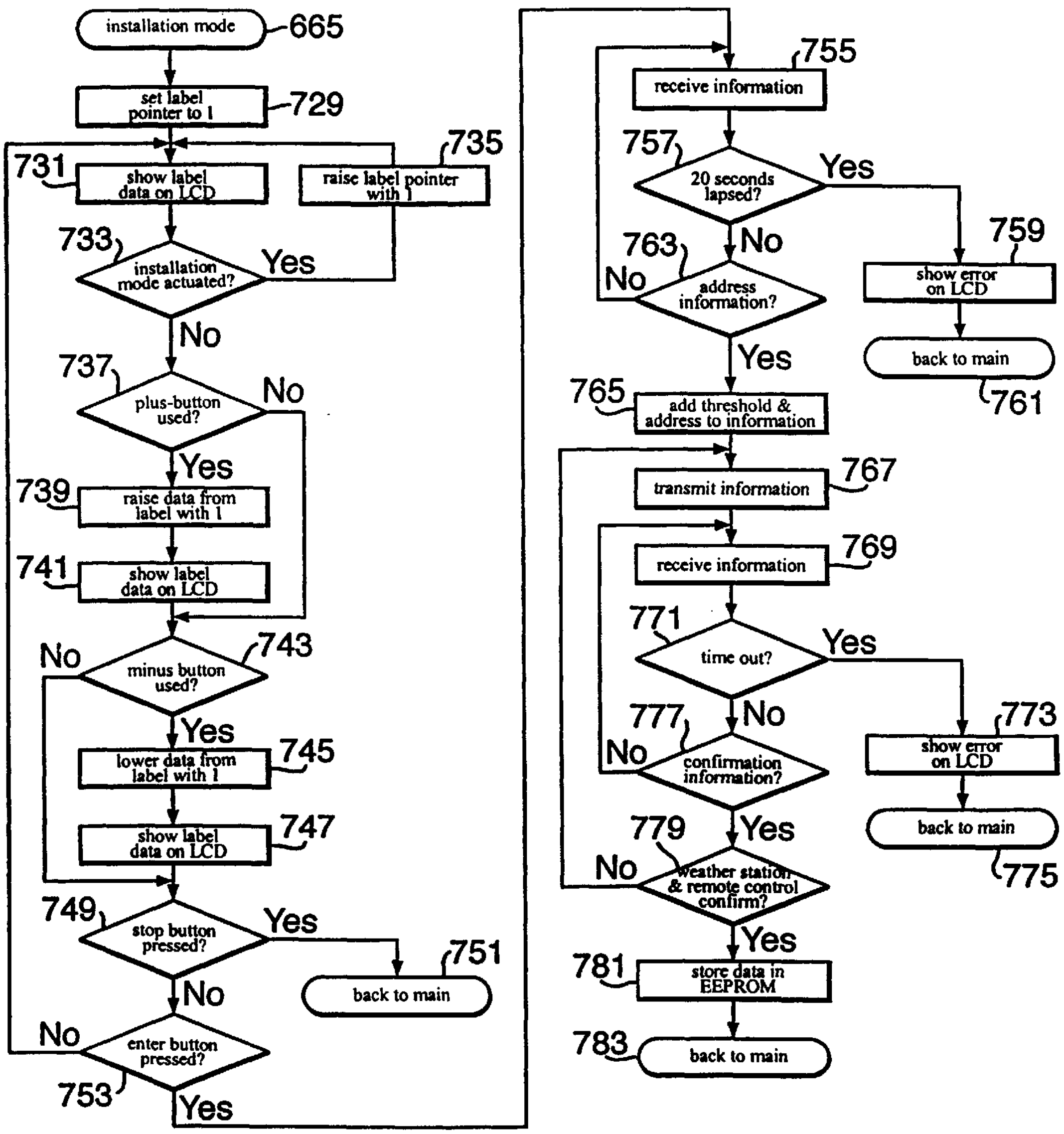
Figure 37:
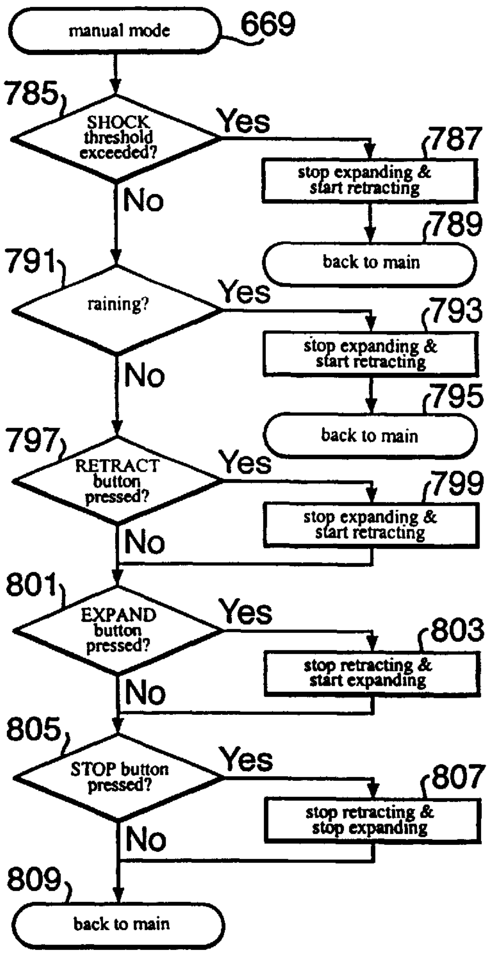
Figure 38:
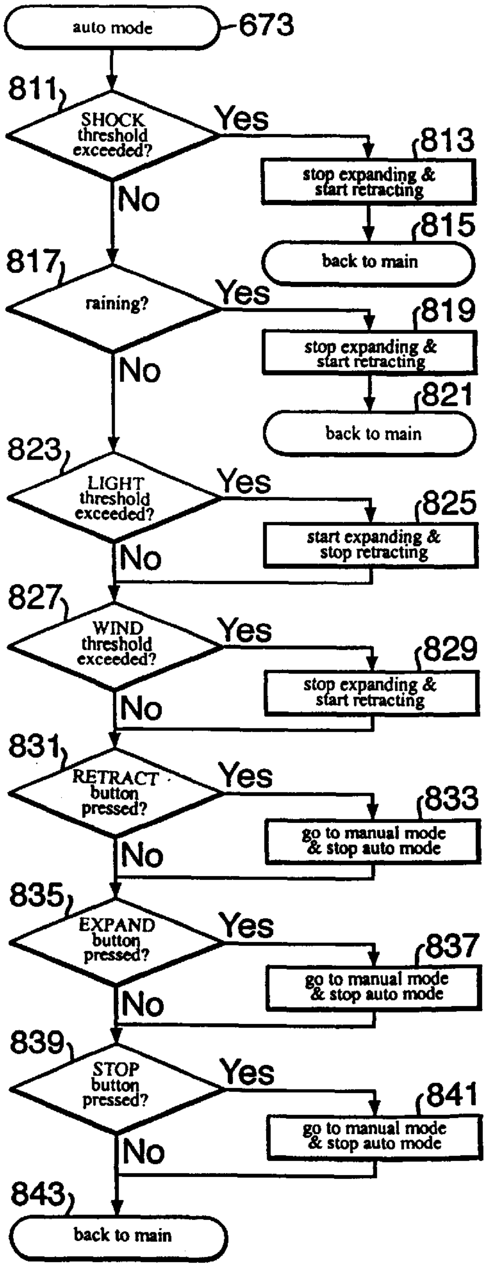
Figure 39:
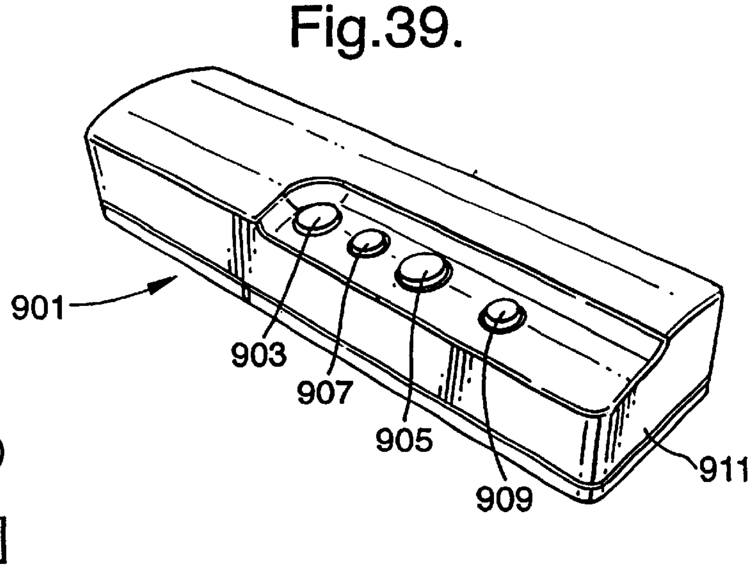
Figure 40:
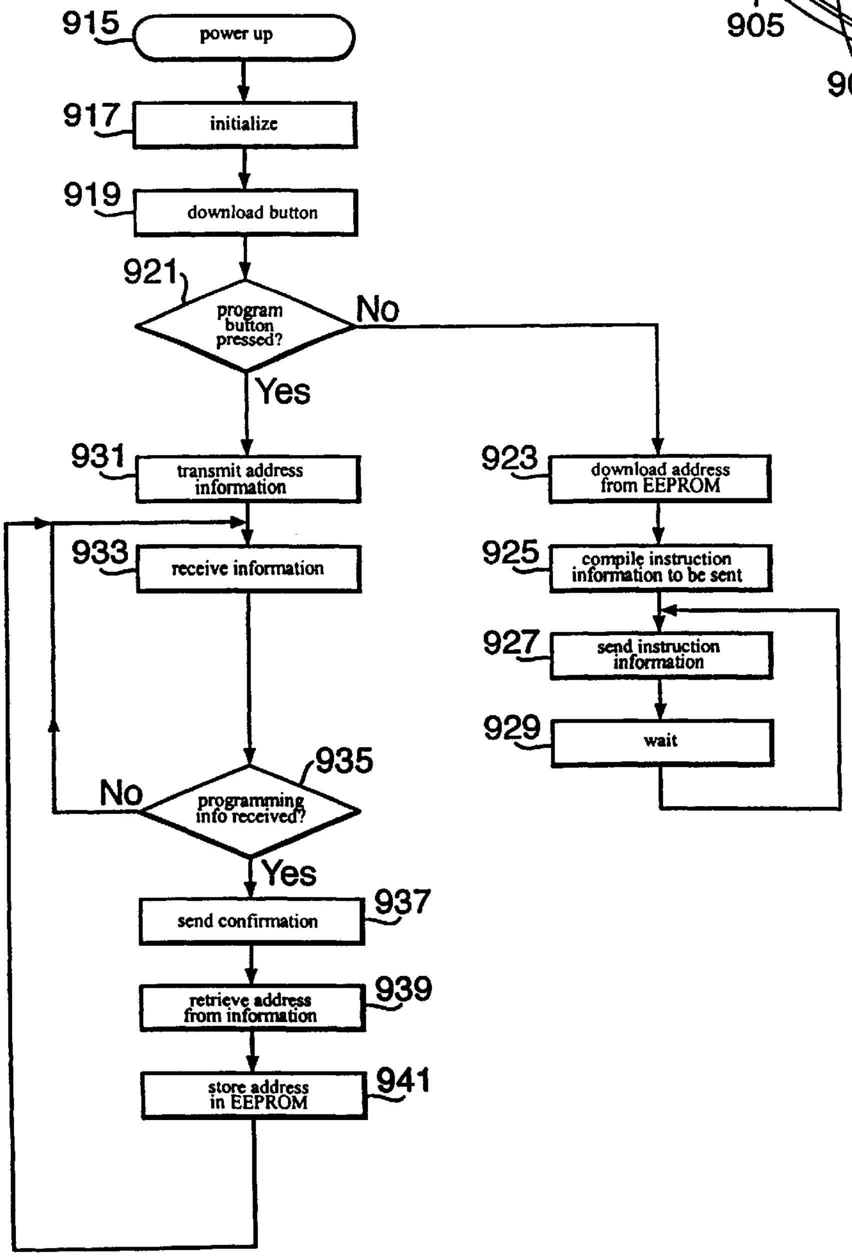
Figure 41:
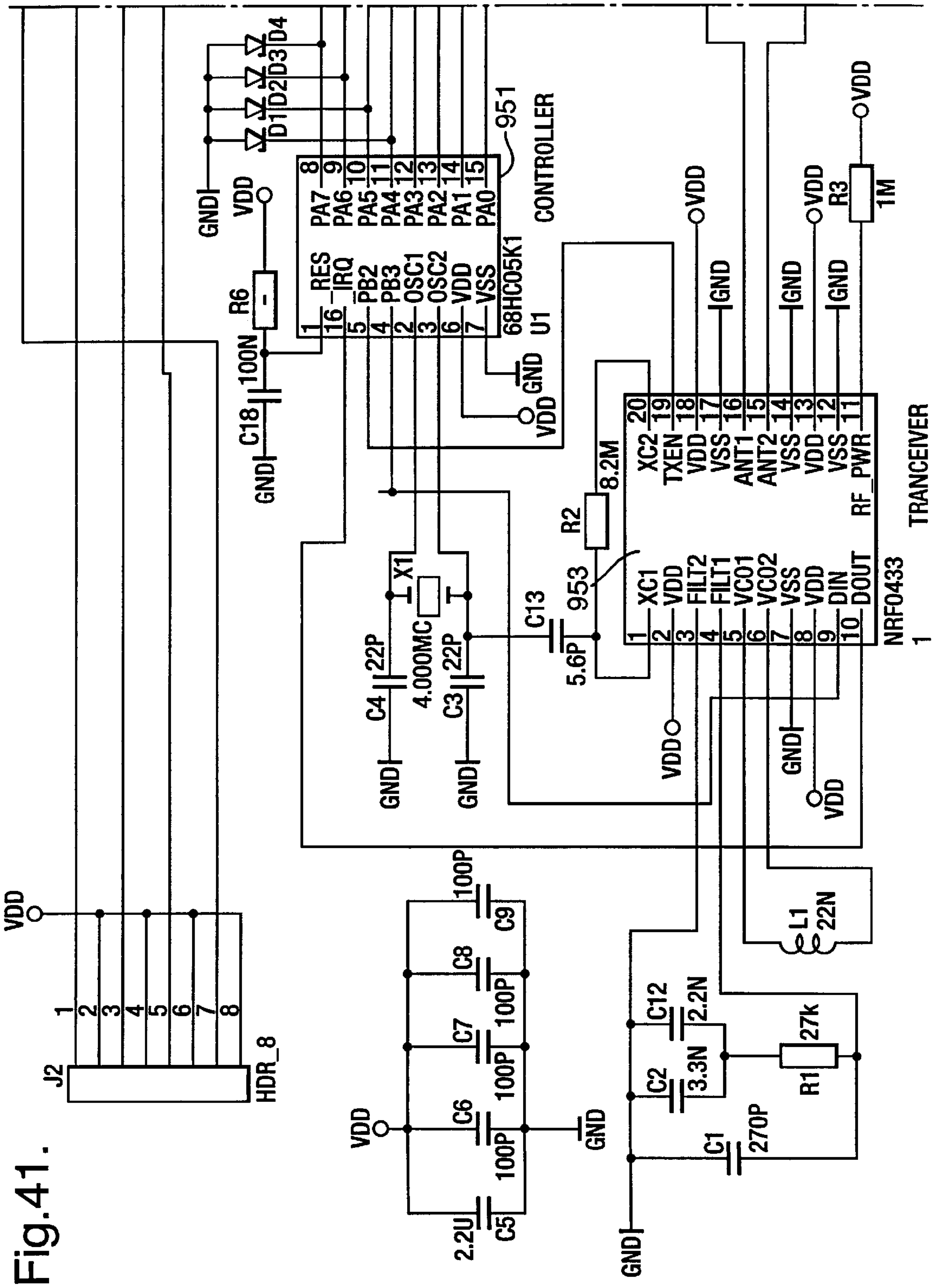
Figure 41:
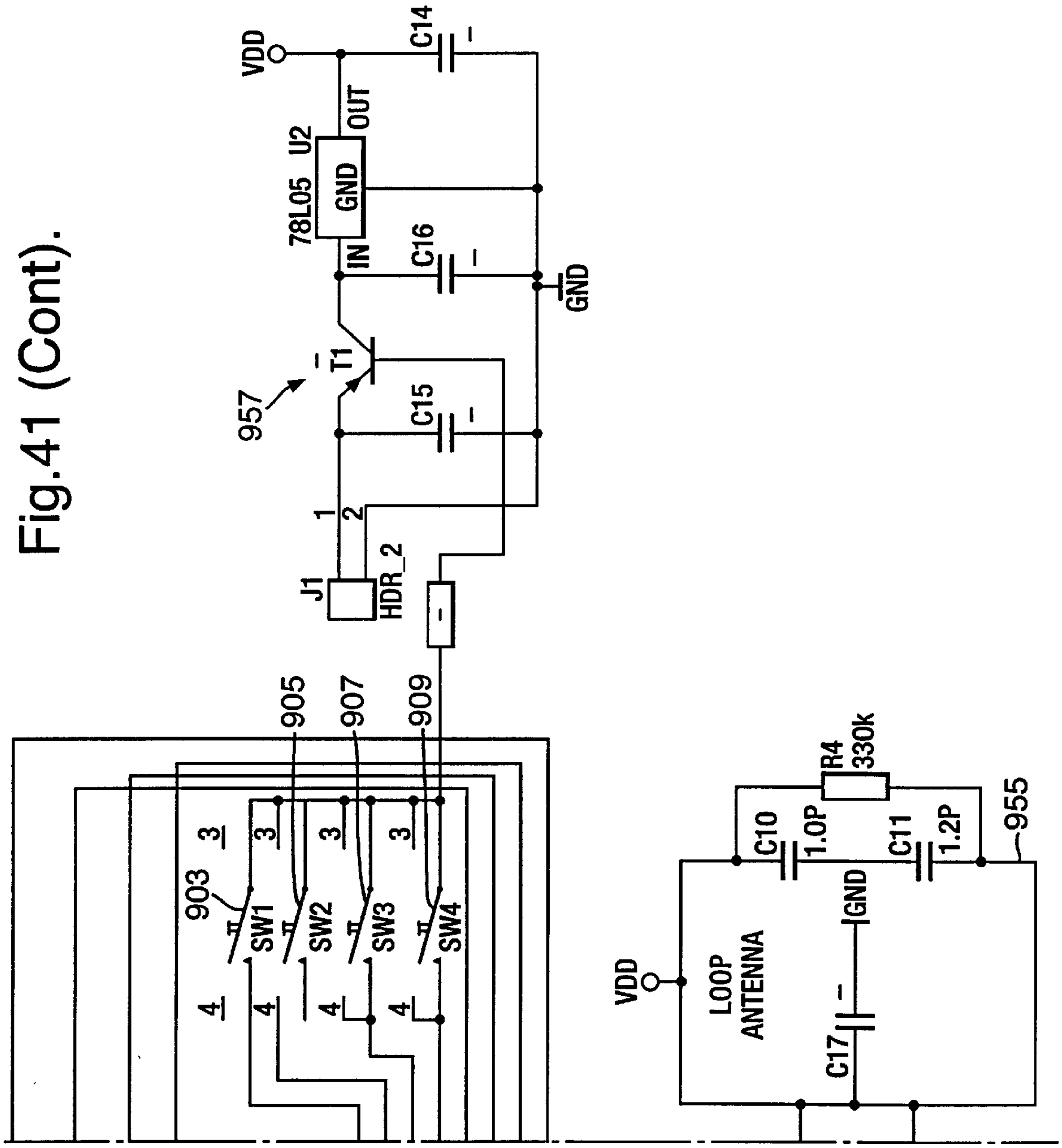
Figure 42:
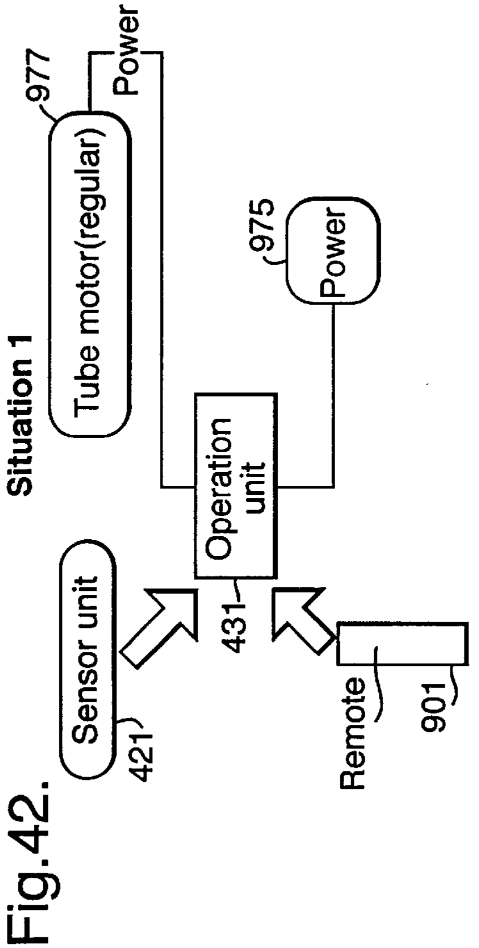
Figure 43:
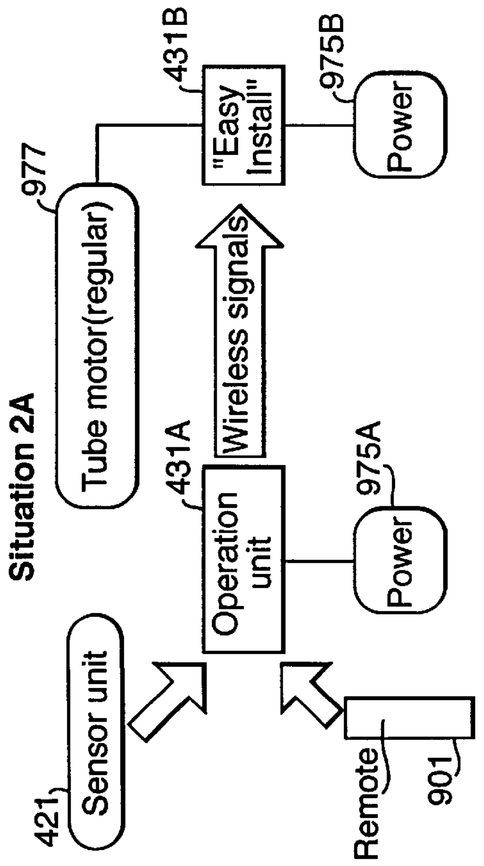
Figure 44:
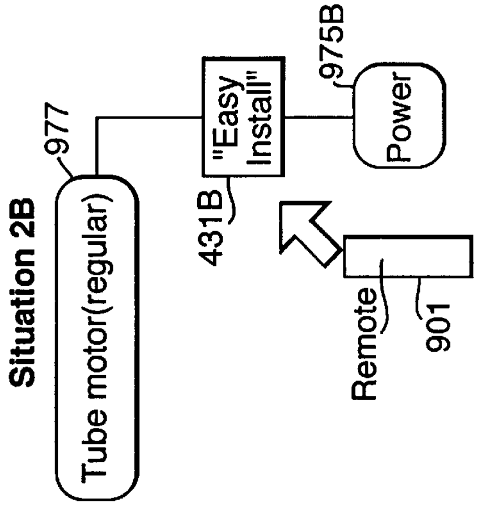

FIGS. **30*a* and 30*b* show an alternative schematic representation of the circuitry of the outdoor weather sensor unit of FIG. 28**;

FIG. 31 is a schematic representation of the low voltage section of the circuitry of the indoor control unit of FIG. 29;

FIG. **31*a* shows an alternative circuit arrangement to the low voltage circuitry of FIG. 31**;

FIG. 32 is a schematic representation of the high voltage section of the circuitry of the indoor control unit of FIG. 29;

FIG. **32*a* shows an alternative schematic representation of the high voltage section of the circuitry of the indoor control unit of FIG. 29**;

FIG. 33 is a flow chart of the operation of the processor of the outdoor weather sensor unit of FIG. 28;

FIG. 34 is a flow chart of the main program operation of the indoor control unit of FIG. 29;

FIG. 35 is a flow chart of the programming mode operation subroutine of the indoor control unit of FIG. 29;

FIG. 36 is a flow chart of the installation mode operation sub-routine of the indoor control unit of FIG. 29;

FIG. 37 is a flow chart of the manual mode operation sub-routine of the indoor control unit of FIG. 29;

FIG. 38 is a flow chart of the auto mode operation sub-routine of the indoor control unit of FIG. 29;

FIG. 39 is a top perspective view of an optional hand-held wireless remote control transmitter which can be used to operate the indoor control unit of FIG. 29;

FIG. 40 is a flow chart of the operation of the remote control transmitter of FIG. 39;

FIG. 41 is a schematic representation of the circuitry of the hand-held remote control transmitter of FIG. 39;

FIG. **41*a* is a further embodiment of the transmitter circuit of FIG. 41 and part of a remote control transmitter as shown in FIG. 39**;

FIG. 42 is a schematic representation of the arrangement of devices used with the above described embodiments;

FIG. 43 is a schematic representation of an alternative arrangement of devices used with the above described embodiments; and FIG. 44 is a schematic representation of a simplified arrangement of devices used with the above described embodiments.

In these Figures, corresponding parts in different embodiments are referred to by corresponding names and by the same last two reference numerals.

DETAILED DESCRIPTION OF THE INVENTION

Figure 1:
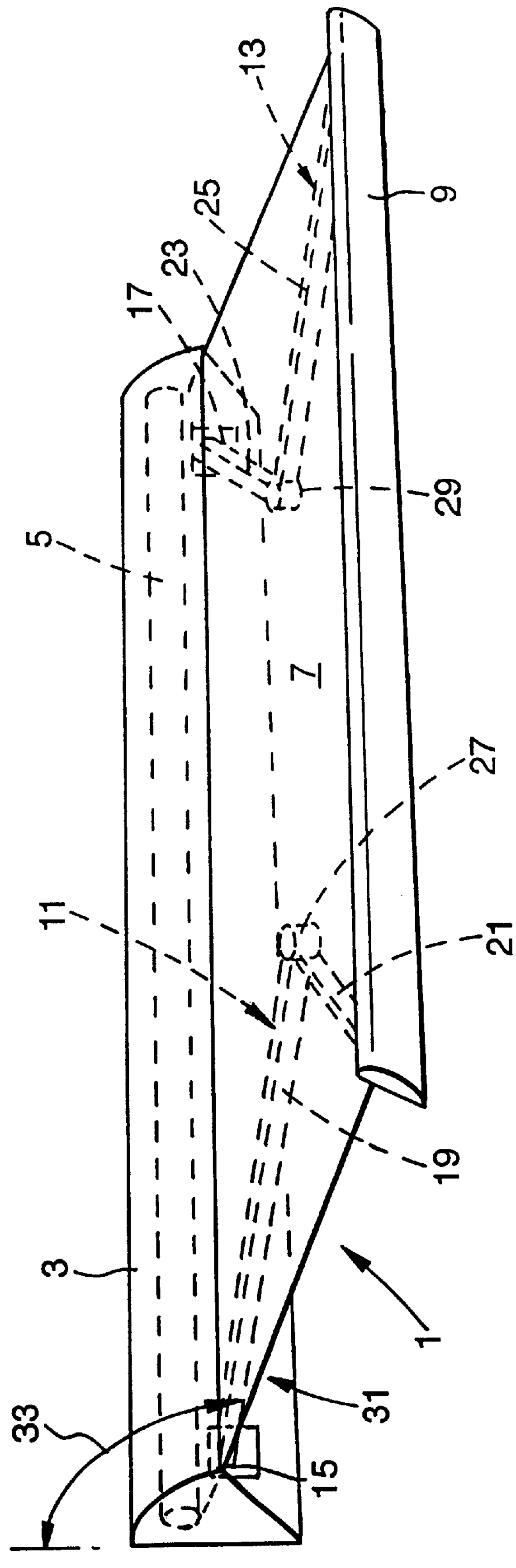
FIG. 1 is a general perspective view of a retractable arm awning of this invention in an extended position.

FIG. 1 shows a retractable arm awning 1 of the general type with which the present invention is concerned. The awning 1 of FIG. 1 has a wall mount cassette 3 housing a roller 5 from which a fabric cloth 7 in the extended position of the awning is extending and supported by a collapsible support system comprising a front bar 9 connected to a front edge of the fabric cloth 7 and two collapsible arms 11, 13. Each of the collapsible arms 11, 13 is hingeably mounted from a corresponding arm support bracket 15 and 17 respectively and comprises first and second pivoting arm sections 19, 23 and 21, 25 respectively. Each of the first and second arm sections are joined by a central pivot swivel 27, 29 respectively and the second arm sections 21, 25 are hingeably joined to the rear side of the front bar 9. The front bar 9 preferably, but not necessarily, is shaped as a lid to close the opening 31 in the cassette 3 from which the fabric cloth and collapsible frame extend, when the awning is in a retracted position.

The awning of FIG. 1 preferably includes some mechanism for adjusting the angle 33 at which the awning extends from a building wall (not shown).

FIGS. 2 through 5 schematically show different forms of arm support brackets as referred to by numerals 15, 17 in FIG. 1.

Figure 2:
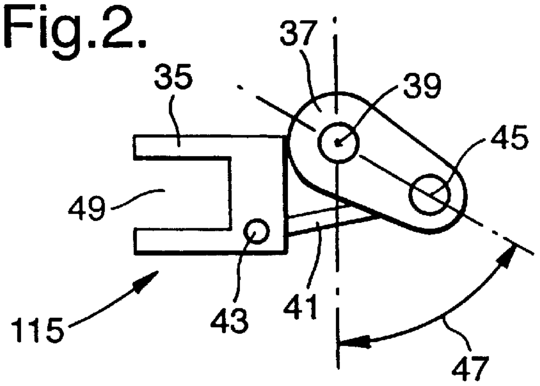
FIG. 2 is a schematic side view of a first embodiment of support bracket for the awning of FIG. 1.

FIG. 2 represents a first embodiment of arm support bracket 115 having a base part 35 and a link 37 pivotally attached thereto by means of pivot pin 39. The link 37 has means for pivotally attaching a first arm section 19 or 23 as will be discussed below but for clarity such means are deleted from FIGS. 2 through 5. A screw spindle 41, upon rotation by a suitable tool in either of two opposite rotational directions, adjusts the angle 47 between the vertical and the link 37 and thereby the angle of extension 33 as indicated in FIG. 1. The base part 35 has a square recess 49 at its rear end which can be attached over a square section bar extending along the width of the awning (not shown, but conventional in awnings).

Figure 3:
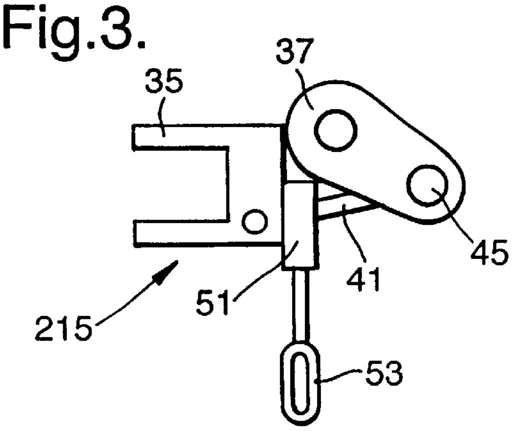
FIG. 3 is a schematic side view of a slightly modified, second embodiment of support bracket for the awning of FIG. 1.

FIG. 3 shows a slightly modified second embodiment of support bracket 215 which is generally identical to that of FIG. 2, but for the addition of a gear box 51 with an eyelet coupler 53 to be driven by an extension crank rod (not shown, but conventional in the operation of awnings). Driving the screw spindle 41 through gearbox 51 will allow ready angular adjustments by a conventional crank rod from a remote position that is convenient to the operator, rather than having to revert to tools.

Figure 4:
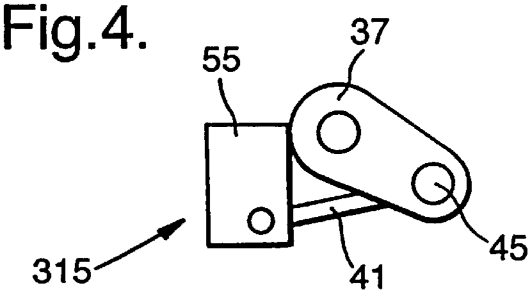
FIG. 4 is a schematic side view of a further, third embodiment of support bracket for the awning of FIG. 1.

FIG. 4 shows a further third embodiment of arm support bracket 315, which is generally very similar to the basic bracket 115 of FIG. 2. Support bracket 315 uses a different form of base part 55, which attaches directly to a building wall or to the structure of a wall mount cassette (numeral 3 in FIG. 1) without using any square section bar, such as in the previously described embodiments. In all other respects the angular adjustment through a screw spindle 41 is similar to that of FIGS. 2 and 3. Likewise the support bracket 315 of FIG. 4 could be modified with a gearbox 51 such as shown in FIG. 3 for the second embodiment 215.

Figure 5:
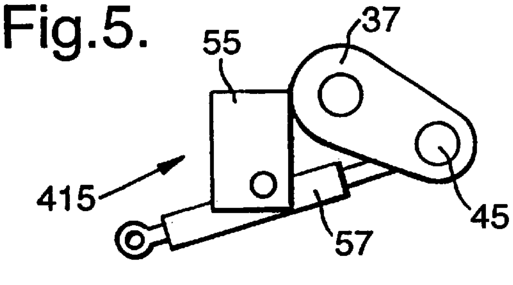
FIG. 5 is a schematic side view of a fourth embodiment of support bracket for the awning of FIG. 1.

Finally FIG. 5 shows as a fourth embodiment yet another form of support bracket 415, which does not use a screw spindle for angular adjustment. Support bracket 415 shown with a similar base part 55 as the bracket of FIG. 4 could alternatively also be provided with a base part 35 such as the bracket of FIG. 2 and 3. The angular adjustment of the link 37 of bracket 415 is effected by means of a lockable gas spring 57, which has one end attached to the bushing 45 and another end pivotally attached to a suitable fixed structure such as the building wall or to the base part 55. Locking gas springs of a suitable type are obtainable under the trade designation KALLER from Strömsholmen AB of Sweden or under the trade designation BLOC-O-LIFT from Stabilus of Germany. Such lockable gas springs not only provide the appropriate angular adjustment of the link 37 but also provide for cushioning of any forces acting on the awning in its extended position. Means for cushioning can also be incorporated in the bushing 45, but this will be described in reference to FIG. 10.

Figure 6:
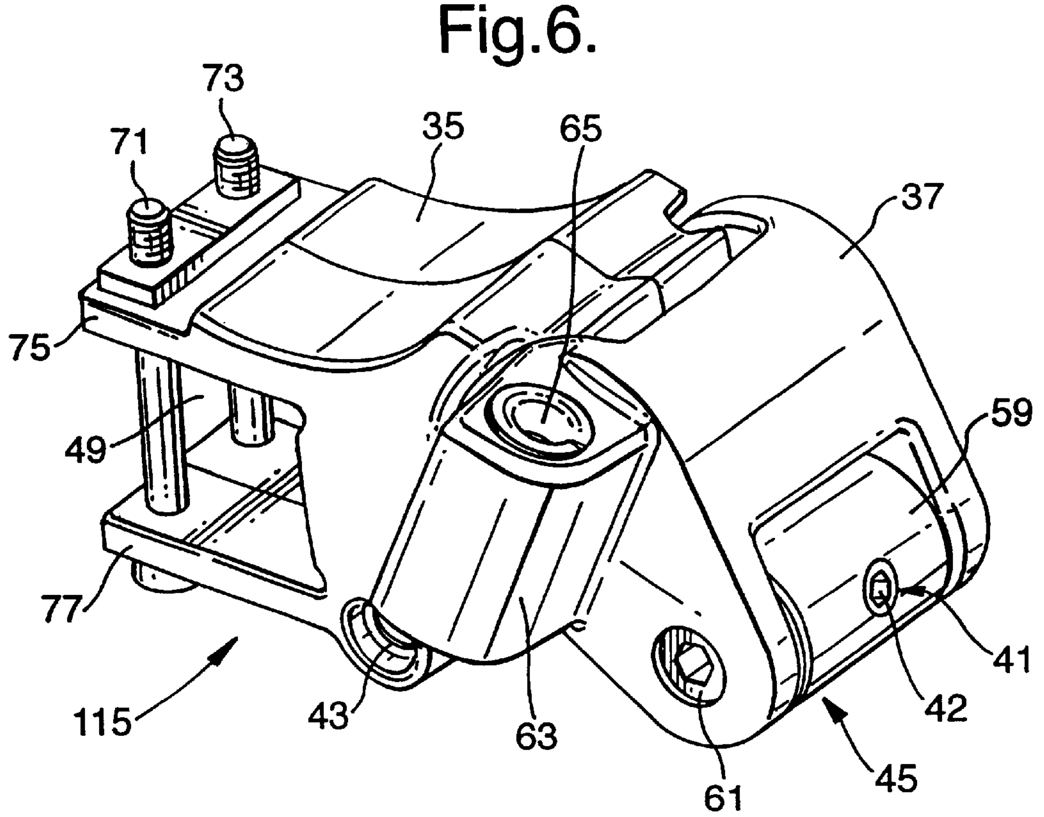
FIG. 6 is a detailed top perspective view of the first embodiment of support bracket of FIG. 2.
Figure 7:
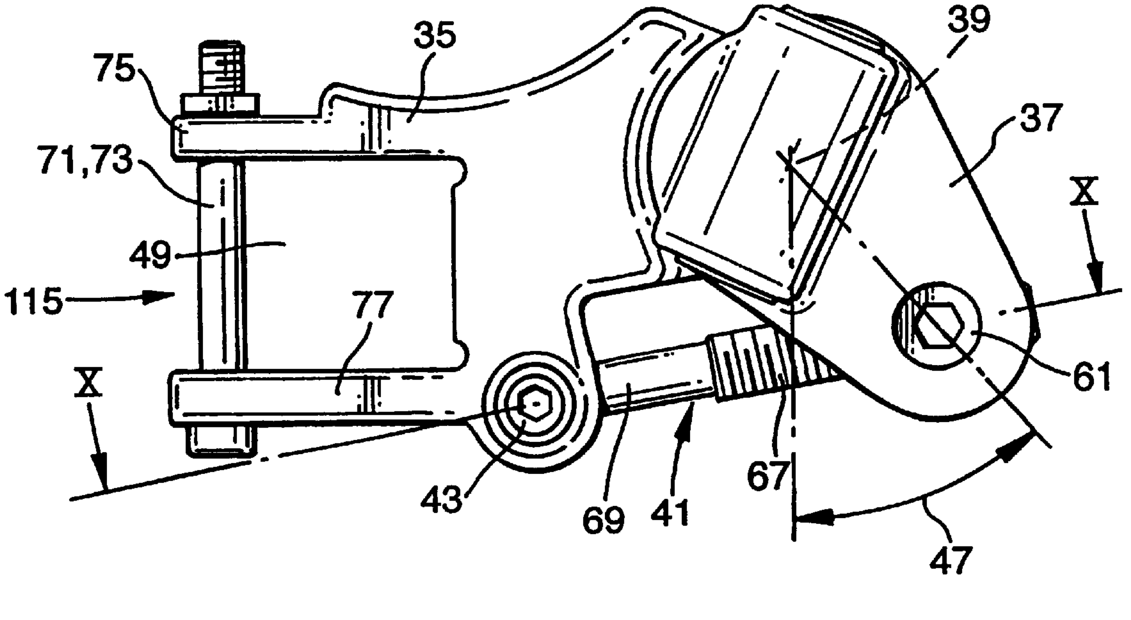
FIG. 7 is a detailed side elevation view of the support bracket of FIG. 6.

FIGS. 6 and 7 are a perspective top view and a side elevation respectively of the support bracket 115 of FIG. 2. The same reference numerals are used to denote the same parts. It is seen from FIG. 6 that the screw spindle 41 has a polygonal driving head 42 at a forward end protruding or reachably exposed through the bushing 45. Such a polygonal driving head 42 can be a hexagonal cavity which can be driven by a regular allen key wrench, but clearly other driving ends for other convenient tools known to the skilled person can be selected.

The bushing 45 is further shown to have a body 59 and a pivot pin 61, which conveniently can be screw threaded in the body 59 to be removable and hence be provided with a polygonal driving head or cavity. The link 37 is provided with a bearing section 63 with a through bore 65 for receiving a pivot pin for hingeably connecting the first pivoting arm sections (19 or 23 in FIG. 1) of a collapsible awing arm (11 or 13 in FIG. 1).

The link 37 of an awning can be made in right-hand and left-hand versions with the through bore 65 on different sides depending in the arc of movement of the awning arm, but it is also conceivable to use a single type of link with a through bore such as 65 on each opposite side.

FIG. 7 shows a side elevation of support bracket 115 generally similar to the embodiment of the schematic view of FIG. 2. Here it is seen that the screw spindle 41 can effectively define two sections 67 and 69. The first section 67 can be provided with a male screw thread and engage a female screw thread in the bushing 45. The second section 69 can have a non-circular cross section for driving engagement by either a tool or other driving means. It is further seen from FIGS. 6 and 7 that the rear end of the base part 35 is provided with screw fasteners 71, 73 spanning across the open ended square recess 49 for clampingly forcing the opposite legs 75, 77 together on a square bar or the like (not shown, but conventional) to attach the support bracket.

Figure 8:
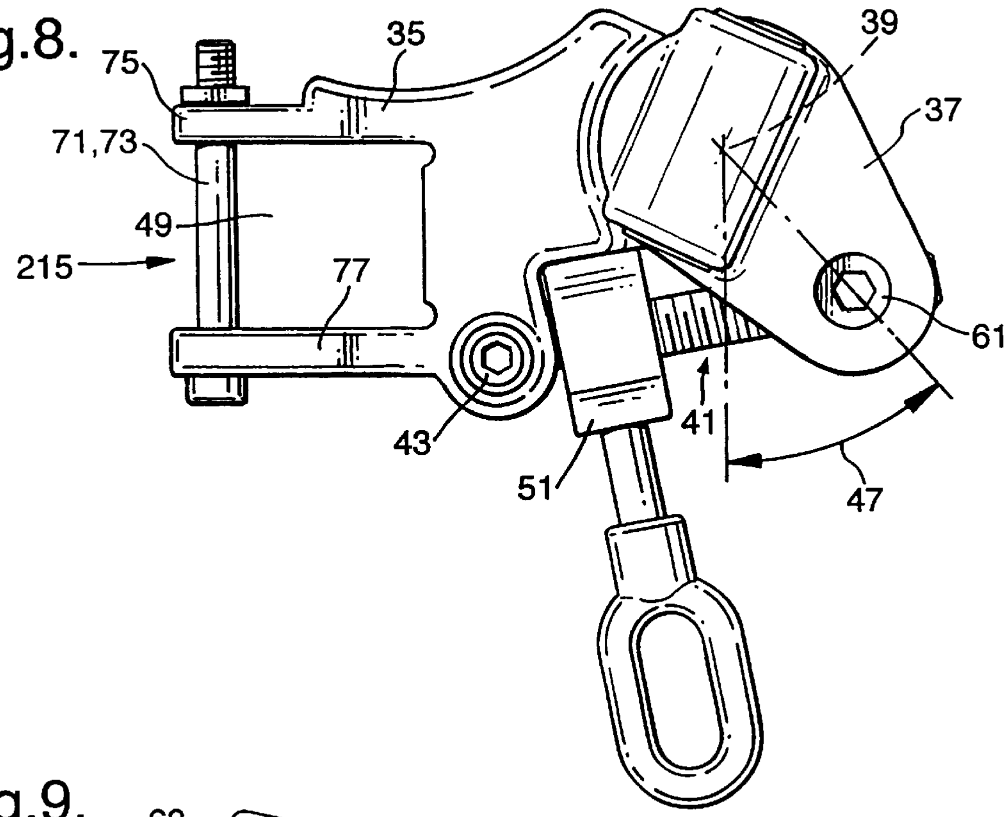
FIG. 8 is a detailed side elevation view of the second embodiment of support bracket of FIG. 3.
Figure 9:
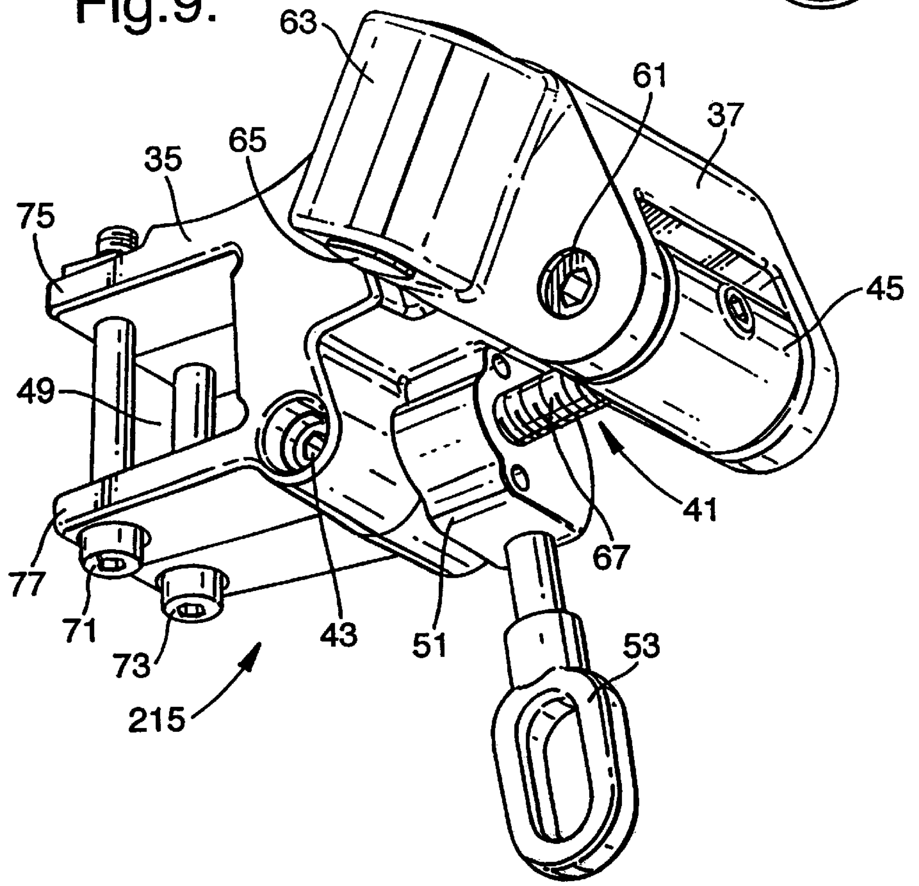
FIG. 9 is a detailed bottom perspective view of the second embodiment of support bracket of FIG. 8.

FIGS. 8 and 9 show a side view and a perspective bottom view, respectively, of the second embodiment of support bracket 215, also shown schematically in FIG. 3. Basically the embodiment of FIGS. 8 and 9 is identical to that of FIGS. 6 and 7, except for the addition of the gear box 51 engaging the screw spindle 41 and allowing adjustment thereof by driving the eyelet coupler 53. The reference numerals in FIGS. 8 and 9 are otherwise used identically to those in FIGS. 2, 6 and 7. It should be noticed in this regard that an existing embodiment according to FIGS. 6 and 7 can be modified by the addition of a gearbox 51 to the embodiment of FIGS. 8 and 9.

Figure 10:
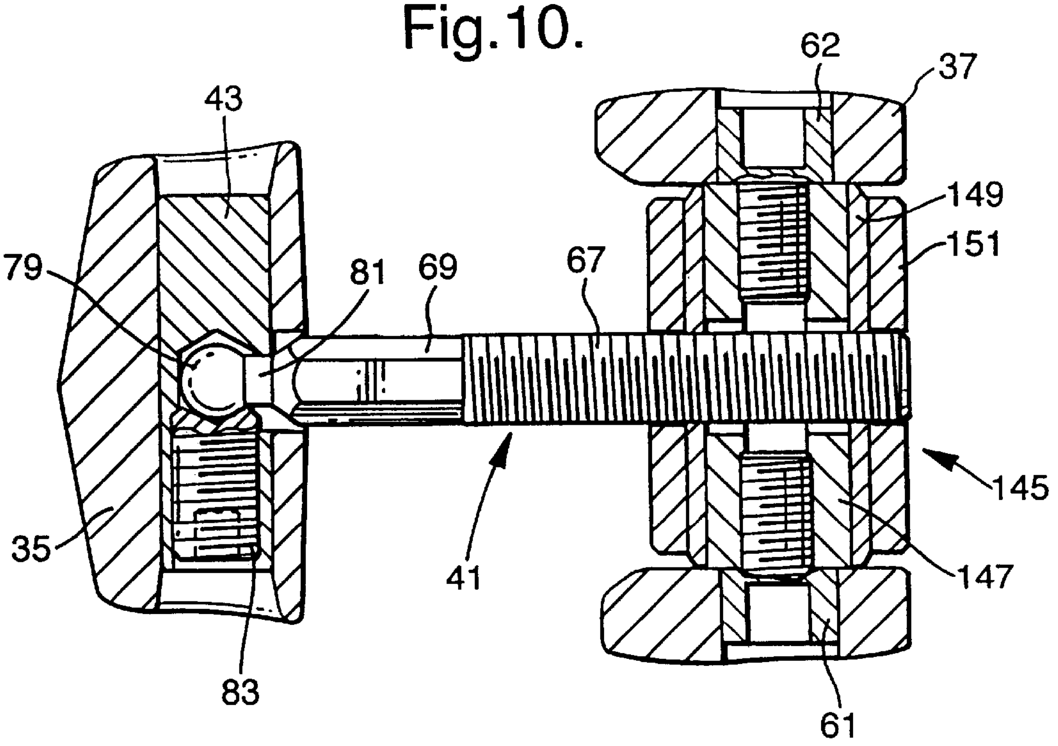
FIG. 10 is a cross-sectional view of the first embodiment of support bracket, taken along line X—X in FIG. 7.

FIG. 10 is a cross section of the support bracket 115 of the embodiment of FIG. 7 in the direction of arrows X—X and serves to illustrate a first optional form of bushing 145 suitable to replace any of the bushings 45 as described with respect to FIGS. 2 through 9. The bushing 145 comprises in a concentric arrangement a rigid inner bushing 147, a resilient intermediate bushing 149 and a rigid outer bushing 151. The outer bushing 151 carries female screw thread for engaging the male screw thread 67 of the screw spindle 41. The male screw threaded portion 67 of the screw is however freely movable through the inner bushing 147, which is pivotally retained in the link 37 by opposite screwed-in pivot pins 61, 62.

Any forces that act on the link 37 in the axial direction of the screw spindle 41 will be cushioned by the resilient intermediate bushing 149 and thereby would prevent damage to the screw spindle or its mounting in the base part 35.

With respect to the mounting of the screw spindle 41 in the base part 35, FIG. 10 also serves to illustrate a feature shared in common with the other embodiments but not yet visible in any of the previous illustrations. The second section 69 of the screw spindle 41, having a hexagonal cross-section for engagement by the gearbox 51 or the like drive means, is further provided with a ball shaped head 79 which is engaged in an axial cavity of the transverse pin 43. An intermediate neck portion 81 can extend from the cavity and be position therein through an axial slot coextending with the axial cavity in the transverse pin 43. Once engaged in the cavity of the transverse pin 43, the ball shaped head 79 is retained therein by a locking screw 83.

Figure 11:
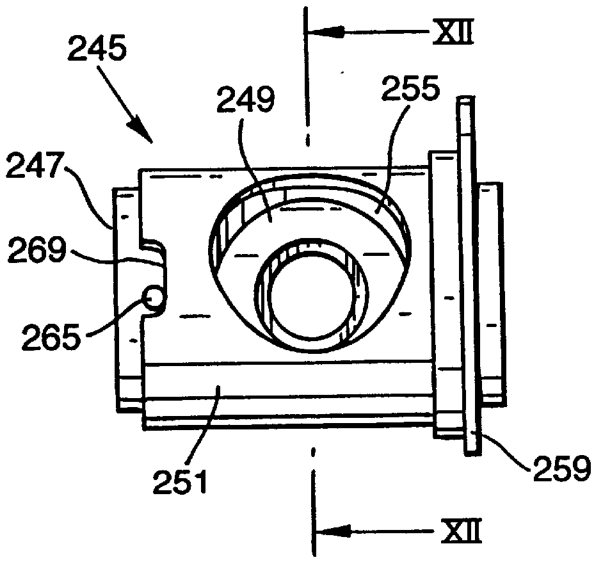
FIG. 11 is a is a front elevation view of an optional alternative embodiment of the bushing of the support bracket of FIGS. 7 and 10.
Figure 12:
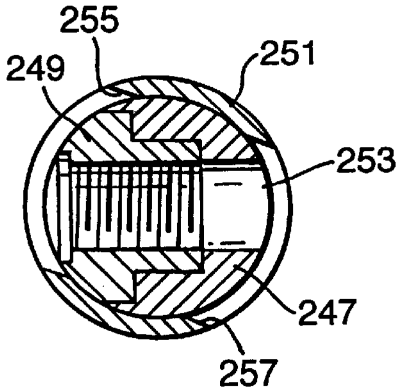
FIG. 12 is a vertical cross-sectional view of the bushing of FIG. 11.
Figure 13:
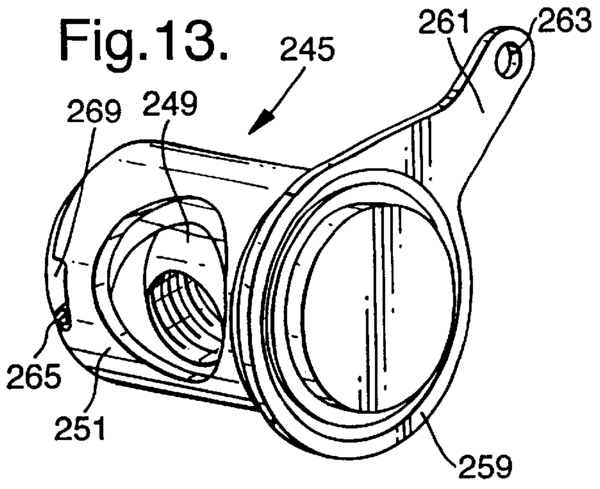
FIGS. 13 and 14 are perspective view from opposite sides of the bushing of FIG. 11.
Figure 14:
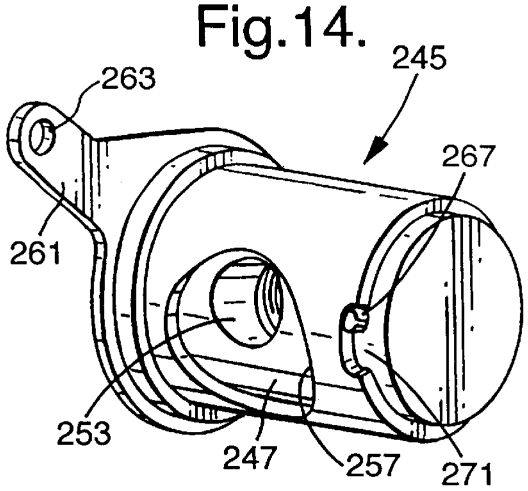

FIGS. 11 through 14 show yet another second optional embodiment 245 for the bushing (generally numbered 45 in FIGS. 2 through 9). It is sometimes desirable that a particular adjusted angle of extension (angle 33 in FIG. 1) and hence the angle of link 37 (angle 47 in FIGS. 7 and 8) is cancelled when the collapsible arms (11, 13 in FIG. 1) reach the retracted position, so that the front bar (9 in FIG. 1) may abut against and close the cassette opening (31 in FIG. 1) in a predefined angular orientation. One such mechanism is described in GB 2042058 and uses a transversely movable locking bolt which is moved by the awning arm through a linking rod. It has been found that transverse movement of such a locking bolt can be somewhat difficult if this is at the same time also forced against the screw spindle element. The bushing arrangement 245 of FIGS. 11 through 14 can overcome this drawback and would also result in a very compact arrangement. To this end the bushing 245 has an inner bushing 247 and a concentric hollow outer bushing 251. Accommodated in a cavity of the inner bushing is threaded nut 249 adapted to engage the screw-threaded section 67 of the screw spindle 41. The nut 249 as best shown in FIG. 12 is also contoured to allow accommodation within the hollow interior of the hollow outer bushing 251. The inner bushing 247 is provided with an opening 253 large enough to allow unhindered axial movement of the screw spindle 41, but small enough to prevent passage of the nut 249. The outer bushing 251 is provided with a first perimeter opening 255 of a size large enough to allow passage of the nut 249. The outer bushing 251 is also provided with a second perimeter opening 257 on an opposite side and aligned with the first perimeter opening 255. The second perimeter opening 257 is of a size large enough to allow certain relative rotational movement of the outer bushing 251 in respect of the inner bushing 247 with the screw spindle 41 in position and extending through the second perimeter opening 257. All of FIGS. 11 through 14 show the bushing element 247 and the outer bushing 251. If upon retraction of the awning the outer bushing 251 were rotated from the position shown in FIG. 12 to a position in which the nut 249 could escape through the first perimeter opening 255, then the locked position of the link (37 in FIGS. 2 through 10) would be cancelled for the purpose described herein above. To this end the outer bushing 251 may be provided with a flange portion 259 in one of its axial ends, from which flange portion a lever arm 261 may extend (see in particular FIGS. 13 and 14). The lever arm 261 may have an opening for engagement by a linking rod or the like (not shown, but known to the skilled person from GB 2042058) operatively connecting it to a confronting awning arm. Although the angular rotational movement of the outer bushing 251 may optionally be limited by the size of the second perimeter opening 257 and the screw spindle 41 extending therethrough it may also be convenient to have a separate indexing means for this. As shown in FIGS. 11, 13 and 14 such indexing means may comprise one or more radially extending pins 265, 267 on the inner bushing 247 and one or more corresponding annular recesses 269, 271 on the outer bushing 251.

Figure 15:
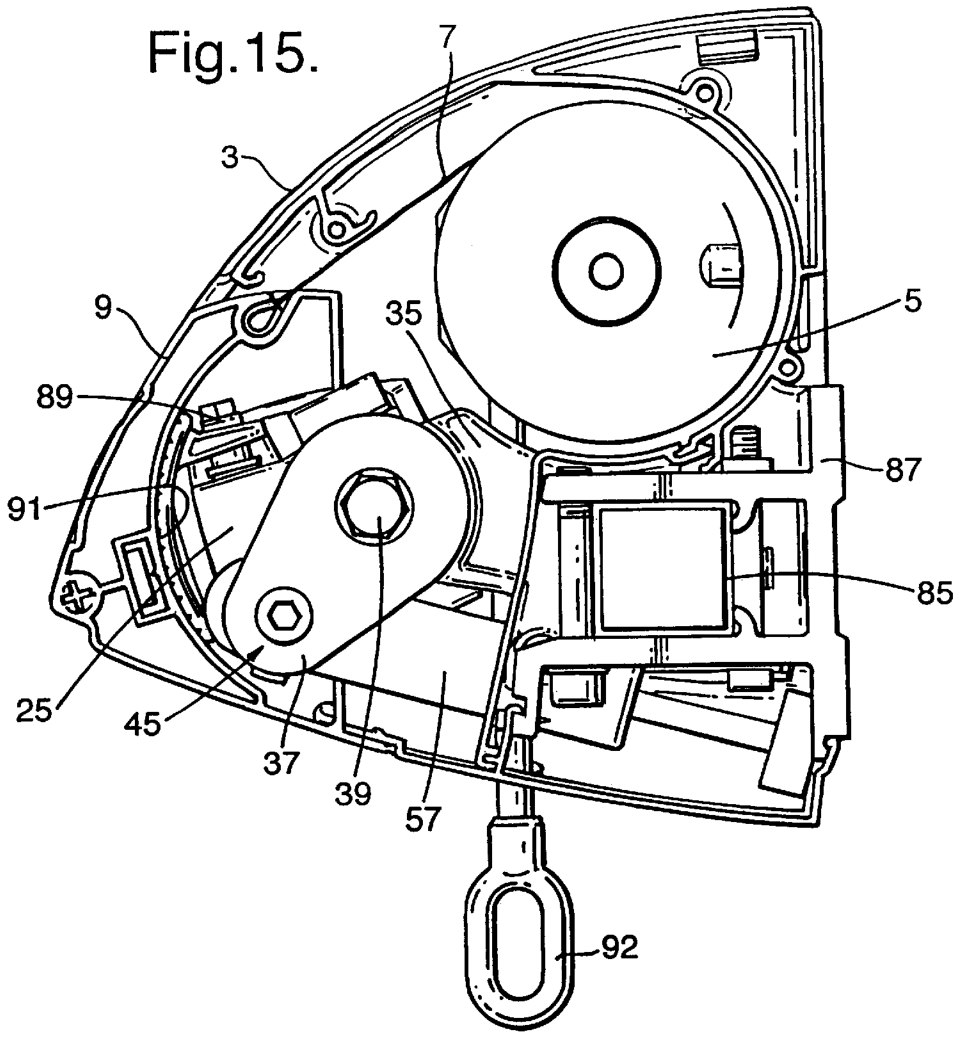
FIG. 15 is a vertical cross-sectional view of the awning of FIG. 1 in a retracted position.

FIG. 15 shows a cross section through one form of awning according to the present invention, which is shown in a retracted position. In this position the front bar 9 acts as a lid to close the forward opening of cassette box 3, which houses the entire awning mechanism in its retracted position. It is seen that the cassette 3 houses a roller 5 on which the awning cloth is wound. A square section bar or rod 85 is used in this embodiment to mount the various awning components, notably the arm support brackets.

A wall mount bracket 87 is used to fix the square section bar 85 in position with respect to a vertical building surface (not shown, but conventional and known to the skilled person). The square bar 85 further receives at least two base parts 35 of the appropriate arm support brackets (15 and 17 in FIG. 1). FIG. 15 also illustrates a version of awning incorporating a lockable gas spring 57 such as schematically shown in the embodiment of FIG. 5. This gas spring 57 is of an appropriate type as supplied by the firms of Stabilus or of Strömsholmen AB is of a variety that can be locked in any desired position of telescopic adjustment in a manner commonly found in adjustable office seats and typing chairs. Further FIG. 15 shows the attachment of the front bar 9 to the second section 25 of the collapsible awning arm. To this end the second section 25 carries a front pivot pin 89 onto which an arcuate mounting plate 91 is hingeably mounted. The mounting plate is affixed by suitable fasteners (not shown but conventional) to a correspondingly inwardly arcuate rear surface of the front bar 9. The abutting arcuate surfaces of the mounting plate 91 and the front bar 9 allow for accurate angular adjustment of the front bar 9, so that it closes the cassette 3 in the correct orientation.

Also shown in FIG. 15 is another eyelet coupler 92 through which the awning can be driven into an extended position or from an extended position to a retracted position by means of a conventional crank rod (not shown). The eyelet coupler 92 through a shaft and an appropriate gear transmission drives the roller 5 in a conventional manner to wind or unwind the awning cloth. Extension of the awning cloth will further be promoted in that the collapsible awning arms are resiliently biased towards the extended position as will be further explained herein below. The skilled person will also instantly recognise that the roller 5 can be driven by any electric motor, such as through a tube-type motor or the like. Suitable motors are widely available for this purpose from amongst others the firms of: ELERO Antriebs- und Sonnenschutztechnik GmbH, Becker-Antriebe GmbH or SOMFY.

Figure 16:
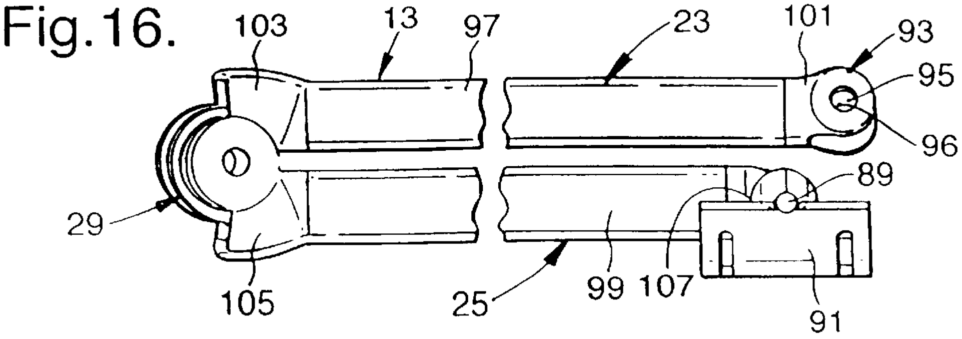
FIG. 16 is a top elevation view of one of the articulated arms of the awning of FIG. 1 in a retracted position.

For a description of a suitable collapsible arm for use in a collapsible frame according to the invention reference will now be made to FIGS. 16 though 27. FIG. 16 shows a top plan view of a collapsible awning arm corresponding to awning arm 13 of FIG. 1.

Arm 13 has a first pivoting section 23 and a second pivoting section 25. The first and second pivoting sections are joined to one another by a central pivot swivel 29 and the front pivot pin 89 connects mounting plate 91 to an opposite end of the second pivoting section 25.

An end of the first arm section 23 opposite of the central pivot swivel 29 carries a forked end 93 for hingeably attaching to the bearing section 63, as shown in FIGS. 6 through 9, of any of the arm support brackets. In this regard a hinge pin (not shown, but conventional) will be inserted through respective openings 95, 96 in an aligned arrangement with the through bore 65 of one of the arm support brackets 115, 215, 315 or 415. The first and second arm sections 23, 25 each comprise a length of tubular profile 97, 99 respectively, which can each be of an appropriate length in relation to the desired drop of the awning and the extended length of the awning cloth (7 in FIGS. 1 and 15). The variability of the arm length is indicated by interruptions of the tubular profiles 97 and 99 in FIGS. 16 through 19.

Figure 17:
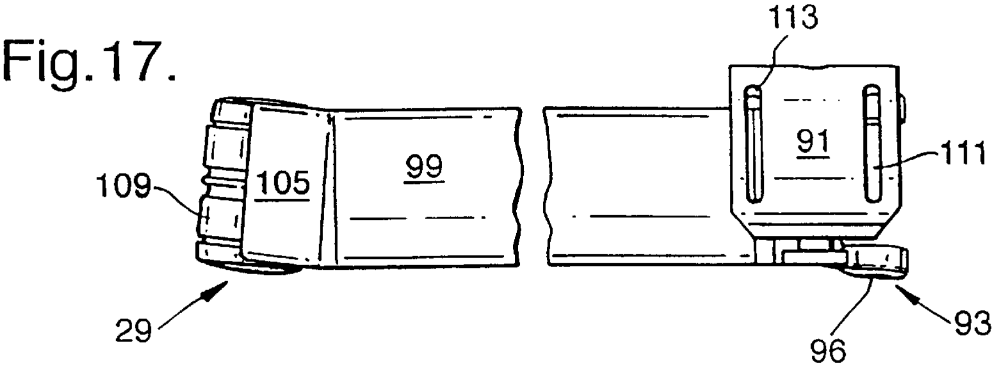
FIG. 17 is an elevation view of the arm of FIG. 16.
Figure 18:
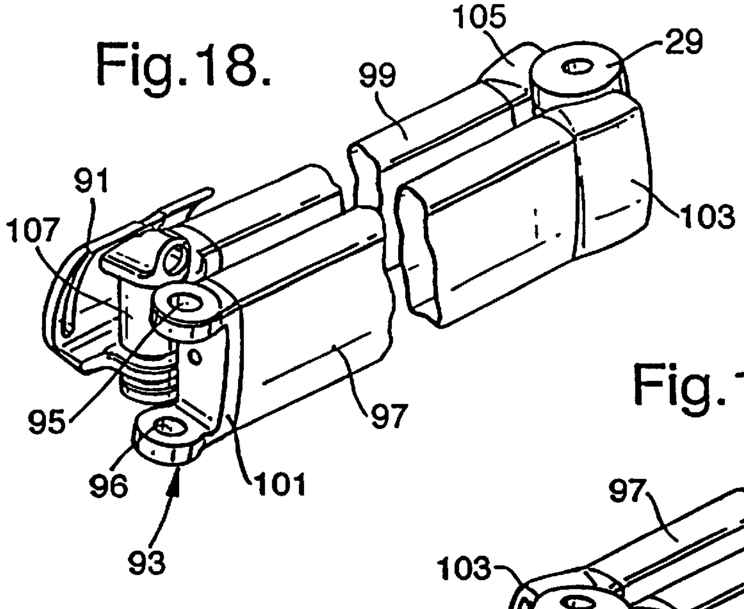
FIGS. 18 and 19 are perspective view from opposite sides of the arm of FIG. 16.
Figure 19:
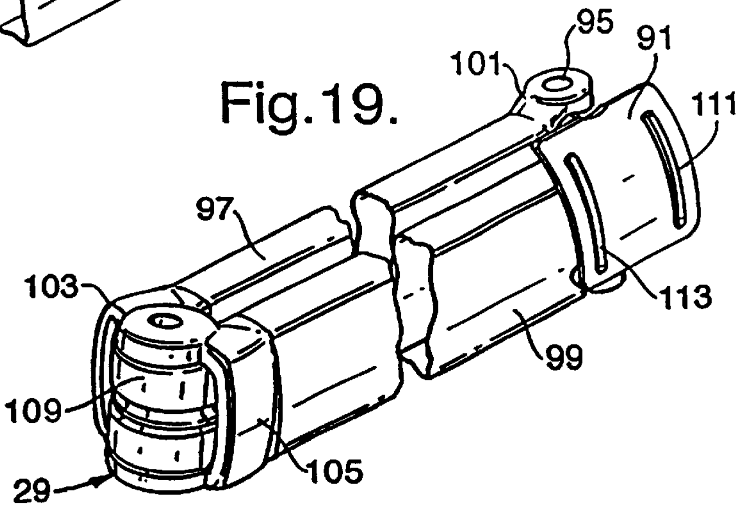

The forked end 93 is in the form of a first end plug element 101, which partly engages into the hollow interior of the tubular profile 97. The central pivot swivel 29 is an assembly of second and third plug elements 103, 105. The front pivot pin 89 and mounting plate 91 are hingeably mounted on yet another, fourth plug element 107. FIG. 17 shows a front elevation of the awning arm of FIG. 16 and FIGS. 18 and 19 show perspective views of the same awning arm from opposite directions. FIG. 17 allows the recognition of a spring tensioned flexible element 109 which extends around the central pivot swivel and which biases the first and second arm sections 23, 25 towards a straightened longitudinally aligned position. The flexible element 109 can be spring tensioned by one or more tension springs housed in one or each of the tubular profiles 97 and/or 99 in a conventional manner. Suitable arrangements for biasing awning arms into an extended position are described a.o. in GB 1175723; EP 0125727; EP 0489186 and EP 0795660. In particular these documents show the arrangement of tension springs and the use of different forms of flexible elements, such as cables; chains and flexible belts or strips. The skilled person may additionally be aware of still further suitable constructions and further description is considered therefor to be redundant.

FIGS. 17 and 19 in particular show that the arcuate mounting plate 91 is provided with vertically extending arcuate slots 111, 113. The slots 111,113 can receive fasteners for adjustably attaching the front bar 9 (FIGS. 1 and 15) to the mounting plate 91.

Figure 20:
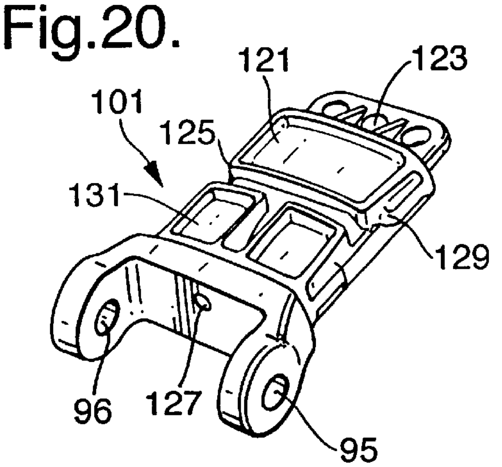
FIGS. 20 and 21 are perspective view from opposite sides of a first, rear end plug element of a rear section of the arm of FIG. 16.
Figure 21:
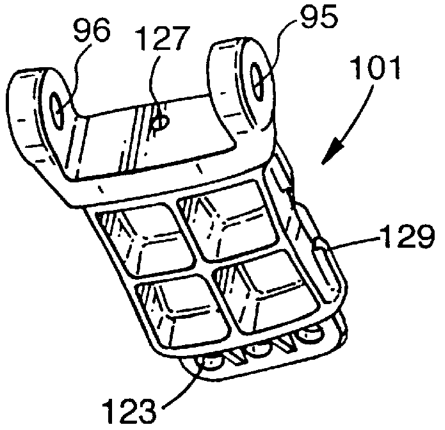

FIGS. 20 and 21 show perspective views from opposite directions of the first end plug element 101, before it is mounted in the tubular profiles (97 in FIGS. 16 through 19). Such a component can be conveniently formed as a moulding in metal or optionally plastic. The first end plug 101 includes a plug-in end 121, which can additionally be provided with anchoring openings 123 for attachment of an arm biasing tension spring (not shown, but described in GB 1175723; EP 0125727; EP 0489186 and EP 0795660. Also provided on the plug in end 121 is a generally T-shaped channel arrangement 125 which is in communication with an opening 127. The opening 127 will be in an exposed position after mounting of the first end plug 101 in the tubular profile 97. The T-shaped channel arrangement 125 can be extended along the edges of the plug-in end at 129 and 131. The opening 127 and channel arrangement are for a purpose to be explained in reference to FIG. 27 below.

Figure 22:
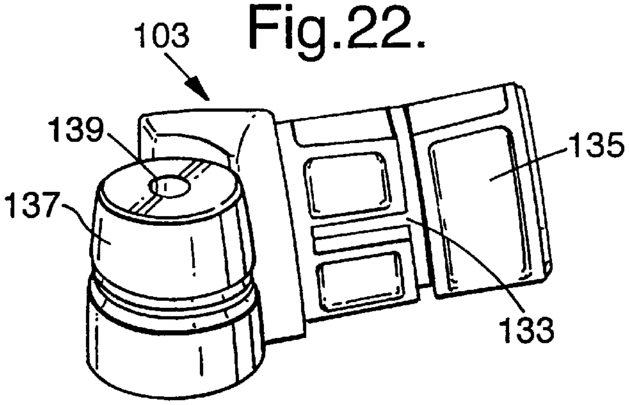
FIG. 22 is a perspective view of a second, front-end plug element of a rear section of the arm of FIG. 16, forming part of the central pivot swivel.

FIG. 22 shows the second plug element 103 which forms part of the central pivot swivel 29. The second end plug element 103 is provided with a T-shaped channel arrangement 133 similar to that of the first plug element described in reference to FIGS. 20 and 21. The channel arrangement 133 is on a similar plug-in end 135 and communicates with an exposed opening (similar to 127 of FIGS. 20,21 but not visible in the view according to FIG. 22). It is further apparent from FIG. 22 that the second plug element 103 is provided with a hinge body 137 having a central hinge bore 139 for co-operation with the third plug element 105 illustrated in FIG. 23.

Figure 23:
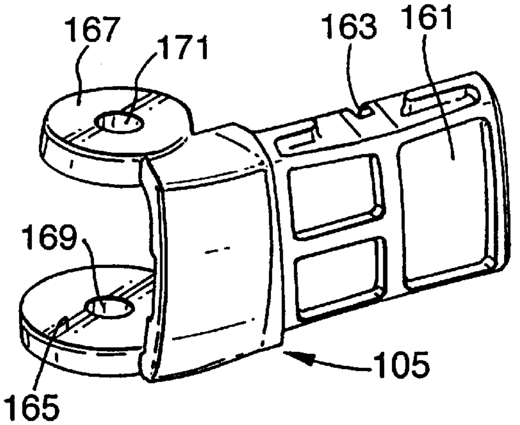
FIG. 23 is a perspective view of a third, rear end plug of a front section of the arm of FIG. 16, forming part of the central pivot swivel.

The third plug element 105 illustrated in FIG. 23 is provided with a plug-in end 161 which is generally similar to the plug-in end 135 of FIG. 22, but shown from an opposite side. A similar T-shaped channel arrangement 163 is provided on the plug-in end 161, but most of it is positioned on the reverse side, which is not visible in the view of FIG. 23. Also, in the third plug element 105 the channel arrangement will be communicating with an opening similar to opening 127 of FIGS. 20 and 21 but this again is hidden from view in FIG. 23. Since these features are generally identical to those already described in reference to FIGS. 20 through 22, and will be further explained in reference to FIG. 27, further description at this point is considered unnecessary. FIG. 23 also shows that element 105 is further provided with hinge ears 165, 167 for receiving the hinge body 137 therebetween. Further, the hinge ears 165, 167 are each provided with a relevant opening 169, 171 for alignment with the central hinge bore 139 whereupon a conventional hinge pin (not shown) can be inserted to hingeably connect the second and third plug elements 103, 105.

Figure 24:
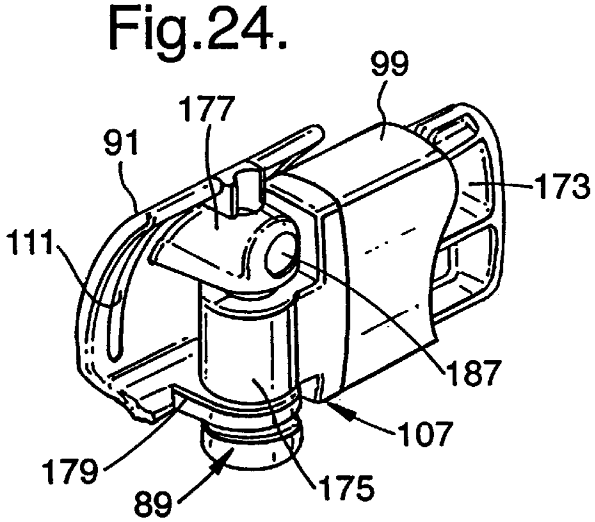
FIG. 24 is a perspective view of a fourth, front-end plug of a front section of the arm of FIG. 16.
Figure 25:
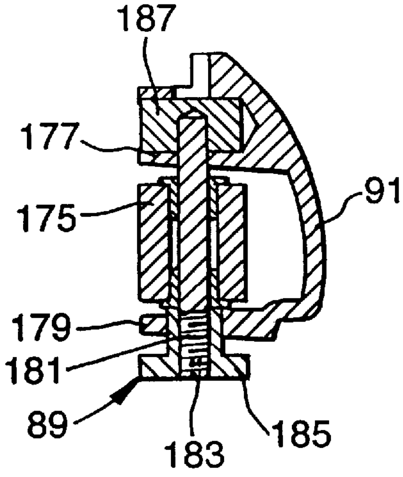
FIG. 25 is a vertical cross-sectional view, taken along line XXV—XXV in FIG. 26, of the front-end plug of the front arm section of FIG. 24.
Figure 26:
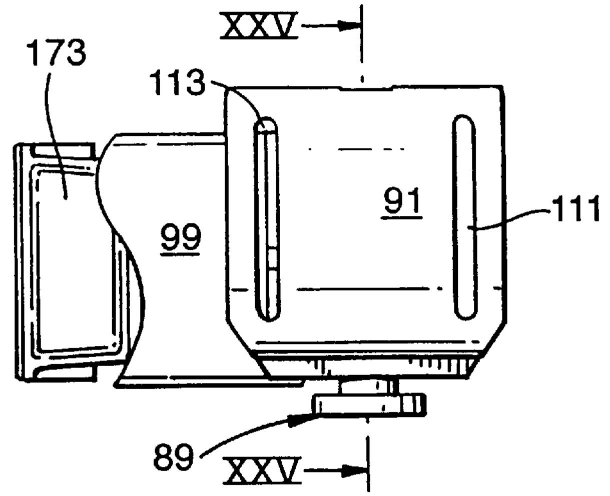
FIG. 26 is an enlarged fragmentary elevation view of the front-end plug of the front arm section of FIG. 24.

FIGS. 24 through 26 show an assembly of the fourth plug element 107 and mounting plate 91. FIG. 24 generally also shows the front pivot pin 89 which can have an additional angular compensation feature that will be explained in reference to FIG. 25. FIG. 24 further shows that the fourth plug element 107 also has a plug-in end 173 by which it can be inserted into the tubular profile 99, which is partly broken away to show this. The plug-in end 173 is again substantially similar to those described in reference to the structures of FIGS. 20 though 23 and further features thereof will be explained in reference to FIG. 27. The exposed portion of the fourth plug element 107 as shown in FIG. 24 also has a pivot pin receiving protrusion 175 received between upper and lower hinge ears 177, 179 extending from the rear side of the mounting plate 91 and held together by the front pivot pin 89.

FIG. 26 shows an enlarged fragmentary front elevation of the fourth plug element 107 and mounting plate 91 assembly as represented in FIG. 17 and FIG. 25 shows a cross section through the same assembly in accordance with the line XXV—XXV in FIG. 26. FIG. 25 in particular shows the angular compensation feature for the front pivot pin 89. The front pivot pin 89 in this regard includes a central axle 181 which has a screwdriver slot 183 at its bottom end. The axle 181 is engaged in a collar 185 by means of a male screw thread on the axle 181 and female screw thread on the inner bore of the collar 185. The collar 185 is both rotatably and axially pivotally held by its upper outer circumference with which it is engaged in a bore of the lower hinge ear 179. It is possible to retract (or engage) the central axle 181 from (or into) engagement with the upper hinge ear 177 by unscrewing (or screwing home) the axle 181 with respect to the collar 185. In the upper hinge ear 177 there is engaged a transverse angle compensating bearing element 187 which has a bearing cavity for rotatably receiving the upper end of the central axle 181. The bearing element 187 is generally formed as a cylindrical body with its outer circumference mated to a horizontal bore in the upper hinge ear 177. The bearing element 187 is horizontally slidable in respect of the upper hinge ear 177. This results in some limited angular lost motion between the mounting plate 91 and the front awning arm section 25. Conveniently the amount of lost motion is about 7 degrees, which would enable to cope with most of the misalignments encountered with the front bar 9 and the cassette 3 upon full retraction of the awning. The skilled person can devise alternative angle adjustment means for adjusting the angle of the mounting plate 91 in respect of the front pivot 89 and the previously described arrangement is nothing more than one possible solution.

Figure 27:
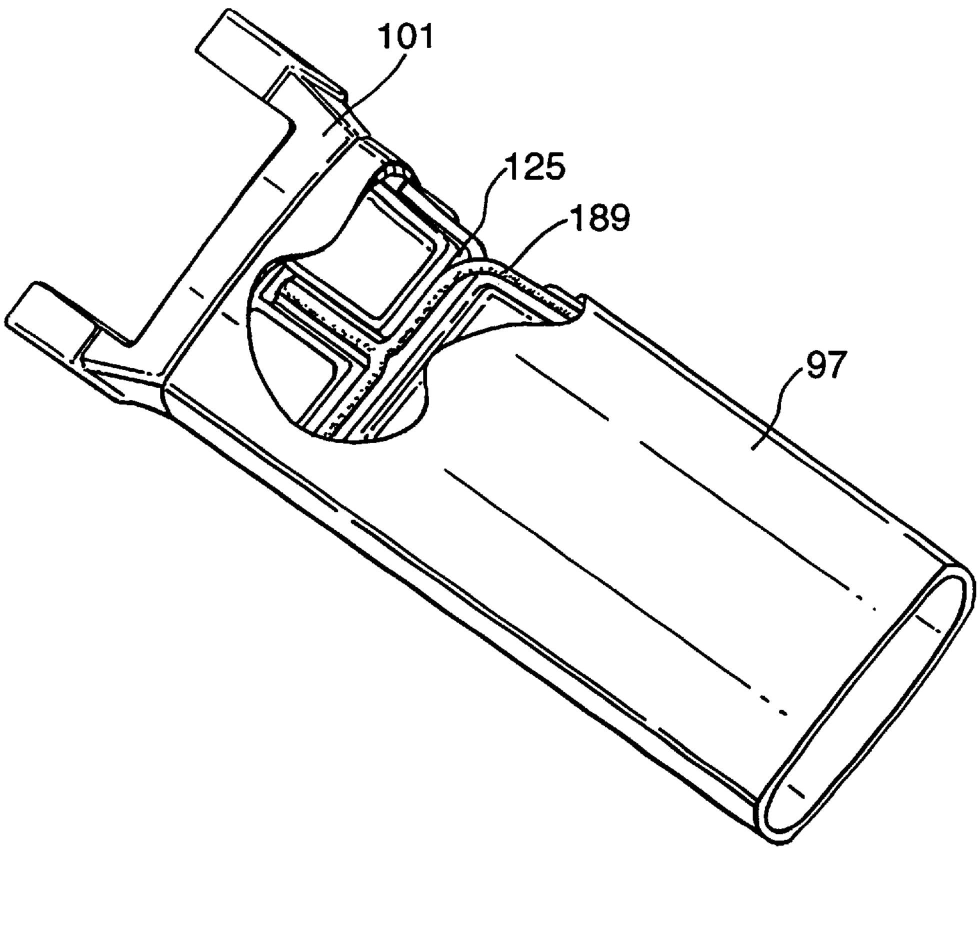
FIG. 27 is a perspective fragmentary view of the rear section of the arm of FIG. 16, with the rear section partly broken away to show its connection to the rear end plug of FIGS. 20 and 21, inserted into it.

FIG. 27 illustrates a novel technique for affixing the plug-in ends of the plug elements to the ends of the tubular profiles. Although FIG. 27 shows this in particular for the first end plug element 101 and the first tubular profile 97 a similar arrangement will be used for the second, third and fourth plug elements 103, 105, 107 as well as for the second tubular profile 99. It has been known for awnings to affix such plug element by means of glue or adhesives but it has so far always been necessary to apply the glue before assembly of the plug and profile parts. This has made control over the glue connection very difficult in that too small an amount of glue was bound to be scraped off and removed from the critical areas. An excessive amount of glue has likewise resulted in ineffective connections and in an uneconomic use of usually expensive adhesive compositions. According to the present invention the plug element 101 is first inserted into an end of the tubular profile 97 as shown in FIG. 27, but yet without adhesive material. Only after assembly a suitable glue or adhesive is injected through opening 127 (see FIGS. 20 and 21) and a bead of glue or adhesive 189 is formed in the T-shaped channel formation 125. This has resulted in a much improved distribution of the adhesive material as well as in a more economic use thereof.

FIGS. 28 through 38 illustrate a novel arrangement for the automatic control of electrically operated awnings. FIG. 28 shows a weather sensor unit 421 for mounting onto the front bar of awning (front bar 9 in FIGS. 1 and 15). The sensor unit 421 on its front face carries a wind sensor 423 in the form of a resiliently movably mounted wind catching body, shaped as a hollow housing. A first electronic movement sensor such as a motion switch sold by Assemtech Europe Ltd under part number MS 24 is incorporated into the hollow wind catching body 423. The sensor unit 421 further houses a solar panel 425 which can extend to both sides of a central housing 427. The solar panel charges an accumulator or battery (477 in FIG. 30), which forms the power supply for the entire sensor unit. Further, the sensor unit 421 houses a water sensor 429 for sensing rain, a light sensor and a temperature sensor which will be further identified in reference to FIG. 30 which shows the electronic circuit of the sensor unit 421. Optionally, a shock sensor may additionally be included in the sensor unit 421.

Further the sensor unit 421 includes an antenna or the like for wireless transmission of parameter values to an indoor control unit.

FIG. 29 shows an indoor control unit 431 having a display device 433 for displaying parameter values, which may in part have been transmitted to it from the outdoor weather sensor unit 421. The control unit 431 also has a number of buttons for selecting different functions and for making adjustments. The programming buttons for adjustments of threshold values are normally covered by a pivotable lid 435. With the pivotable lid 435 closed, only a limited number of buttons is exposed and these include a button 437 for selecting the mode of the display device 433, and an auto/manual mode selection button 439, a stop button 441 for interrupting the operation of the control unit and preferably somewhat larger buttons for manually selecting deployment or extension 443 and for manually selecting retraction of the sun protection device 445. Adjustments of various settings can be obtained by a number of buttons behind the pivotable lid 435. These include selector buttons for setting the sensitivity by changing a threshold value of the wind sensor 447, the sun sensor 449, the optional shock sensor 451 and a programming enter button 453. After selection each of these switches combines with a tumbler switch 455 for either increasing or decreasing the sensitivity of the selected sensor. By subsequently actuating the enter button 453 any change in sensitivity threshold can be stored. The control unit 431 also has an installation program switch 446, which is only reachable for operation by inserting a pin or a needle through a restricted opening. This prevents accidental operation by the intended user. The function of the program installation switch is described below with reference to FIG. 36.

The adjusted settings are subsequently transmitted from the control unit 431 to the outdoor sensor unit 421. The wireless transmission between the units 421 and 431 effectively eliminates any requirement for cabling between these units and hence significantly promotes an efficient installation of the awning as well as an improved reliability.

The control unit 431 additionally controls the power supply to an electric motor for operating the awning as will be discussed in reference to FIG. 32. Further details of the weather sensor unit 421 will become apparent from a discussion of its circuitry shown in FIG. 30 and those of the control unit 431 from a discussion of its circuitry shown in FIGS. 31 and 32.

Figure 30:
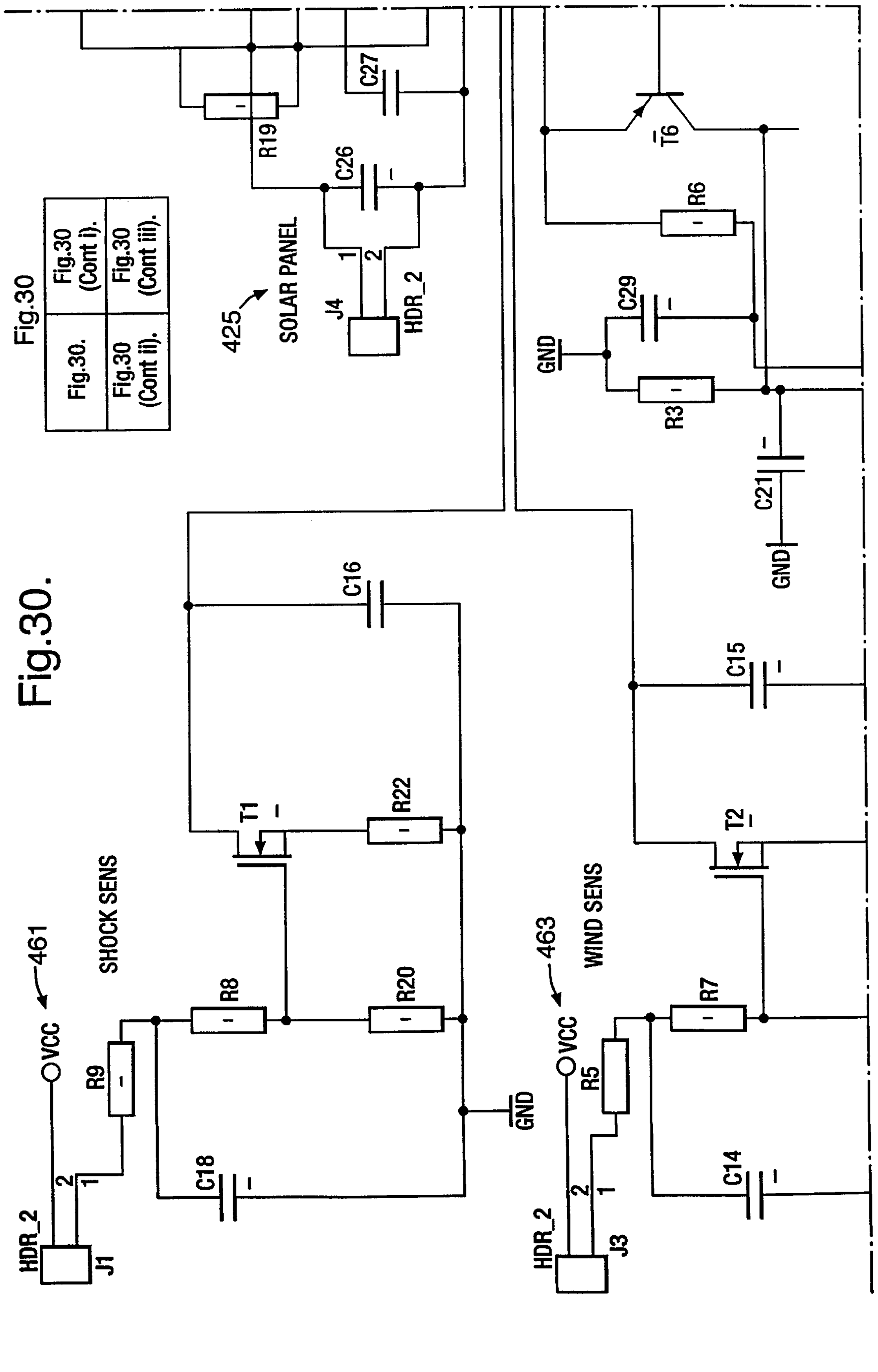
FIG. 30 is a schematic representation of the circuitry of the outdoor weather sensor unit of FIG. 28.

FIG. 30 shows the circuitry of the outdoor weather sensor unit 421 which includes a shock sensor 461. The shock sensor determines movement of a front bar 9 in FIGS. 1 and 15) which may go beyond the notice of a motion sensor 463 (for wind sensor 423). Also included in the circuit of FIG. 30 are a light sensor 465, a water sensor 467 for detecting rain and a temperature sensor 469 for assisting the light sensor in determining sunshine levels. Each of these sensors feeds a processor 471 which decides, on the basis of stored threshold values, whether or not the awning will be operated to extend or to retract. The processor 471 to this end communicates with a memory device 472 and a transceiver 473, which is connected to an antenna 475 for radio frequency signals. Other forms of wireless transmissions are conceivable and these would include infra-red or ultra-sound, but in the environment of an outdoor awning some preference is given to radio frequency waves and hence the presence of an antenna 475, which can conveniently be incorporated on a printed circuit board and as such may be positioned behind the solar panel 425 of the sensor unit 421. The memory device 472 preferably is an EEPROM (electronically erasable programmable read-only memory) for storing threshold values for the sensor readings.

The solar panel 425 will continuously charge, depending on the ambient light conditions, an accumulator 477 which will also take care of the temporary power requirements of the sensor unit 421. The accumulator 477 preferably is a Nickel Metal Hydride (NiMH)-type battery. NiMH battery chemistry stores up to 40% more power than conventional Nickel Cadmium (NiCd) rechargeable batteries and can deliver this power much more quickly. NiMH batteries unlike NiCd have no memory effects, they will store almost the same amount of power for their entire lifetime. NiMH rechargeable batteries last through 500–1000 recharge/discharge cycles and are considered perfect for high drain electronics. Temporary power requirements thereby may exceed the instantaneous capacity of the solar panel. Preferably a charging circuit between the solar panel 425 and the rechargeable battery 477 includes a DC to DC step-up converter. A preferred form of step-up converter for use with solar panels and NiMH-type accumulators uses one or two MOSFET semiconductor elements in combination with a Schottky diode. As discussed above the motion sensor 463 incorporated in wind sensor 423 can be an omni-directional motion switch MS 24 from Assemtech Europe Ltd. Alternatively the wind sensor 423 can be in the form of a piezo element, which can be regarded as a voltage source with a large capacity. An appropriate amplifier circuit ensures that strongly varying signals, such as noise of air moving past the piezo-sensor, cause pulses which lower the voltage on an exit capacitor. The higher the speed of wind, the lower the voltage of the capacitor. This output is connected to the processor 471. The shock sensor 461 conveniently can be a lesser sensitive motion switch and preferably is a device sold by the Comus Group of companies as their part number CM 4400-1.

Figure 30A:
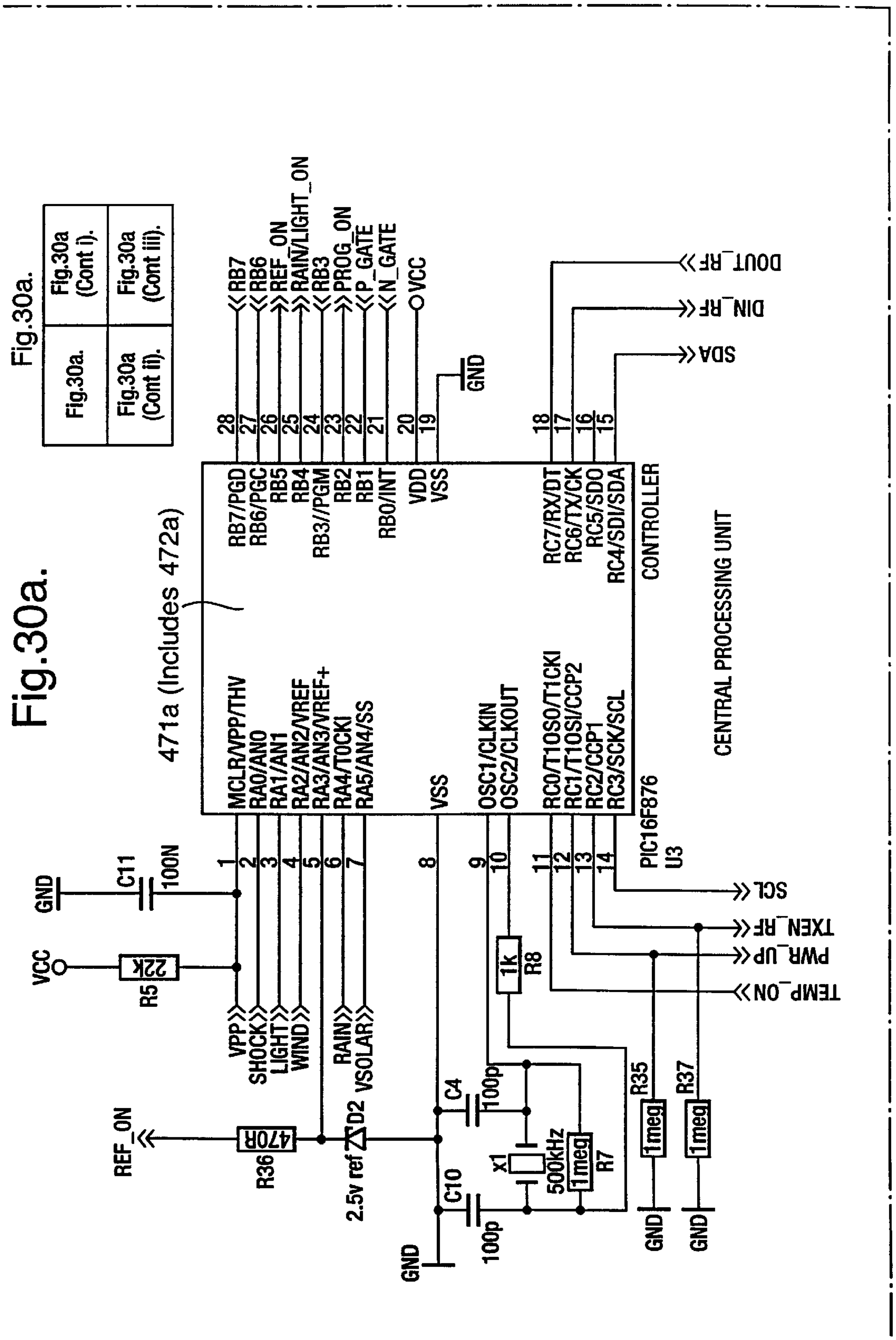
Figure 30B:
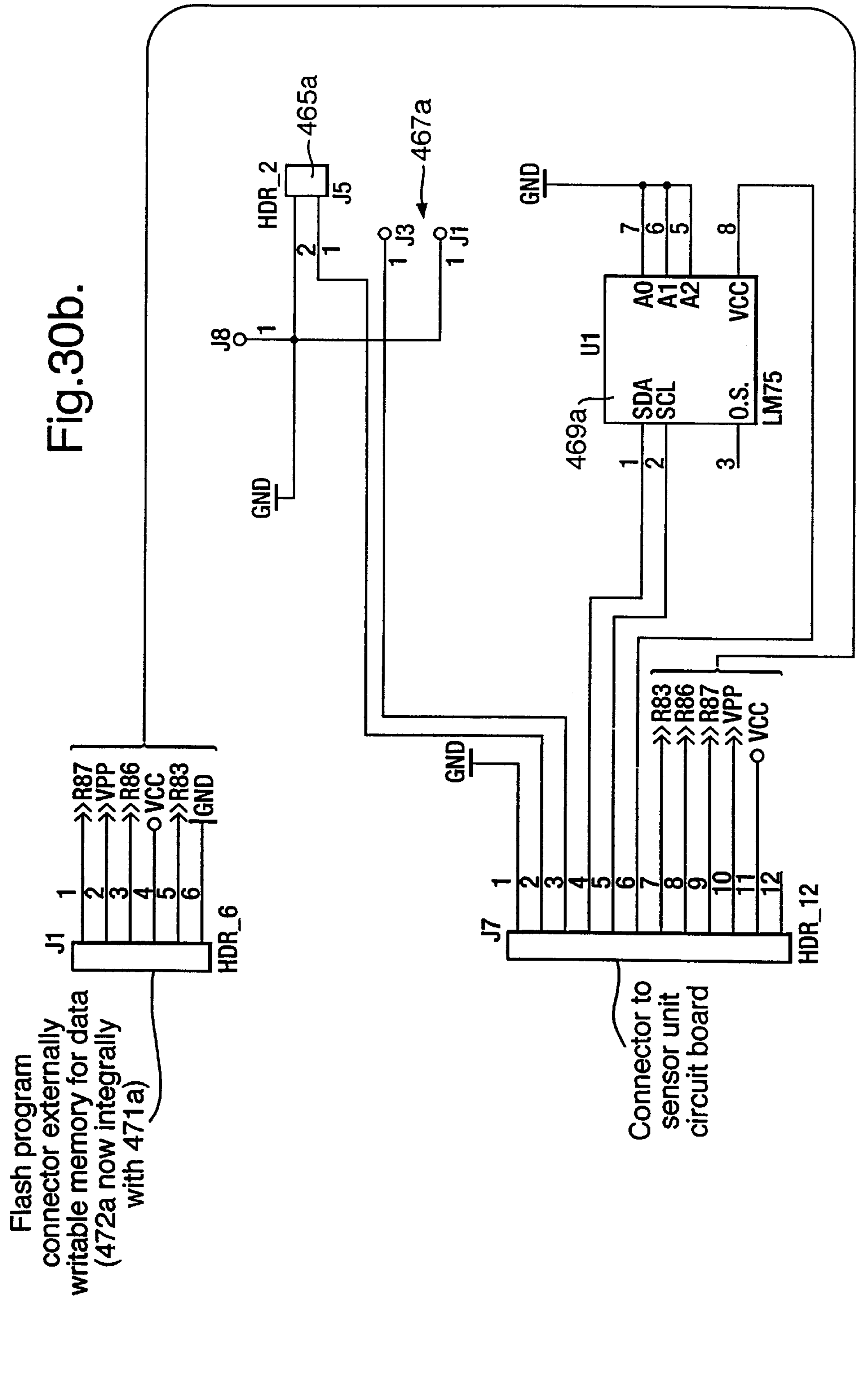

FIGS. 30*a* and 30*b* show a circuit arrangement alternative to that of FIG. 30. Like components have been indicated by similar reference numerals with a suffix "a". Shock sensor 461*a* is connected to the "SHOCK" terminal of central processing unit 471*a*. Wind and motion sensor 463*a* (423 in FIG. 28) is a piezo sensor and connects to the "WIND" terminal of central processor 471*a*. Light sensor 465*a*, rain sensor 467*a* (429 in FIG. 28) and temperature sensor 469*a* are positioned conveniently on a separate sensor circuit board, the circuit of which is illustrated in FIG. 30*b*. The circuit of FIG. 30*b* connects to the circuit of FIG. 30*a* through a 12-pins male and female connectors "HDR_12".

Also shown in FIG. 30*b* is a further connector "HDR_6", which connects to the connector "HDR_12". This further connector "HDR_6" is a Flash program connector for the externally writable data memory integrated in processor unit 471*a*. This memory replaces the external memory 472 of the FIG. 30 embodiment. A transceiver unit 473*a* connects to antenna 475*a*. Particularly advantageous is the "Low Voltage Solar Converter Unit", which connects the solar panel 425*a* to a battery assembly 477*a*. The "Low Voltage Solar Converter" includes a step-up DC-to-DC converter (sometimes also called a voltage increasing chopper). The main components of the step-up converter are: inductor/inductance L4; semiconductor switch T4 and supplemental N-channel MOSFET T2; diode D1 (Schottky ZHCS 750) and capacitor/capacitance in the form of high capacity elco C23 compensated for low resistance by additional capacitors C19 and C20.

Semiconductor switch T4 operates the step-up converter at those times when the voltage is too low to operate the MOSFET switch T2. Switch T4 is operated by an oscillator circuit as indicated in FIG. 30*a* by a dash-dotted box. The output of the oscillator connects to the "STARTUP_OSC>>" connector of the step-up converter where Schottky diode D3 (ZHCS750) adds the output voltage of the solar panel 425*a* to the pulsed voltage generated by the oscillator. The resulting voltage is offered to the base of T4.

As soon as the voltage offered to the step-up converter is high enough for the MOSFET switch T2 to operate, the oscillator output is grounded through semiconductor T3 of the oscillator circuit. Then the MOSFET T2 is controlled from the "N_GATE>>" output of the central micro processor 471*a* and a further P-channel MOSFET T1 is controlled from the "P_GATE>>" output of the processor 471*a* to take over from the Schottky diode D1. The P and N gates of the processor 471*a* are software driven.

In this manner a particularly advantageous step-up converter has been obtained. The alternative use of semiconductor switches T4 and T2 provides for a register or compound step-up converter that has optimal characteristics for each of a low voltage and a higher voltage range.

The provision of Schottky diode D3 enables to offer an as high as possible voltage to the base of the low voltage semiconductor switch T4. The additional MOSFET switch T1, which is positioned in parallel to diode D1, allows to eliminate the losses which normally occur in diodes such as D1.

FIG. 31 shows the low voltage circuitry of the indoor control unit 431 which includes a processor 481 connected to an oscillator 483. Further the processor 481 is connected to the display device 433 through a data bus 482 and 8-bits latches 484 and also to an EEPROM (Electronically Erasable Programmable Read-Only-Memory) 485. Optionally but not necessarily the circuitry of FIG. 31 can be provided with test and/or programming connectors such as 487, 489 and 491. Further an array of light emitting diodes (LED's) 493 may be provided for illumination of the display 433. For connection to the high voltage circuitry there is an 8-pins male connector 495.

Figure 31A:
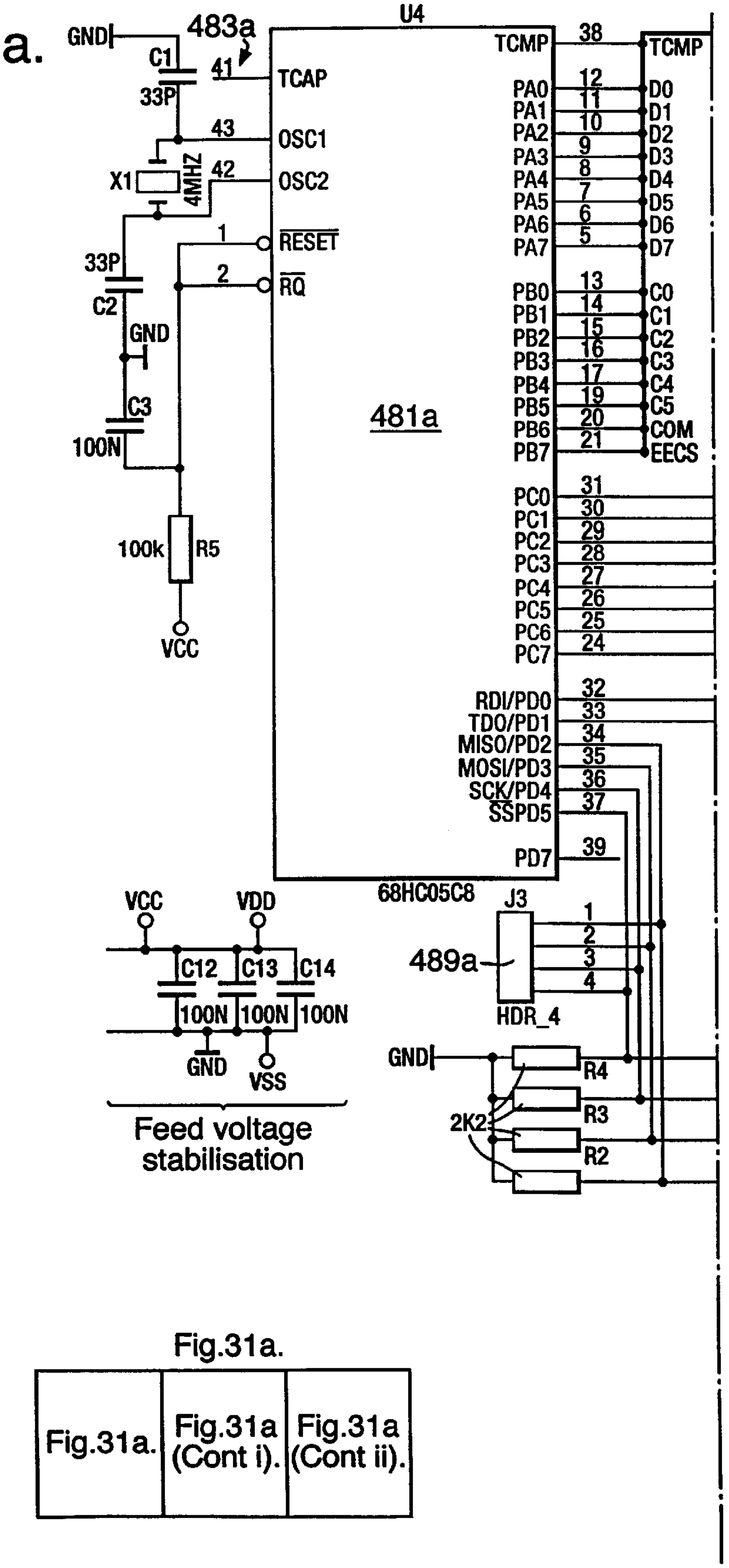
Figure 31A:
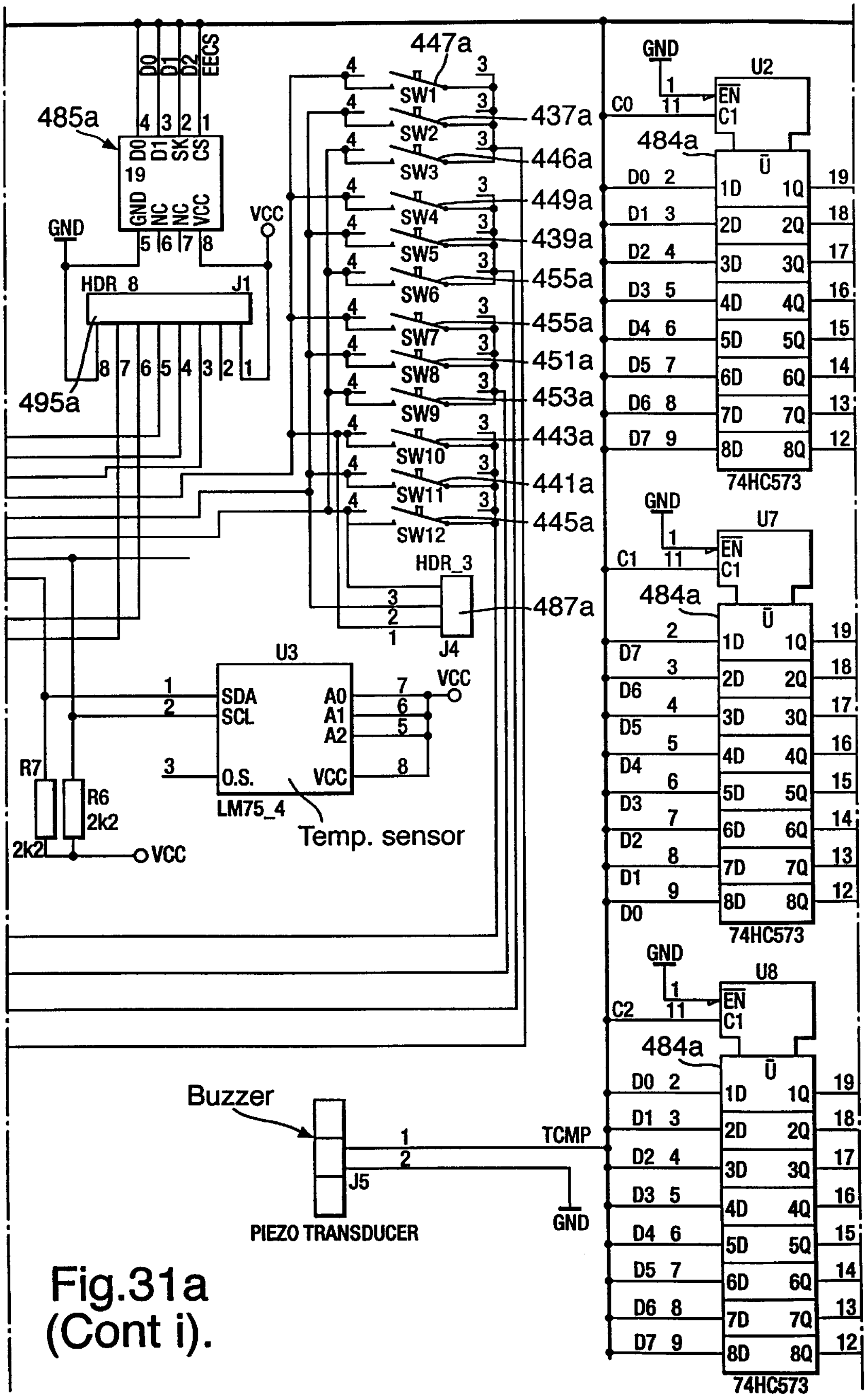

FIG. 31*a* shows an alternative circuit arrangement to the low voltage circuitry of FIG. 31. Similar components have been indicated by like reference numerals carrying a suffix "a". Switches SW1 through SW12*w* are similar to those in FIG. 31 and generally correspond to the buttons and switches shown in FIG. 29 on the control unit 431 as follows:

SW 1=447 (wind)
SW 2=437 (display)
SW 3=446 (installers programming switch)
SW 4=449 (sun)
SW 5=439 (auto/manual)
SW 6 and SW7=455 (sensitivity + and −)
SW 8=451 (shock)
SW 9=453 (enter)
SW 10=443 (extension/roll out)
SW 11=441 (stop/interrupt)
SW 12=445 (retraction/roll in)

A processor 481*a* is responsive to software including steps according to any one of the flow charts according to FIGS. 34–37 and through a data bus 482*a* is connected to an EEPROM device 485*a* and a LCD-display 433*a*. The LCD display 433*a* is controlled through six 8-bits latches 484*a*. The circuit of FIG. 31*a* further includes a number of optional test or programming connectors 487*a*, 489*a*, 491*a*, of which the latter is intended for the display device 433*a*.

Also shown in FIG. 31*a* is an additional BUZZER, which signals the execution of a programming or adjusting step to a user. The component "U3" in FIG. 31*a* and "NEWSHAPE" in FIG. 31 represents a temperature sensor for measuring the indoor temperature.

FIG. 32 shows the high voltage section of the circuitry of the control unit 431 with a corresponding 8-pins female connector 496 for connection to the low voltage section. The high voltage or power section has a 220V mains supply 501, an earth connector 503, a motor current connector for retraction 505 and a motor current connector for extension 507.

Additional motor control circuitry is normally integrated in the conventional drive motor units but could alternatively also be integrated on the circuit board of FIG. 32 beyond the connectors 505 and 507. This is optional and depends on the type of motor unit used.

Further the high voltage circuitry of FIG. 32 includes a transformer 509 and a transceiver 511 and antenna 513 for communication with the sensor unit 421.

Figure 32A:
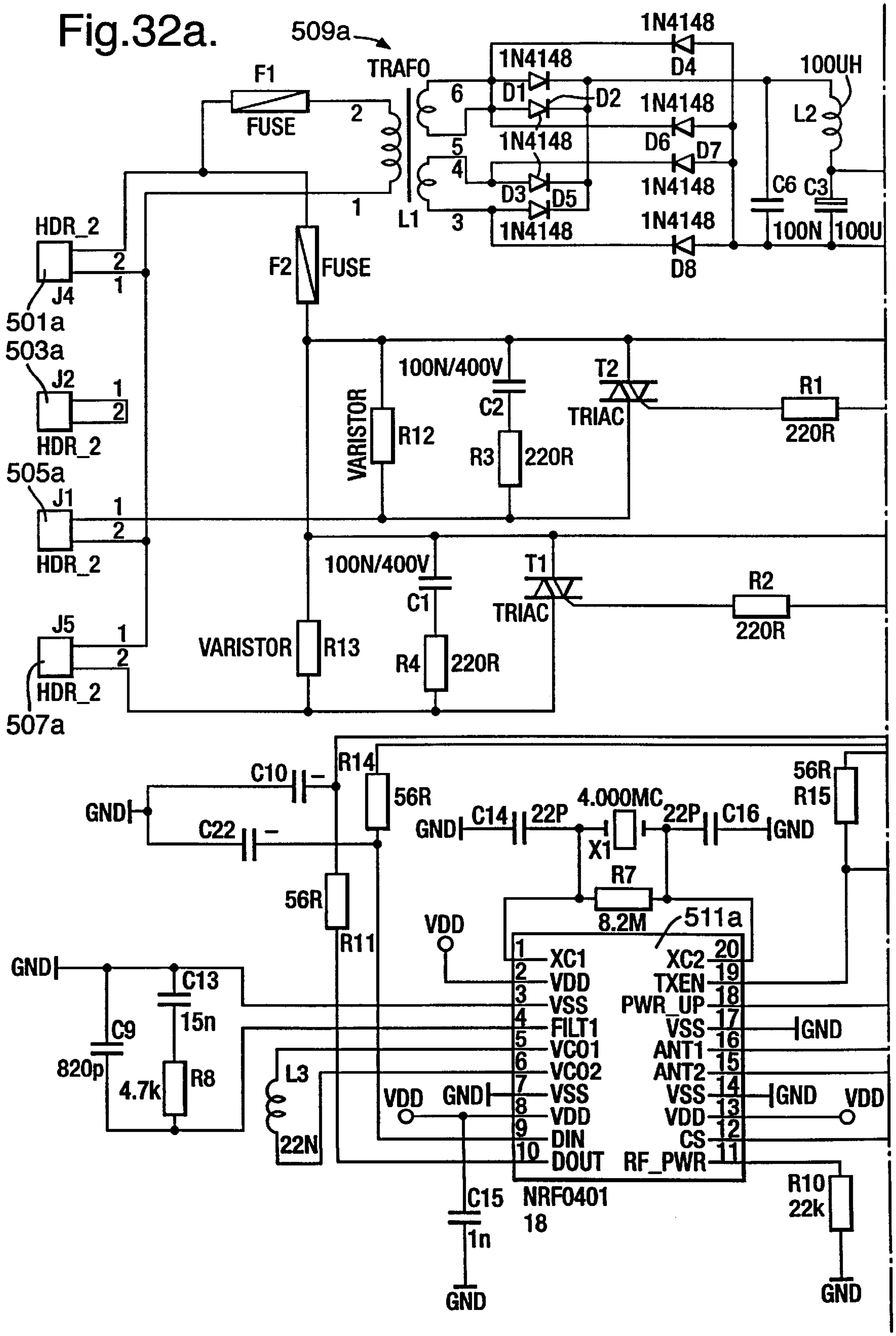
Figure 32A:
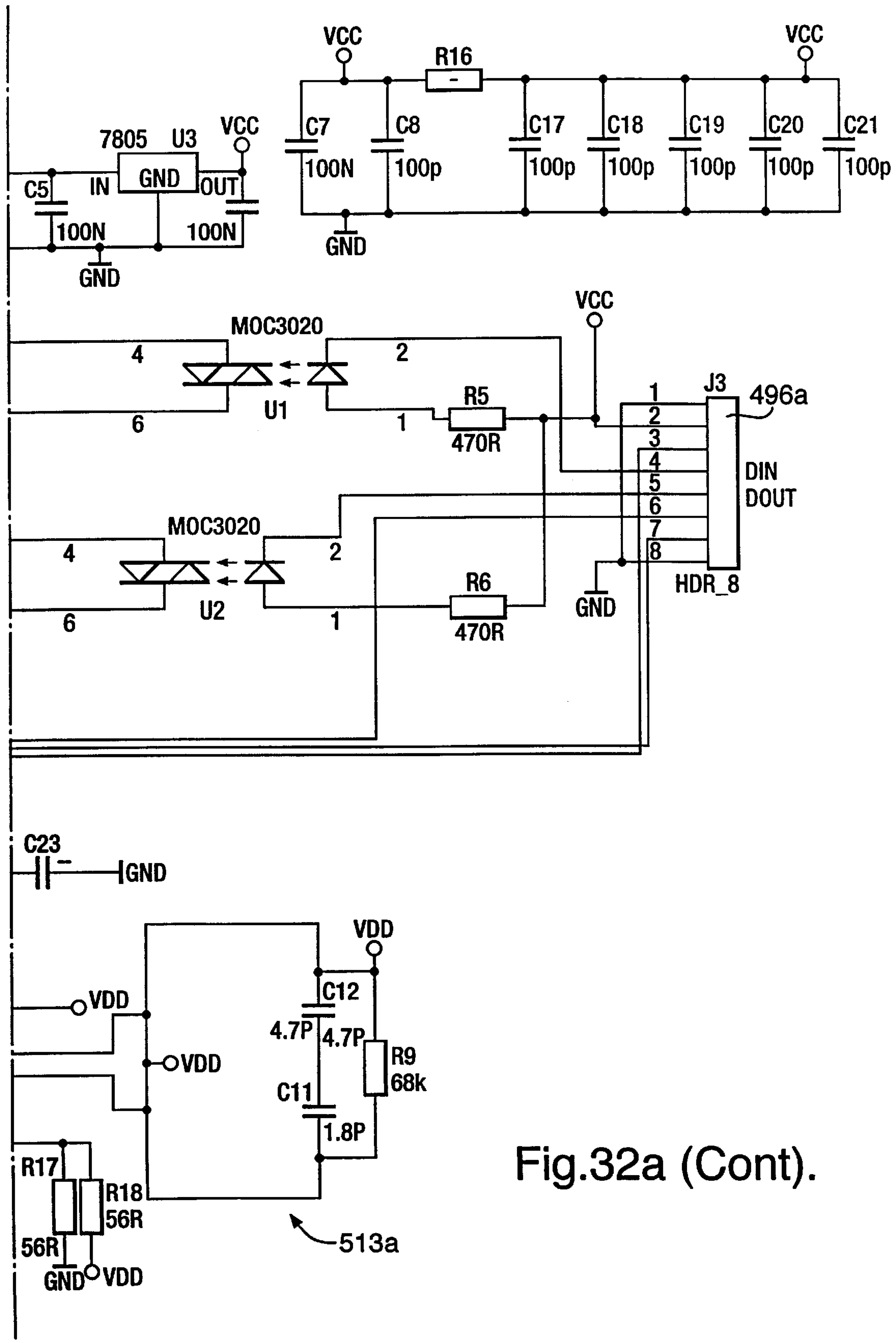

FIG. 32*a* is generally similar to the previously disclosed high voltage power section circuit of FIG. 32. Again an 8-pins connector 496*a* connects to the printed circuit board of the low voltage circuitry of FIG. 31*a* at 495*a*. Like components have been designated by like reference numerals provided with the suffix "a".

FIG. 33 shows a flow chart for the processor 471 of the sensor unit 421 of FIGS. 28 and 30. In step 601 a wake-up signal is produced which initialises the processor 471 in step 603. In step 605 the processor 471 determines whether or not the sensor unit 421 is in a programming mode. If it is not, step 607 measures the amount of light, step 609 measures the temperature, step 611 determines the presence of wind, step 613 determines the presence of shocks and step 615 determines the presence of rain by use of the various sensors described hereinabove. Subsequently, step 617 compares the measurements with the predefined thresholds.

Since it is conceivable that an awning or the like window covering with a wireless transmitting sensor unit as disclosed is going to be used in the vicinity of another similar device, it is desirable that each of such devices would only respond to its associated control unit and not to any other transmitters or control units in its neighbourhood. Therefore each control unit 431 will be given an individual one of a number of different channels. Upon installation it will then be necessary for the transmitter of the sensor unit to identify itself to its respective control unit. This is why step 605 checks for the presence of a programming instruction. If this is detected, step 619 requests transmission of address information from the control unit and with step 621 is set to receive channel information from the control unit 431. Such programming instructions can be given by short-circuiting the conductive contacts of the water/rain sensor (429 in FIG. 28; 467 in FIG. 30), which can be recognised by the processor 471 as a programming instruction. If step 623 determines that transmission channel information is not received within a specified delay, step 625 will return the sensor unit 421 to its sleep mode. If the specified delay is not found to have lapsed by step 623, then step 627 will continue to look for transmission channel settings until step 629 continues with a confirmation of such setting or until step 623 determines the lapse of the predefined delay for receiving such settings. Step 627 thus checks the receipt of channel settings and repeats steps 621 and 623 for as long as the programming instruction is valid. Once channel information has been received, step 629 confirms such receipt to the control unit 431 and step 631 takes the address information from the received channel settings transmission. Step 632 then stores the channel address in the memory (EEPROM) 472 of the sensor unit 421. After this step 633 returns the sensor unit 421 to its sleep mode. Returning now to step 617, which compares the sensor values with the stored thresholds in the EEPROM 472, if this determination does not indicate any necessary activity (that would result from exceeding of any of the thresholds) steps 635 and 637 will return the sensor unit 421 to its sleep mode as long as a predefined period of time (i.e. 1 to 5 minutes) has not passed. As soon as step 635 determines the lapse of the predefined time interval it communicates with the control unit 431 through steps 639, 641 and 643. Also if the determination at step 617 indicates measurements surpassing the pre-set threshold; then also the sensor unit 421 communicates with the control unit 431 through steps 639, 641 and 643. Upon such communication, step 645 checks whether a response from the control unit 431 is received within a pre-set time frame and if not it will return the sensor unit 421 to its sleeping mode in step 647. If step 645 and 649 have determined that a message has been received from the control unit then step 651 saves the new settings and step 653 returns the sensor unit 421 to its sleep mode. Within the present time frame steps 643, 645 and 649 will repeatedly be cycled so that the receipt of new settings from the control unit 431 may be intercepted.

FIG. 34 shows the basic flow chart for the control unit 431 and its processor 481. After connecting the unit to a power supply, represented by step 655, the unit will be initialised at step 657. Then a continuous cycle starts which continuously checks the selected mode of operation. In step 659 it is determined whether a programming mode has been selected and if so step 661 will revert to the program mode sub-routine shown in FIG. 35.

If no programming mode is detected in step 659 then step 663 determines whether an installation mode has been selected. If this is found to be the case step 665 refers to the installation sub-routine of FIG. 36. Otherwise the cycle will continue at step 667 to check whether the manual mode has been selected by switch 439. If such proves to be the case step 669 will enter the manual mode sub-routine of FIG. 37. Otherwise the cycle continuous to step 671 to find out whether the automatic mode is selected by switch 439 to refer to the subroutine of FIG. 38 through step 673 or to repeat the above described cycle from step 659.

FIG. 35 shows the programming mode sub-routine for the control unit 431, which starts at step 661. The processor 481 at step 675 selects a relevant sensor settings from its table stored in EEPROM 485 in response one of the selector buttons 447, 449 or 451 having been actuated and step 677 displays this sensor setting on the display 433. Step 679 thereupon determines whether another actuation of a program button has been effected to select a different setting for display. If this is positive, step 681 will select the relevant value from the table setting and display this. Once the operator does not depress a program button for another selection step 683 determines whether the tumbler switch 455 is depressed to increase the current value and if so to add in step 685 one value increment and in step 687 to display the increased value. If however step 683 does not recognise actuation of the switch 455 towards increasing, step 689 will determine actuation of switch 455 in the decreasing direction and if positive through steps 691 and 693 lowers and displays the adjusted value.

Irrespective of the determination at step 689 the subroutine will be continued with step 695 which determines whether the stop button 441 may have been depressed and if so step 697 returns to step 663 in the main program. Otherwise the subroutine will continue and check as step 699 whether the enter button 453 has been depressed. If the enter button 453 has not been depressed the sub-routine repeats from step 677. When the enter button has been depressed the subroutine continues with step 701. Step 701 awaits the receipt of an information package from the outdoor sensor unit 421. After 20 seconds, step 703, through step 705 will display an error in display device 433 whereupon step 707 returns to the main program to continue at step 663.

Until such time step 709 will determine whether any information package is received in full and return to step 701 or continue at step 711. In step 711 a modified information package is prepared, containing any new limits, which subsequently in step 713 are sent to the outdoor sensor unit 421. Step 715 awaits a confirmation of receipt by the sensor unit 421 and if this is not obtained within a predefined time span in step 717, then step 719 indicates an error in display device 433, after which step 721 returns to the main program to continue at step 663 (FIG. 34). During the predefined time span step 723 will determine the presence of a recognisable receipt confirmation of the information package or return to step 715 for another cycle. If a correct confirmation is received step 725 will store the new settings also in its EEPROM 485. Step 727 will thereafter return to the main program and continue with step 663.

FIG. 36 illustrates the installation sub-routine, which allows fine adjustments upon installation in contrast to the course adjustments permitted by the user and described with respect to FIG. 35.

Step 663 in the main program (FIG. 34) detects whether the installation program switch (446 in FIG. 29) has been actuated and continues at step 665 with the sub-routine of FIG. 36. Conveniently the program switch is only reachable for operation by inserting a pin or a needle through a restricted opening. This prevents accidental actuation by the intended user. Step 729 then selects a first one of either an address, light sensor setting; a shock sensor setting or a wind sensor setting from a memory table and continues in step 731 with displaying the relevant value on the display device 433. Switch 733 detects whether the installers switch 446 has been additionally actuated and if so at step 735 selects the next value from the memory table and repeat the cycle with displaying this next value at step 731. If step 733 does not detect any further actuation of the installers switch 446 it continues with step 737 with determining the actuation of the sensitivity switch 455 for an increase. If so steps 739 and 741 adjust to the table value and the adjusted value is displayed in the display 433. If no actuation of the sensitivity switch 455 towards an increased value can be determined the program continues at step 743, which determines the actuation of switch 455 towards any decrease of the displayed table value. If so the value is decreased accordingly and stored in the table at step 745 and displayed at step 747. If no actuation of sensitivity switch 455 can be determined at all the program continues at step 749 and determines whether perhaps the stop button 441 has been depressed. If so step 751 returns to the main program (FIG. 34) to continue with step 667. If the stop button 441 has not been actuated step 753 checks whether perhaps the enter button 453 has been actuated to give an enter instruction. If this is not the case the same cycle is repeated from step 731. If an enter instruction is received through actuation of the enter button 453 the program will continue with step 755 to receive an information package with current settings from the outdoor unit 421 (FIGS. 28, 30 and 33). If step 757 determines a receipt failure after 20 seconds step 759 will display an error message on the display 433 and step 761 will return to the main program to continue with step 667. Otherwise step 763 will repeat the cycle from step 755 until a complete information package has been received. After this step 765 will add any new limits and address to prepare a new information package for sending to the outdoor unit 421. Step 767 will subsequently send the modified information package and step 769 will await a confirmation transmittal from the outdoor unit 421. Step 771 will check whether the predefined time frame for the receipt of a confirmation has lapsed and if so step 773 will display and error message in the display 433 and return with step 775 to the main program to continue at step 667. Step 777 will repeat the previous cycle from step 769 until a full confirmation has been received, in which case optionally step 779 may check the confirmation of an optional remote control unit (to be described in reference to FIGS. 39 and 40) has also confirmed receipt of the new set of information. If not, step 779 recycles from step 767 by resending the information package. If steps 777 and 779 have been positively concluded then step 781 will store the values in EEPROM 485 and step 783 will return to the main program to continue with step 667.

FIG. 37 depicts the flow-chart of the manual mode sub-routine reverted to from step 669 of the main program of FIG. 34. Step 669 in FIG. 37 starts the manual mode selected by button 439 of the control unit. Step 785 determines whether the sensor unit has transmitted any exceeding of the shock sensor threshold value. If so step 787 activates the retraction control. Thereafter step 789 returns to the main program to continue at step 671. If no excess shock has been reported step 791 checks whether the rain sensor (429 in FIG. 28; 467 in FIG. 30) has been activated or not. Activation of the rain sensor results in step 793 to instruct retraction of the awning and step 795 to return to the main program to proceed with step 671. If no rain has been reported step 797 checks whether retraction button 445 has been depressed. If not the sub-routine continues at step 801 and also after instructing the retraction of the awning in step 799 upon a positive signal in step 797. Step 801 determines whether perhaps the extension button 443 has been actuated, in which case step 803 instructs the extension of the awning. Either directly from step 801 or via step 803 the next step 805 checks activation of the stop button 441 to interrupt at step 807 any extension or retraction under progress. If no interruption has occurred or after interruption has been effected the sub-routine of FIG. 37 at step 809 returns to the main program of FIG. 34 to continue with step 671.

FIG. 38 shows the auto mode sub-routine which follows step 673 of the main program. Step 673 activates the auto mode and step 811 checks the transmitted measurement values of the shock sensor 461. Step 813 corresponds to step 787 of the manual sub-routine of FIG. 37 and step 815 continues the main program at step 659. Steps 817 through step 821 also result in a similar sequence to that of steps 791 through 795 of the manual sub-routine of FIG. 37 except that step 821 continues the main program with step 659. Step 823, with which the sub-routine of FIG. 38 continues if no excessive shock or the presence of rain is reported, is an additional step specific for the auto mode operation of FIG. 38. Step 823 checks exceeding of a predefined level of light from the light sensor 465. If positive this will result in step 825 to instruct extension of the awning. If not or following step 825 a further additional auto-mode step 827 checks whether a predefined value of the wind sensor 463 has been exceeded. If positive step 829 will instruct retraction of the awning and continue with step 831. If step 827 results in a negative determination the sub-routine will also continue with step 831. Steps 831 through 843 are identical to steps 797 through 809 of the manual sub-routine of FIG. 37 except that the return step 843 continues the main program (FIG. 34) with step 659 rather than step 671. For a further explanation of these steps reference is therefore made to the preceding description of FIG. 37.

FIG. 39 illustrates an optional wireless remote control transmitter 901. The transmitter 901 is conveniently shaped reminiscent to the right hand portion of the indoor control unit 431 and carries the operational buttons in an identical lay-out. Button 903 operates the retraction of the awning and corresponds to button 445 of the control unit 431. Button 905 operates the extension of the awning and corresponds to button 443 of the control unit 431. Button 907 is a stop button to interrupt previously given instructions and is similar in function to button 441 of the control unit 431. Button 909 is the auto or manual mode selector button and corresponds to button 439 of the control unit 431. Using this arrangement of similarly positioned buttons on the remote control transmitter 901 makes for a user-friendly operation. Also the replicated exterior design enhances easy recognition of the present remote transmitter amongst several remote control transmitters as these may be encountered in modern households. In a forward end 911 of the transmitter 901 a window may be provided through which either infrared light or ultra-sound emitted for wireless transmission of any instructions.

Also the transmitter 901 may be arranged with a suitable antenna and use radio frequency signals. As such transmitters usually fed by one or more batteries are conventional and the skilled person will readily recognise a suitable arrangement for such a device. A detailed discussion of the necessary circuitry is thereby largely redundant. It is however useful to duplicate some of the programmable features from the control unit 431 also in the remote control transmitter 901.

As shown in FIG. 40 the remote control transmitter may be arranged to carry out a number of program steps. Step 915 comes into operation as soon as one of the buttons on the transmitter is depressed. This connects the power source in the form of one or more batteries (not shown) to the circuitry of the transmitter. Step 917 initialises and step 919 recognises which of the buttons has been depressed. At step 921 it is determined whether also at the same time a programming switch is activated. Such a programming switch can be hidden from normal use in the battery compartment.

The function of such a programming is to identify the remote control to the control unit upon installation, as will be described separately hereinbelow. Under normal consumer operation the programming switch will not be operated and step 923 will download the address information previously programmed from an EEPROM. Subsequently steps 925 will combine this address information with instructions relating to the relevant depressed actuation button 903, 905, 907 or 909 and assemble this into an instruction package to be sent to the control unit 431.

Step 927 will transmit this package and step 929 will pause for a while before restarting the cycles at step 927. This cycles is endless and will be continued for as long as the operating person depresses one of the button on the remote control transmitter 901. After the button is released the cycle steps because the power source is disconnected. Reapplying any of the buttons will result in the program to restart at step 915.

Since it is conceivable that an awning or the like window covering with a remote control as disclosed is going to be used in the vicinity of another one it is desirable that each of such devices would only respond to its associated remote control transmitter and not another transmitter in its neighbourhood. Therefore each control unit 431 will be given an individual one of 256 different addresses. Upon installation it will then be necessary for the transmitter to introduce itself to its respective control unit. This is why step 921 checks for the simultaneous actuation of a programming switch. If this is detected, step 931 requests transmission of address information from the control unit and with step 933 is set to receive address information from the control unit. Step 935 checks the receipt of such address information and repeats steps 933 and 935 as long as the same buttons are depressed and until address information is received. Once address information has been received step 937 confirms such receipt to the control unit 431 and step 939 takes the address information from the received transmission. Step 941 then stores the address information in the EEPROM of the transmitter 901. As long as the buttons and programming switch are not released the cycle is repeated from step 933 onward. After release of the buttons, which disconnects the power source any subsequent actuation of any of the buttons 903, 905, 907 or 909 will again start the program from step 915.

FIG. 41 shows one possible form of circuitry for the hand-held transmitter 901, which incorporates a controller 951, a transceiver 953 and a radio frequency antenna 955. Actuation of one of the buttons 903, 905, 907, or 909 results in a power supply to be connected to the controller 951 via the transistor 957. The controller 951 using the programmed sequence of FIG. 40 thereupon will establish wireless communication with the control unit 431.

Figure 41A:
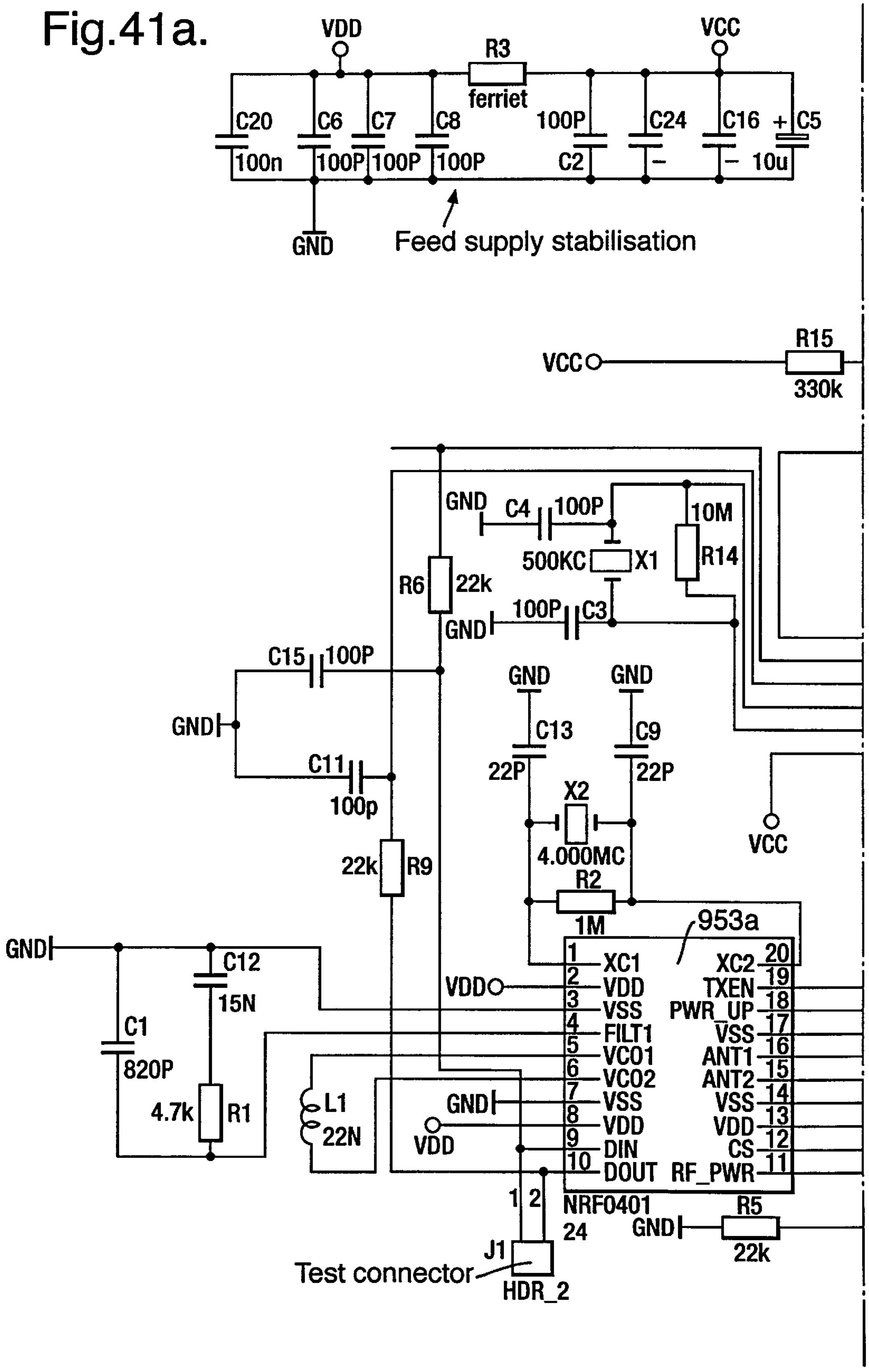
Figure 41A:
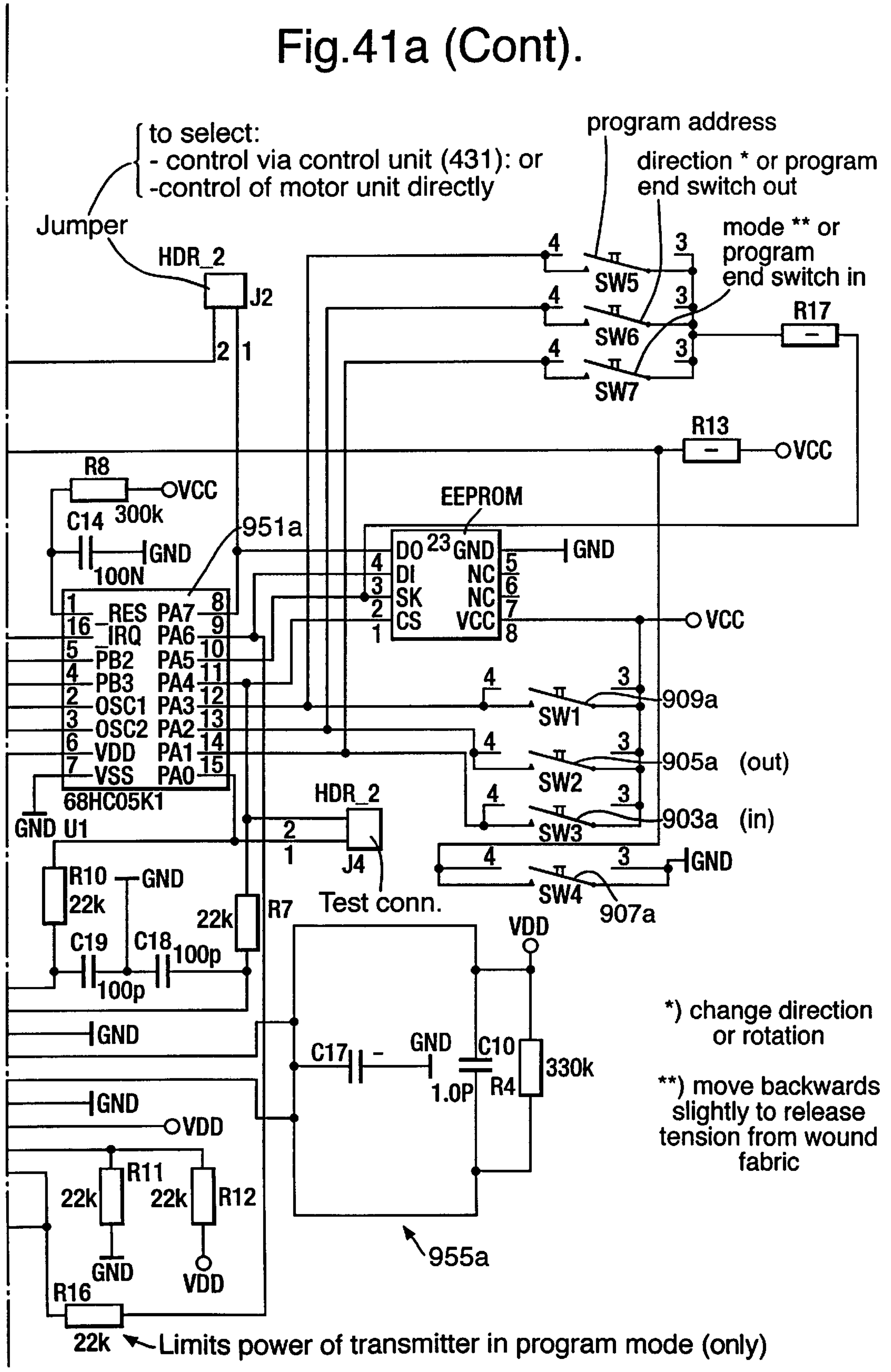

FIG. 41*a* is a further embodiment of the transmitter circuit of FIG. 41 and part of a remote control transmitter as shown in FIG. 39. Like reference numerals are provided again with suffix "a". The feed supply stabilisation shown separate from the circuit is actually connected thereto at its "VDD", "VCC" and "GND" terminals. The controller or processor 951*a* is responsive to the programmed sequence of FIG. 40.

In addition to the components already disclosed and discussed with respect to FIG. 41 there are now additional switches/buttons SW5, SW6 and SW7 for remote programming and adjustment of the control unit 431. The switches SW5 through SW7 can be hidden on the transmitter 901 behind a lid or may be positioned on the bottom side thereof (not visible in FIG. 39).

Switch SW5 enables one to generate a random address and to communicate this address to the nearest control unit. For this purpose a 22K resistor has been included in the connection between terminal "PA6" of processor 951*a* and terminal "RF_PWR" of transceiver 953*a*. This 22K resistor limits the power of the transmitter in only its program mode to ensure that only the nearest control unit 431 responds to the transmitted signals and thereby the transmission does not alter the setting of any nearby further control unit.

Switch SW6 depending on a combined use with switch SW5 has the functions of either changing the direction of retraction or extension or programs the end "switch" for the extension or outward movement.

Switch SW7 in a similar way has the function of programming an end "switch" for the retraction or inward movement while alternatively it has the function of setting an amount of reverse rotation after operation of an inward end "switch" to release the tension in a wound fabric. The latter feature is particularly advantageous if the control system is applied to an awning of roller blind. It is further recognised in FIG. 41*a,* that headers "J1" and "J4" are optional test connectors, while header "J2" is a jumper, which can be used to select the control of a motor unit in the manner described above. This further use of the remote controller 901 will be described in reference to FIGS. 42, 43 and 44.

FIG. 42 is a schematic representation of the arrangement of devices used with the above described embodiments. Shown in FIG. 42 is that each of a sensor unit 421 and a remote control 901 may be in wireless communication with a control/operation unit 431. The control unit 431 as shown in FIG. 42 is wired between a mains power supply 975 and a motor 977 for driving a sun protective device, such as an awning or a blind.

FIG. 43 shows an alternative arrangement in which the control unit 431 has been split in a control section 431A and a power section 431B, each with its own respective power supply 975A and 975B respectively. The control section 431A is now also in wireless communication with the power section 431B. The power supply 975A to the control section 431A may optionally be from batteries or the like, while the power supply 975B to the power section 431B and ultimately to motor 977 may be a regular 220 Volts main supply. The arrangement according to FIG. 43 would allow the shortest possible wiring, while the power section 431B may conveniently be enclosed in the motor housing or be accommodated close to it in the housing of a sun protection device.

FIG. 44 illustrates a simplified arrangement in which the sensor unit 421 and the control section 431A with its power supply 975A have been deleted.

If now as described with respect to FIG. 41*a* the Jumper is set for direct control of a motor unit the remote control transmitter 901 may be readily adapted for control of an elaborate version according to FIG. 43 or a simplified version in accordance with FIG. 44.

It is thus believed that the operation and construction of the present invention will be apparent from the foregoing description. The term comprising when used in this description or the appended claims should not be construed in an exclusive or exhaustive sense but rather in an inclusive sense. Features which are not specifically or explicitly described or claimed may be additionally included in the structure according to the present invention without deviating from its scope.

The invention is further not limited to any embodiment herein described and, within the purview of the skilled person, modifications are possible which should be considered within the scope of the appended claims. Equally all kinematic inversions are to be considered within the scope of the present invention.

Reference to either axially, radially or tangentially if used in the above is generally in relation to rotatable or cylindrical bodies of elements described.

Where in the above reference is made to longitudinal or lateral this is in reference to the length or width directions respectively of elements which have an oblong or otherwise elongate appearance in the accompanying drawings. This interpretation however has only been used for ease of reference and should not be construed as a limitation of the shape of such elements. Expressions, such as right, left, horizontal, vertical, above, below, upper, lower, top, bottom or the like if used in reference to the construction as illustrated in the accompanying drawings are relevant only to the relative positions and in a different orientation of the construction should be interpreted in accordance with comparable relative positions.

I claim:

1. Retractable and extendable sun protection device, including at least one arm support bracket, at least one arm having first and second pivoting arm sections, a front bar, a roller adapted to be mounted for rotation, a fabric cloth for winding about and unwinding from the roller, wherein the first pivoting arm section has a first end pivotally linked to a bearing support and a second end, the second pivoting arm section has a first end pivotally linked to the second end of the first pivoting arm section and a second end pivotally linked to the front bar, wherein the first pivoting arm section and the second pivoting arm section include first, second, third and fourth plug elements, wherein the first, second, third and fourth plug elements are connected to the respective first and second pivoting arm sections by means of an adhesive composition and are each provided with a channel arrangement on a plug-in end that communicates with an opening exposed exteriorly of the first and second pivoting arm sections and wherein the adhesive composition is located in the channel arrangement, said sun protection device further including a control system for moving the sun protection device between retracted and extended positions.

2. Sun protection device according to claim 1, wherein the first and second pivoting arm sections include first and second tubular profiles and wherein the first and second plug elements are inserted in the first tubular profile, while the third and fourth plug elements are inserted in the second tubular profile.

3. Sun protection device according to claim 1, wherein the at least one arm support bracket includes a base part, a link pivotally connected to the base part, a bushing connected to the link and a spindle adjustably supporting the link from the base part.

4. Sun protection device according to claim 3, wherein the bushing is resiliently connected to the spindle.

5. Sun protection device according to claim 3 or 4, wherein the bushing has relatively rotatable inner and outer bushings.

6. Sun protection device according to claim 3, wherein the spindle accepts a drive means.

7. Sun protection device according to claim 6, wherein the drive means includes a transmission.

8. Sun protection device according to claim 7, wherein the transmission is a gear box.

9. Sun protection device according to claim 3, wherein the spindle includes a lockable gas spring having an operable valve.

10. Sun protection device according to claim 1, further including a control system having in combination a sensor unit comprising at least one sensor, and a control unit, wherein the sensor unit is provided with a solar cell and a rechargeable battery as a sole means of power supply and wherein the sensor unit and the control unit communicate with one another by means of wireless signal transmission for moving the sun protection device between retracted and extended positions.

11. Sun protection device according to claim 10, wherein the front bar is provided with the sensor unit.

12. Sun protection device according to claim 10 or 11, further comprising a means for moving the sun protection device between retracted and extended positions and wherein the control unit is adapted to be physically connected to the means for moving the sun protection device.

13. A retractable and extendable sun protection device, comprising:

a front bar;

a roller adapted to be mounted for rotation;

a fabric cloth for winding about and unwinding from the roller;

at least one arm support bracket; and at least one arm having first and second pivoting arm sections, wherein the first pivoting arm section has a first end pivotally linked to a bearing support and a second end, and the second pivoting arm section has a first end pivotally linked to the second end of the first pivoting arm section and a second end pivotally linked to the front bar;

wherein the first pivoting arm section and the second pivoting arm section include first, second, third, and fourth plug elements, each provided with a channel arrangement on a plug-in end that communicates with an opening exposed exteriorly of the first and second pivoting arm sections; and wherein said sun protection device includes a control system for moving the sun protection device between retracted and extended positions.

14. The retractable and extendable sun protection device according to claim 13, wherein an adhesive is located in the channel arrangement.

15. A retractable and extendable sun protection device, comprising:

a front bar;

a roller adapted to be mounted for rotation;

a fabric cloth for winding about and unwinding from the roller;

at least one arm support bracket; and at least one arm having first and second pivoting arm sections, wherein the first pivoting arm section has a first end pivotally linked to a bearing support and a second end, and the second pivoting arm section has a first end pivotally linked to the second end of the first pivoting arm section and a second end pivotally linked to the front bar;

wherein the first pivoting arm section and the second pivoting arm section include first, second, third, and fourth plug elements, each provided with a channel arrangement on a plug-in end that communicates with an opening exposed exteriorly of the first and second pivoting arm sections;

wherein the first, second, third, and fourth plug elements are connected with the respective first and second pivoting arm sections by means of an adhesive composition; and wherein said sun protection device includes a control system for moving the sun protection device between retracted and extended positions.

16. A retractable and extendable sun protection device, comprising:

a front bar;

a roller adapted to be mounted for rotation;

a fabric cloth for winding about and unwinding from the roller;

at least one arm support bracket; and at least one arm having first and second pivoting arm sections, wherein the first pivoting arm section has a first end pivotally linked to a bearing support and a second end, and the second pivoting arm section has a first end pivotally linked to the second end of the first pivoting arm section and a second end pivotally linked to the front bar;

wherein the first pivoting arm section and the second pivoting arm section include first, second, third, and fourth plug elements, each provided with a channel arrangement on a plug-in end that communicates with an opening exposed exteriorly of the first and second pivoting arm sections;

wherein the first and second pivoting arm sections include first and second tubular profiles and wherein the first and second plug elements are inserted in the first tubular profile, and the third and fourth plug elements are inserted in the second tubular profile; and wherein said sun protection device includes a control system for moving the sun protection device between retracted and extended positions.

17. A retractable and extendable sun protection device, comprising:

a front bar;

a roller adapted to be mounted for rotation;

a fabric cloth for winding about and unwinding from the roller;

at least one arm support bracket; and at least one arm having first and second pivoting arm sections, wherein the first pivoting arm section has a first end pivotally linked to a bearing support and a second end, and the second pivoting arm section has a first end pivotally linked to the second end of the first pivoting arm section and a second end pivotally linked to the front bar;

wherein the first pivoting arm section and the second pivoting arm section include first, second, third, and fourth plug elements, each provided with a channel arrangement on a plug-in end that communicates with an opening exposed exteriorly of the first and second pivoting arm sections;

wherein the first pivoting arm section and the second pivoting arm section include first and second tubular profiles, and wherein the first and second plug elements are inserted in the first tubular profile, and the third and fourth plug elements are inserted in the second tubular profile;

wherein the first, second, third, and fourth plug elements are connected with the respective first and second pivoting arm sections by means of an adhesive composition; and wherein said sun protection device includes a control system for moving the sun protection device between refracted and extended positions.

18. A retractable and extendable sun protection device, comprising:

a front bar;

a roller adapted to be mounted for rotation;

a fabric cloth for winding about and unwinding from the roller;

at least one arm support bracket including a base part, a link pivotally connected to the base part, a spindle adjustably supporting the link from the base part, and a bushing connected to the link, and wherein the bushing has relatively rotatable inner and outer bushings;

at least one arm having first and second pivoting arm sections, wherein the first pivoting arm section has a first end pivotally linked to a bearing support and a second end, and the second pivoting arm section has a first end pivotally linked to the second end of the first pivoting arm section and a second end pivotally linked to the front bar; and wherein said sun protection device includes a control system for moving the sun protection device between retracted and extended positions.

19. A retractable and extendable sun protection device, comprising:

a front bar;

a roller adapted to be mounted for rotation;

a fabric cloth for winding about and unwinding from the roller;

at least one arm support bracket; and at least one arm having first and second pivoting arm sections, wherein the first pivoting arm section has a first end pivotally linked to a bearing support and a second end, and the second pivoting arm section has a first end pivotally linked to the second end of the first pivoting arm section and a second end pivotally linked to the front bar;

wherein the first pivoting arm section and the second pivoting arm section include first, second, third, and fourth plug elements, each connected with the respective first and second pivoting arm sections by means of an adhesive composition; and wherein said sun protection device includes a control system for moving the sun protection device between retracted and extended positions.

20. The retractable and extendable sun protection device according to claim 19, wherein the first pivoting arm section and the second pivoting arm section include first and second tubular profiles, and wherein the first and second plug elements are inserted in the first tubular profile, and the third and fourth plug elements are inserted in the second tubular profile.

* * * * *